United States Patent
Park et al.

(10) Patent No.: US 12,538,203 B2
(45) Date of Patent: Jan. 27, 2026

(54) CONTENTION FREE RANDOM ACCESS FAILURE

(71) Applicant: Comcast Cable Communications, LLC, Philadelphia, PA (US)

(72) Inventors: Kyungmin Park, Vienna, VA (US); Esmael Hejazi Dinan, McLean, VA (US); Hyoungsuk Jeon, Centreville, VA (US); Hua Zhou, Vienna, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/141,798

(22) Filed: May 1, 2023

(65) Prior Publication Data

US 2023/0354135 A1  Nov. 2, 2023

Related U.S. Application Data

(63) Continuation of application No. 16/102,408, filed on Aug. 13, 2018, now Pat. No. 11,678,246.
(Continued)

(51) Int. Cl.
| | | |
|---|---|---|
| *H04W 36/30* | (2009.01) | |
| *H04W 74/0833* | (2024.01) | |
| *H04W 76/27* | (2018.01) | |
| *H04W 24/10* | (2009.01) | |
| *H04W 36/00* | (2009.01) | |
| *H04W 74/0838* | (2024.01) | |

(52) U.S. Cl.
CPC ..... *H04W 36/305* (2018.08); *H04W 74/0833* (2013.01); *H04W 76/27* (2018.02); *H04W 24/10* (2013.01); *H04W 36/0077* (2013.01); *H04W 74/0838* (2024.01)

(58) Field of Classification Search
CPC ........... H04W 36/305; H04W 36/0077; H04W 76/27; H04W 74/0833; H04W 24/10
USPC ......................................................... 455/436
See application file for complete search history.

(56) References Cited

U.S. PATENT DOCUMENTS

| | | |
|---|---|---|
| 8,798,093 B2 | 8/2014 | Wu |
| 9,432,847 B2 | 8/2016 | Yi et al. |

(Continued)

FOREIGN PATENT DOCUMENTS

| | | | | |
|---|---|---|---|---|
| CN | 102448060 A | | 5/2012 | |
| CN | 107148086 | * | 9/2017 | .......... H04W 74/006 |

(Continued)

OTHER PUBLICATIONS

Wang Weiwei, JP-2017127025-A "Method and Apparatus for Analyzing Cause of Link Failure", Jul. 20 (Year: 2017).*

(Continued)

*Primary Examiner* — Mong-Thuy T Tran
(74) *Attorney, Agent, or Firm* — Banner & Witcoff, Ltd.

(57) ABSTRACT

Systems, apparatuses, and methods are described for random access of a wireless device. A distributed unit (e.g., of a radio access network (RAN) entity) may send an indication of a random access (RA) resource of a cell for a wireless device. The distributed unit may send, to a central unit, an RA failure indication associated with the wireless device, for example, if the distributed unit does not detect an RA preamble on the RA resource from a wireless device.

38 Claims, 39 Drawing Sheets

Related U.S. Application Data

(60) Provisional application No. 62/544,157, filed on Aug. 11, 2017.

(56) References Cited

U.S. PATENT DOCUMENTS

| | | | |
|---|---|---|---|
| 9,554,399 | B2 | 1/2017 | Zhang et al. |
| 9,596,674 | B2 | 3/2017 | Somasundaram et al. |
| 11,678,246 | B2* | 6/2023 | Park .................. H04W 74/0833 |
| | | | 455/436 |
| 2008/0310367 | A1 | 12/2008 | Meylan |
| 2009/0175163 | A1 | 7/2009 | Sammour et al. |
| 2009/0190480 | A1 | 7/2009 | Sammour et al. |
| 2010/0034169 | A1 | 2/2010 | Maheshwari et al. |
| 2010/0037085 | A1 | 2/2010 | Qiang |
| 2012/0069732 | A1 | 3/2012 | Xu et al. |
| 2013/0250828 | A1 | 9/2013 | Chou et al. |
| 2013/0343307 | A1 | 12/2013 | Desai et al. |
| 2014/0079022 | A1 | 3/2014 | Wang et al. |
| 2014/0192775 | A1 | 7/2014 | Li et al. |
| 2014/0341163 | A1 | 11/2014 | Zhang et al. |
| 2015/0016312 | A1 | 1/2015 | Li et al. |
| 2015/0085689 | A1 | 3/2015 | Vos |
| 2015/0304888 | A1 | 10/2015 | Masini et al. |
| 2016/0255658 | A1* | 9/2016 | Fujishiro .............. H04W 16/32 |
| | | | 370/329 |
| 2016/0338140 | A1 | 11/2016 | Zhang et al. |
| 2017/0019930 | A1* | 1/2017 | Lee ....................... H04W 72/21 |
| 2017/0041767 | A1 | 2/2017 | Vajapeyam et al. |
| 2017/0134139 | A1 | 5/2017 | Cho et al. |
| 2017/0150408 | A1 | 5/2017 | Joseph et al. |
| 2017/0202053 | A1 | 7/2017 | Rune |
| 2018/0006770 | A1 | 1/2018 | Guo et al. |
| 2018/0034515 | A1* | 2/2018 | Guo ....................... H04B 7/043 |
| 2018/0124642 | A1 | 5/2018 | Phuyal et al. |
| 2018/0124825 | A1 | 5/2018 | Lee et al. |
| 2018/0279168 | A1 | 9/2018 | Jheng et al. |
| 2018/0279169 | A1 | 9/2018 | Wang et al. |
| 2018/0279193 | A1 | 9/2018 | Park et al. |
| 2018/0279204 | A1 | 9/2018 | Kim et al. |
| 2018/0279218 | A1 | 9/2018 | Park et al. |
| 2018/0279262 | A1 | 9/2018 | Babaei et al. |
| 2018/0279401 | A1 | 9/2018 | Hong et al. |
| 2018/0287677 | A1 | 10/2018 | Nagaraja et al. |
| 2018/0302890 | A1* | 10/2018 | Marinier .............. H04W 72/20 |
| 2018/0324803 | A1 | 11/2018 | Rosa et al. |
| 2018/0352601 | A1 | 12/2018 | Park et al. |
| 2018/0367288 | A1 | 12/2018 | Vrzic et al. |
| 2018/0368107 | A1 | 12/2018 | Babaei et al. |
| 2018/0368132 | A1* | 12/2018 | Babaei .................. H04W 76/11 |
| 2019/0036672 | A1* | 1/2019 | Kadiri .................. H04W 36/04 |
| 2019/0037458 | A1* | 1/2019 | Kadiri .................. H04W 76/20 |
| 2019/0037635 | A1 | 1/2019 | Guo et al. |
| 2019/0053325 | A1 | 2/2019 | Yu et al. |
| 2019/0132777 | A1* | 5/2019 | Park ....................... H04W 76/27 |
| 2019/0132790 | A1 | 5/2019 | Lee et al. |
| 2019/0141592 | A1* | 5/2019 | Park ....................... H04W 76/18 |
| 2019/0174402 | A1 | 6/2019 | Zhao et al. |
| 2019/0268799 | A1 | 8/2019 | Hong et al. |
| 2020/0059971 | A1 | 2/2020 | Qian et al. |
| 2020/0084682 | A1* | 3/2020 | Wang .............. H04W 36/00835 |
| 2020/0120553 | A1 | 4/2020 | Wang et al. |
| 2022/0158785 | A1* | 5/2022 | Wang .................... H04W 72/27 |

FOREIGN PATENT DOCUMENTS

| | | |
|---|---|---|
| WO | 2018143703 A1 | 8/2018 |
| WO | 2018147677 A1 | 8/2018 |
| WO | 2018175199 A1 | 9/2018 |
| WO | 2018183085 A1 | 10/2018 |
| WO | 2018202933 A1 | 11/2018 |
| WO | 2018203736 A1 | 11/2018 |
| WO | 2018231425 A1 | 12/2018 |
| WO | 2018237001 A1 | 12/2018 |
| WO | 2019139530 A1 | 7/2019 |

OTHER PUBLICATIONS

R3-174611 3GPP TSG-RAN WG3 Meeting #98, Reno, USA, Nov. 27-Dec. 1, 2017, Source: Samsung, KT, Title: Mobility procedures with high layer split.

R3-174612 3GPP TSG-RAN WG3 Meeting #98, Reno, USA, Nov. 27-Dec. 1, 2017, Source: Samsung, KT, Title: Stage 2 TP for TS38.470 on mobility related procedures.

R3-174613 3GPP TSG-RAN WG3 Meeting #98, Reno, USA, Nov. 27-Dec. 1, 2017, Source: Samsung, KT, Title: Stage 3 TP for TS38.473 on mobility related procedures.

R3-174618 3GPP TSG-RAN WG3 Meeting #98, Reno, USA, Nov. 27-Dec. 1, 2017, Source: Samsung, KT, Title: Further discussions on PDCP duplication in high-layer split.

R3-174637 3GPP TSG-RAN WG3 Meeting #98, Reno, USA, Nov. 27-Dec. 1, 2017, Source: Intel Corporation, Title: Flow Control enhancements for downlink PDCP duplication.

R3-174638 3GPP TSG-RAN WG3 Meeting #98, Reno, USA, Nov. 27-Dec. 1, 2017, Source: Intel Corporation, Title: Flow Control enhancements for uplink PDCP duplication.

R3-174663 3GPP TSG-RAN WG3 Meeting #98, Reno, USA, Nov. 27-Dec. 1, 2017, Source: CMCC, Title: UE initial access procedure for CU-DU architecture.

R3-174769 3GPP TSG-RAN WG3 Meeting #98, Reno, USA, Nov. 27-Dec. 1, 2017, Source: Ericsson, Title: Discard the duplicated transmissions of PDCP PDUs.

R3-174772 3GPP TSG-RAN WG3 Meeting #98, Reno, USA, Nov. 27-Dec. 1, 2017, Source: Ericsson, Title: Benefits of F1AP Transaction IDs.

R3-174773 3GPP TSG-RAN WG3 Meeting #98, Reno, USA, Nov. 27-Dec. 1, 2017, Source: Ericsson, Title: Further discussion about TNL solution for F1-C.

R3-174774 3GPP TSG-RAN WG3 Meeting #98, Reno, USA, Nov. 27-Dec. 1, 2017, Source: Ericsson, Title: On parallel transaction over F1.

R3-174781 3GPP TSG-RAN WG3 Meeting #98, Reno, USA, Nov. 27-Dec. 1, 2017, Source: Ericsson, Title: Mobility procedures.

R3-174782 3GPP TSG-RAN WG3 Meeting #98, Reno, USA, Nov. 27-Dec. 1, 2017, Source: Ericsson, Title: Content for UE mobility command messages.

R3-174786 3GPP TSG-RAN WG3 Meeting #98, Reno, USA, Nov. 27-Dec. 1, 2017, Source: Ntt Docomo, Inc., Title: How to acquire status of re-transmitted packets.

R3-174850 3GPP TSG-RAN WG3 Meeting #98, Reno, USA, Nov. 27-Dec. 1, 2017, Source: NTT Docomo, Inc., Title: Consideration on data volume reporting.

R3-174854 3GPP TSG-RAN WG3 Meeting #98, Reno, USA, Nov. 27-Dec. 1, 2017, Source: KT Corp., Title: Considerations for F1 Setup Procedure.

R3-180123 3GPP TSG-RAN WG3 NR Ad Hoc, Sophia Antipolis, France, Jan. 22-26, 2018, Source: ZTE, Title: QoS information transfer over F1 interface.

R3-180124 3GPP TSG-RAN WG3 NR Ad Hoc, Sophia Antipolis, France, Jan. 22-26, 2018, Source: ZTE, Title: Update on QoS information transfer for TS38.473.

R3-180139 3GPP TSG-RAN WG3 NR Ad Hoc, Sophia Antipolis, France, Jan. 22-26, 2018, Source: ZTE, Title: NW slicing for high layer functional split.

R3-180164 3GPP TSG-RAN WG3 NR Ad Hoc, Sophia Antipolis, France, Jan. 22-26, 2018, Source: CATT, Title: TP for 38.401 BL on UE Reconfiguration Completion procedure.

R3-180179 3GPP TSG-RAN WG3 NR Ad Hoc, Sophia Antipolis, France, Jan. 22-26, 2018, Source: CATT, Title: Discussion on UE Context Management procedure.

R3-180180 3GPP TSG-RAN WG3 NR Ad Hoc, Sophia Antipolis, France, Jan. 22-26, 2018, Source: CATT, Title: TP for TS 38.473 on UE Context Management procedure.

R3-180188 3GPP TSG-RAN WG3 NR Ad Hoc, Sophia Antipolis, France, Jan. 22-26, 2018, Source: Nokia, Nokia Shanghai Bell, Title: QoS handling for F1.

(56) References Cited

OTHER PUBLICATIONS

R3-180189 3GPP TSG-RAN WG3 NR Ad Hoc, Sophia Antipolis, France, Jan. 22-26, 2018, Source: Nokia, Nokia Shanghai Bell, Title: TP of QoS handling for F1 (TS38.473).
R3-180190 3GPP TSG-RAN WG3 NR Ad Hoc, Sophia Antipolis, France, Jan. 22-26, 2018, Source: Nokia, Nokia Shanghai Bell, KT, Title: User inactivity monitoring.
R3-180234 3GPP TSG-RAN WG3 NR Ad Hoc, Sophia Antipolis, France, Jan. 22-26, 2018, Source: LG Electronics Inc., KT Corp., Title: QoS aspect in UE context management function.
R3-180235 3GPP TSG-RAN WG3 NR Ad Hoc, Sophia Antipolis, France, Jan. 22-26, 2018, Source: LG Electronics Inc., KT Corp., Title: Stage 3 on QoS aspect in UE context management function.
R3-180244 3GPP TSG-RAN WG3 NR Ad Hoc, Sophia Antipolis, France, Jan. 22-26, 2018, Source: Samsung, KT, Title: UE context management update considering parameters over X2 for EN-DC.
R3-180285 3GPP TSG-RAN WG3 NR Ad Hoc, Sophia Antipolis, France, Jan. 22-26, 2018, Source: Samsung, KT, Title: User inactivity monitoring in CU-DU architecture.
R3-180286 3GPP TSG-RAN WG3 NR Ad Hoc, Sophia Antipolis, France, Jan. 22-26, 2018, Source: Samsung, KT, Title: TP for TS 38.473 on user inactivity monitoring.
R3-180300 3GPP TSG-RAN WG3 NR Ad Hoc, Sophia Antipolis, France, Jan. 22-26, 2018, Source: NEC, Title: RLC Mode indication in F1AP.
R3-180330 3GPP TSG-RAN WG3 Nr Ad Hoc, Sophia Antipolis, France, Jan. 22-26, 2018, Source: CMCC, Title: QoS management over F1.
R3-180343 3GPP TSG-RAN WG3 NR Ad Hoc, Sophia Antipolis, France, Jan. 22-26, 2018, Source: Huawei, Title: Further discussions on QoS info transfer over F1.
R3-180344 3GPP TSG-RAN WG3 NR Ad Hoc, Sophia Antipolis, France, Jan. 22-26, 2018, Source: Huawei, Title: pCR to 38.473 on QoS info transfer over F1.
R3-180352 3GPP TSG-RAN WG3 NR Ad Hoc, Sophia Antipolis, France, Jan. 22-26, 2018, Source: Huawei, Title: Further discussions on UE context management.
R3-180355 3GPP TSG-RAN WG3 NR Ad Hoc, Sophia Antipolis, France, Jan. 22-26, 2018, Source: Huawei, Title: CR to BL 38.473 on inter-gNB-DU or intra-gNB-DU handover case for SA operation.
R3-180356 3GPP TSG-RAN WG3 NR Ad Hoc, Sophia Antipolis, France, Jan. 22-26, 2018, Source: Huawei, Title: pCR to 38.473 on the introduction of Handover Preparation Information for SA Operation.
R3-180357 3GPP TSG-RAN WG3 NR Ad Hoc, Sophia Antipolis, France, Jan. 22-26, 2018, Source: Huawei, Title: Further discussions on the content of serving cell info.
R3-180367 3GPP TSG-RAN WG3 NR Ad Hoc, Sophia Antipolis, France, Jan. 22-26, 2018, Source: Huawei, Title: Further discussions on confirmation to gNB-DU about completion of RRC messages.
R3-180425 3GPP TSG-RAN WG3 NR Ad Hoc, Sophia Antipolis, France, Jan. 22-26, 2018, Source: Ericsson, Title: UE radio capabilities over F1.
R3-180426 3GPP TSG-RAN WG3 NR Ad Hoc, Sophia Antipolis, France, Jan. 22-26, 2018, Source: Ericsson, Title: Cell information over F1.
R3-180427 3GPP TSG-RAN WG3 NR Ad Hoc, Sophia Antipolis, France, Jan. 22-26, 2018, Source: Ericsson, Title: UE Context Setup over the F1.
R3-180428 3GPP TSG-RAN WG3 NR Ad Hoc, Sophia Antipolis, France, Jan. 22-26, 2018, Source: Ericsson, Title: UE Reject Indication and gNB-DU admission result.
R3-180429 3GPP TSG-RAN WG3 NR Ad Hoc, Sophia Antipolis, France, Jan. 22-26, 2018, Source: Ericsson, Title: Further analysis on inactivity monitoring.
R3-180430 3GPP TSG-RAN WG3 NR Ad Hoc, Sophia Antipolis, France, Jan. 22-26, 2018, Source: Ericsson, Title: Creation of signalling connection.
R3-180431 3GPP TSG-RAN WG3 NR Ad Hoc, Sophia Antipolis, France, Jan. 22-26, 2018, Source: Ericsson, Title: RRC Container in UE Context Setup Request.
R3-180432 3GPP TSG-RAN WG3 NR Ad Hoc, Sophia Antipolis, France, Jan. 22-26, 2018, Source: Ericsson, Title: RLC mode indication.
R3-180433 3GPP TSG-RAN WG3 NR Ad Hoc, Sophia Antipolis, France, Jan. 22-26, 2018, Source: Ericsson, Title: Introduction of UE Reconfiguration Complete procedure.
R3-180518 3GPP TSG-RAN WG3 NR Ad Hoc, Sophia Antipolis, France, Jan. 22-26, 2018, Source: Ericsson, Vodafone, Title: UE context Setup over the F1.
R3-180596 3GPP TSG-RAN WG3 NR Ad Hoc, Sophia Antipolis, France, Jan. 22-26, 2018, Source: Ericsson, Title: UE Reject Indication.
R3-182243 3GPP TSG RAN WG3 Meeting #99bis, Sanya, China, Apr. 16-20, 2018, Source: Ericsson, Title: Bearer Context Setup procedure.
R2-1713898 3GPP TSG-RAN WG2 Meeting #100, Reno, USA, Nov. 27-Dec. 1, 2017, Source: Samsung, Title: RLM RS type and L3 parameter differentiation.
Dec. 2, 2019—European Extended Search Report—EP 19173901.0.
R3-183279 3GPP TSG-RAN2 Meeting #100, Busan, Korea, May 21-25, 2019, Source: Huawei, Title: pCR to 38.460 on indication of PDCP duplication over E1 interface.
R3-180599 3GPP TSG-RAN WG3 NR Ad Hoc, Sophia Antipolis, France, Jan. 22-26, 2018, Source: Huawei, Title: pCR to 38.473 on UE context management for mobility handling for SA operation.
R3-180606 3GPP TSG-RAN WG3 NR Ad Hoc, Sophia Antipolis, France, Jan. 22-26, 2018, Source: NTT Docomo, Inc., Title: Summary of offline discussion on CU-DU QoS handling.
R3-180807 3GPP TSG-RAN WG3 Meeting #99, Athens, Greece, Feb. 26-Mar. 2, 2018, Source: CATT, Title: Discussion on activation of PDCP Duplication.
R3-181732 3GPP TSG RAN WG3 Meeting #99bis, Sanya, China, Apr. 16-20, 2018, Source: ZTE, Title: Bearer Context Modification over E1 interface for TS38.460.
R3-181733 3GPP TSG RAN WG3 Meeting #99bis, Sanya, China, Apr. 16-20, 2018, Source: ZTE, Title: Bearer Context Modification over E1 interface for TS38.463.
R3-181735 3GPP TSG RAN WG3 Meeting #99bis, Sanya, China, Apr. 16-20, 2018, Source: ZTE, Title: Discussion on PDCP Count wrap around.
R3-181736 3GPP TSG RAN WG3 Meeting #99bis, Sanya, China, Apr. 16-20, 2018, Source: ZTE, Title: Discussion on E1 interface setup.
R3-181833 3GPP TSG RAN WG3 Meeting #99bis, Sanya, China, Apr. 16-20, 2018, Source: NEC (Rapporteur), Title: Baseline CR for June version of TS 38.401 covering agreements of RAN3#99 on CPUP_Split.
R3-181842 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) Support of change of gNB-CU-UP.
R3-181843 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) FFS resolution for E1 overall procedures.
R3-181844 3GPP TSG RAN WG3 Meeting #99bis, Sanya, China, Apr. 16-20, 2018, Source: Nokia, Nokia Shanghai Bell, Title: Definition of gNB-CU-CP/UP.
R3-181845 3GPP TSG RAN WG3 Meeting #99bis, Sanya, China, Apr. 16-20, 2018, Source: Nokia, Nokia Shanghai Bell, Title: E1 non-UE associated functions.
R3-181846 3GPP TSG RAN WG3 Meeting #99bis, Sanya, China, Apr. 16-20, 2018, Source: Nokia, Nokia Shanghai Bell, Title: E1 non-UE associated procedures.
R3-181847 3GPP TSG RAN WG3 Meeting #99bis, Sanya, China, Apr. 16-20, 2018, Source: Nokia, Nokia Shanghai Bell, Title: gNB-CU-UP notification function.
R3-181848 3GPP TSG RAN WG3 Meeting #99bis, Sanya, China, Apr. 16-20, 2018, Source: Nokia, Nokia Shanghai Bell, Title: gNB-CU-UP notification procedure.

(56) References Cited

OTHER PUBLICATIONS

R3-181849 3GPP TSG RAN WG3 Meeting #99bis, Sanya, China, Apr. 16-20, 2018, Source: Nokia, Nokia Shanghai Bell, Title: Bearer Context Management procedures.
R3-181850 3GPP TSG RAN WG3 Meeting #99bis, Sanya, China, Apr. 16-20, 2018, Source: Nokia, Nokia Shanghai Bell, Title: Signalling transport for E1.
R3-181893 3GPP TSG RAN WG3 Meeting #99bis, Sanya, China, Apr. 16-20, 2018, Source: LG Electronics, KT Corp., Title: Procedures for Security Support in CU-CP/UP Separation.
R3-182056 3GPP TSG RAN WG3 Meeting #99bis, Sanya, China, Apr. 16-20, 2018, Source: LG Electronics, KT Corp., Title: Discussion on Bearer Context Modification.
R3-182078 3GPP TSG RAN WG3 Meeting #99bis, Sanya, China, Apr. 16-20, 2018, Source: Samsung, Title: E1 interface management procedures.
R3-182079 3GPP TSG RAN WG3 Meeting #99bis, Sanya, China, Apr. 16-20, 2018, Source: Samsung, Title: CU-UP Security Capability indication to CU-CP.
R3-182080 3GPP TSG RAN WG3 Meeting #99bis, Sanya, China, Apr. 16-20, 2018, Source: Samsung, Title: TP for TS 38.463 on E1 interface management.
R3-182081 3GPP TSG RAN WG3 Meeting #99bis, Sanya, China, Apr. 16-20, 2018, Source: Samsung, Title: Additional UE-associated E1 procedures.
R3-182082 3GPP TSG RAN WG3 Meeting #99bis, Sanya, China, Apr. 16-20, 2018, Source: Samsung, Title: TP for TS 38.463 on additional UE-associated E1 procedures.
R3-182109 3GPP TSG RAN WG3 Meeting #99bis, Sanya, China, Apr. 16-20, 2018, Source: Huawei, Title: Initial TPs to 38.462.
R3-182110 3GPP TSG RAN WG3 Meeting #99bis, Sanya, China, Apr. 16-20, 2018, Source: Huawei, Title: Rapporteur editorial updates to 38.462.
R3-182129 3GPP TSG RAN WG3 Meeting #99bis, Sanya, China, Apr. 16-20, 2018, Source: Huawei, Title: Inactivity monitoring in CP/UP separation.
R3-182130 3GPP TSG RAN WG3 Meeting #99bis, Sanya, China, Apr. 16-20, 2018, Source: Huawei, Title: (TP for NR BL CR for TS 38.401) On RRC state transition for CP-UP separation.
R3-182131 3GPP TSG RAN WG3 Meeting #99bis, Sanya, China, Apr. 16-20, 2018, Source: Huawei, Title: Data Forwarding in CP/UP separation.
R3-182132 3GPP TSG RAN WG3 Meeting #99bis, Sanya, China, Apr. 16-20, 2018, Source: Huawei, Title: pCR to 38.460 on QoS handling over E1.
R3-182134 3GPP TSG RAN WG3 Meeting #99bis, Sanya, China, Apr. 16-20, 2018, Source: Huawei, Title: pCR to 38.460 on secondary node modification triggered by gNB-CU-CP.
R3-182136 3GPP TSG RAN WG3 Meeting #99bis, Sanya, China, Apr. 16-20, 2018, Source: Huawei, Title: pCR to 38.460 on centralized retransmission for CP-UP separation.
R3-182224 3GPP TSG RAN WG3 Meeting #99bis, Sanya, China, Apr. 16-20, 2018, Source: Ericsson, Title: E1 support for RRC-inactive.
R3-182225 3GPP TSG RAN WG3 Meeting #99bis, Sanya, China, Apr. 16-20, 2018, Source: Ericsson, Title: Dual-connectivity configuration over E1.
R3-182226 3GPP TSG RAN WG3 Meeting #99bis, Sanya, China, Apr. 16-20, 2018, Source: Ericsson, Title: Potentials of RAN UP network function virtualization.
R3-182227 3GPP TSG RAN WG3 Meeting #99bis, Sanya, China, Feb. 26-Mar. 2, 2018, Source: Ericsson, Title: PDCP duplication configuration.
R3-182228 3GPP TSG RAN WG3 Meeting #99bis, Sanya, China, Apr. 16-20, 2018, Source: Ericsson, Vodafone, KT, AT&T, Title: Support of Ran Up network function virtualization at handover.
R3-182229 3GPP TSG RAN WG3 Meeting #99bis, Sanya, China, Apr. 16-20, 2018, Source: Ericsson, Title: Support of RAN UP network function virtualization at handover—for 38.300.
R3-182230 3GPP TSG RAN WG3 Meeting #99bis, Sanya, China, Apr. 16-20, 2018, Source: Ericsson, Title: Support of RAN UP network function virtualization at handover—for 38.413.
R3-182231 3GPP TSG RAN WG3 Meeting #99bis, Sanya, China, Apr. 16-20, 2018, Source: Ericsson, Title: Support of RAN UP network function virtualization at handover—for 38.423.
R3-182232 3GPP TSG RAN WG3 Meeting #99bis, Sanya, China, Apr. 16-20, 2018, Source: Ericsson, Title: Support of RAN UP network function virtualization at handover—for 36.300.
R3-182233 3GPP TSG RAN WG3 Meeting #99bis, Sanya, China, Apr. 16-20, 2018, Source: Ericsson, Title: Bearer Context definition.
R3-182234 3GPP TSG RAN WG3 Meeting #99bis, Sanya, China, Apr. 16-20, 2018, Source: Ericsson, Title: Resolve FFS in procedures in TS 38.401.
R3-182235 3GPP TSG RAN WG3 Meeting #99bis, Sanya, China, Apr. 16-20, 2018, Source: Ericsson, Title: Multiple TNL associations over E1.
R3-182237 3GPP TSG RAN WG3 Meeting #99bis, Sanya, China, Apr. 16-20, 2018, Source: Ericsson, Title: E1 Setup procedure.
R3-182238 3GPP TSG RAN WG3 Meeting #99bis, Sanya, China, Apr. 16-20, 2018, Source: Ericsson, Title: E1 Reset procedure.
R3-182239 3GPP TSG RAN WG3 Meeting #99bis, Sanya, China, Apr. 16-20, 2018, Source: Ericsson, Title: E1 Release procedure.
R3-182240 3GPP TSG RAN WG3 Meeting #99bis, Sanya, China, Apr. 16-20, 2018, Source: Ericsson, Title: E1 Error Indication.
R3-182241 3GPP TSG RAN WG3 Meeting #99bis, Sanya, China, Apr. 16-20, 2018, Source: Ericsson, Title: Bearer Context Modification procedure.
R3-182242 3GPP TSG RAN WG3 Meeting #99bis, Sanya, China, Apr. 16-20, 2018, Source: Ericsson, Title: E1 Configuration Update.
R3-172401 3GPP TSG-RAN3 NR AdHoc Meeting, Qingdao, China, Jun. 27-29, 2017, Source: CMCC, Title: gNB ID and NCGI considering CU-DU split.
R3-172417 3GPP TSG-RAN3 NR AdHoc Meeting, Qingdao, China, Jun. 27-29, 2017, Source: ZTE, China Unicom, Title: Discussion on CU DU ID and NCGI.
R3-172418 3GPP TSG-RAN3 NR AdHoc Meeting, Qingdao, China, Jun. 27-29, 2017, Source: ZTE, China Unicom, Title: CUDU ID and NCGI for TS 38.300.
R3-172481 3GPP TSG-RAN3 NR AdHoc Meeting, Qingdao, China, Jun. 27-29, 2017, Source: Samsung, Title: Identification of gNB, gNB-CU/DU, and NR cell.
R3-172484 3GPP TSG-RAN3 NR AdHoc Meeting, Qingdao, China, Jun. 27-29, 2017, Source: Vodafone, Title: Common Radio Resource Management Functional Split for Different Deployment Scenarios.
R3-172511 3GPP TSG-RAN3 NR AdHoc Meeting, Qingdao, China, Jun. 27-29, 2017, Source: Ericsson, Title: Resilience and scalability in a disaggregated gNB.
3GPP TS 36.300 V14.3.0 (Jun. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 38.300 V1.0.0 (Sep. 2017), Technical Specification, 3rd Generation Partnership Project; Technical Specification Group Radio Access Network; NR; NR and NG-RAN; Overall Description; Stage 2 (Release 15).
R2-1707705 3GPP TSG-RAN2 Meeting #99, Berlin, Germany, Aug. 21-25, 2017, Source: OPPO, Title: Control on UL packet duplication for split bearer.
R2-1707708 3GPP TSG-RAN2 Meeting #99, Berlin, Germany, Aug. 21-25, 2017, Source: OPPO, Title: PDCP operation for UL packet duplication.
R2-1707717 3GPP TSG-RAN2 Meeting #99, Berlin, Germany, Aug. 21-25, 2017, Source: Huawei, HiSilicon, Title: UE behaviors upon deactivation of DC duplication.
R2-1707718 3GPP TSG-RAN2 Meeting #99, Berlin, Germany, Aug. 21-25, 2017, Source: Huawei, ASUSTeK, HiSilicon, Title: RLC behaviors upon duplicate deactivation.
R2-1707719 3GPP TSG-RAN2 Meeting #99, Berlin, Germany, Aug. 21-25, 2017, Source: Huawei, ASUSTek, HiSilicon, Title: PDCP operation for packet duplication.

(56) References Cited

OTHER PUBLICATIONS

R2-1707720 3GPP TSG-RAN2 Meeting #99, Berlin, Germany, Aug. 21-25, 2017, Source: Huawei, HiSilicon, Title: PDCP data volume calculation for packet duplication (Revision of R2-1706484).
R2-1707924 3GPP TSG-RAN2 Meeting #99, Berlin, Germany, Aug. 21-25, 2017, Source: CATT, Title: PDCP Status Report for Duplication.
R2-1707925 3GPP TSG-RAN2 Meeting #99, Berlin, Germany, Aug. 21-25, 2017, Source: CATT, Title: Duplication Bearer Type.
R2-1707982 3GPP TSG-RAN2 Meeting #99, Berlin, Germany, Aug. 21-25, 2017, Source: Nokia, Mediatek, Nokia Shanghai Bell, Title: Initial State of PDCP Duplication (Revision of R2-1706545).
R2-1707990 3GPP TSG-RAN2 Meeting #99, Berlin, Germany, Aug. 21-25, 2017, Source: Nokia, Nokia Shanghai Bell, Title: Duplication Impacts to PDCP.
R2-1708017 3GPP TSG-RAN2 Meeting #99, Berlin, Germany, Aug. 21-25, 2017, Source: Ericsson, Title: Aligned duplication support for DRBs and SRBs.
R2-1708097 3GPP TSG-RAN2 Meeting #99, Berlin, Germany, Aug. 21-25, 2017, Source: MediaTek Inc., Title: Stage-2 aspects of data duplication (Revision of R2-1707260).
R2-1708098 3GPP TSG-RAN2 Meeting #99, Berlin, Germany, Aug. 21-25, 2017, Source: MediaTek Inc., Title: Data duplication in NR (Revision of R2-1707261).
R2-1708329 3GPP TSG-RAN2 Meeting #99, Berlin, Germany, Aug. 21-25, 2017, Source: Ericsson, Title: PDCP and RLC behaviour for PDCP data duplication.
R2-1708333 3GPP TSG-RAN2 Meeting #99, Berlin, Germany, Aug. 21-25, 2017, Source: Ericsson, Title: Packet duplication in CA (Revision of R2-1707172).
R2-1708335 3GPP TSG-RAN2 Meeting #99, Berlin, Germany, Aug. 21-25, 2017, Source: Ericsson, Title: PDCP dynamic link switching.
R2-1708336 3GPP TSG-RAN2 Meeting #99, Berlin, Germany, Aug. 21-25, 2017, Source: Ericsson, Title: PDCP data volume reporting in duplication (Revision of R2-1704370).
R2-1708337 3GPP TSG-RAN2 Meeting #99, Berlin, Germany, Aug. 21-25, 2017, Source: Ericsson, Title: PDCP duplication control related to SCell control.
R2-1708444 3GPP TSG-RAN2 Meeting #99, Berlin, Germany, Aug. 21-25, 2017, Source: Samsung, Title: Discussion on PDCP data volume calculation.
R2-1708489 3GPP TSG-RAN2 Meeting #99, Berlin, Germany, Aug. 21-25, 2017, Source: Vivo, Title: Duplication deactivation due to SCell or BWP deactivation.
R2-1708508 3GPP TSG-RAN2 Meeting #99, Berlin, Germany, Aug. 21-25, 2017, Source: Vivo, Title: Layer-2 behaviors of PDCP duplication activation deactivation.
R2-1708573 3GPP TSG-RAN2 Meeting #99, Berlin, Germany, Aug. 21-25, 2017, Source: Panasonic, Title: Packet duplication during the handover.
R2-1708624 3GPP TSG-RAN2 Meeting #99, Berlin, Germany, Aug. 21-25, 2017, Source: Lenovo, Motorola Mobility, Title: PDCP packet duplication.
R2-1708691 3GPP TSG-RAN2 Meeting #99, Berlin, Germany, Aug. 21-25, 2017, Source: Huawei, HiSilicon, Title: Remaining stage 2 issues for CA duplication and for DC duplication.
R2-1708735 3GPP TSG-RAN2 Meeting #99, Berlin, Germany, Aug. 21-25, 2017, Source: InterDigital Inc., Title: Details of duplication and routing for SRB.
R2-1708821 3GPP TSG-RAN2 Meeting #99, Berlin, Germany, Aug. 21-25, 2017, Source: Intel Corporation, Title: Support of CA packet duplication for RLC AM.
R2-1708862 3GPP TSG-RAN2 Meeting #99, Berlin, Germany, Aug. 21-25, 2017, Source: Fujitsu, Title: Stage 2 TP for RLC AM duplication.
R2-1708950 3GPP TSG-RAN2 Meeting #99, Berlin, Germany, Aug. 21-25, 2017, Source: Qualcomm Incorporated, Title: Further considerations for Packet duplication.
R2-1708951 3GPP TSG-RAN2 Meeting #99, Berlin, Germany, Aug. 21-25, 2017, Source: Qualcomm Incorporated, Title: PDCP duplication.
R2-1709032 3GPP TSG-RAN2 Meeting #99, Berlin, Germany, Aug. 21-25, 2017, Source: Samsung, Title: PDCP Duplication Operations (Revision of R2-177368).
R2-1709036 3GPP TSG-RAN2 Meeting #99, Berlin, Germany, Aug. 21-25, 2017, Source: Samsung, Title: Uplink DRB Duplication.
R2-1709061 3GPP TSG-RAN2 Meeting #99, Berlin, Germany, Aug. 21-25, 2017, Source: LG Electronics Inc., Title: Discussion on the duplicate detection in PDCP.
R2-1709077 3GPP TSG-RAN2 Meeting #99, Berlin, Germany, Aug. 21-25, 2017, Source: ITRI, Title: SCG Failure Case for Duplication SRB.
R2-1709095 3GPP TSG-RAN2 Meeting #99, Berlin, Germany, Aug. 21-25, 2017, Source: LG Electronics Inc., Title: Need for Duplicate RB.
R2-1709100 3GPP TSG-RAN2 Meeting #99, Berlin, Germany, Aug. 21-25, 2017, Source: LG Electronics Inc., Title: Packet duplication in PDCP (Revision of R2-1706870).
R2-1709870 3GPP TSG-RAN2 Meeting #99, Berlin, Germany, Aug. 21-25, 2017, Source: Ericsson, Title: TP on Radio Link Failure for 38.300.
R3-173128 3GPP TSG-RAN2 Meeting #99, Berlin, Germany, Aug. 21-25, 2017, Source: Huawei, Title: PDCP duplication for CU-DU.
R2-1800376 3GPP TSG-RAN WG2 NR Ad Hoc, Vancouver, Canada, Jan. 22-26, 2018, Source: Huawei, HiSilicon, Title: CR on the prioritization between dynamic scheduling and configured scheduling.
R2-1800158 3GPP TSG-RAN WG2 AH, Vancouver, Canada, Jan. 22-26, 2018, Source: OPPO, Title: CR on ConfiguredGrantTimer for C-RNTI based grant.
R2-1800647 3GPP TSG-RAN WG2 AH, Vancouver, Canada, Jan. 22-26, 2018, Source: OPPO, Title: Correction on ConfiguredGrantTimer.
R2-1800710 3GPP TSG-RAN WG2 AH, Vancouver, Canada, Jan. 22-26, 2018, Source: Ericsson, Title: Alignment of terminology for Configured Scheduling and SPS.
R2-1801053 3GPP TSG-RAN WG2 AH, Vancouver, Canada, Jan. 22-26, 2018, Source: LG Electronics Inc., Title: Correction on ConfiguredGrantTimer.
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
3GPP TS 38.463 V0.2.0 (Apr. 2018), Technical Specification, 3rd Generation Partnership Project; Technical Specification Group Radio Access Network; NG-RAN; E1 application protocol (E1AP) (Release 15).
3GPP TS 38.473 V15.0.0 (Dec. 2017), Technical Specification, 3rd Generation Partnership Project; Technical Specification Group Radio Access Network; NG-RAN; F1 application protocol (F1AP) (Release 15).
3GPP TS 38.473 V15.3.0 (Sep. 2018), Technical Specification, 3rd Generation Partnership Project; Technical Specification Group Radio Access Network; Ng-Ran; F1 application protocol (F1AP) (Release 15).
R2-1801279 3GPP TSG-RAN WG2 Ah, Vancouver, Canada, Jan. 22-26, 2018, Source: LG Electronics Inc., Title: Restart condition of sCellDeactivationTimer with skipping operation.
R2-1712238 3GPP TSG-RAN WG2 Meeting #100, Reno, USA, Nov. 27-Dec. 1, 2017, Source: OPPO, Title: Discussion on Detailed Issues on RLM.
R2-1712276 3GPP TSG-RAN WG2 Meeting #100, Reno, USA, Nov. 27-Dec. 1, 2017, Source: Spreadtrum Communications, Title: Discussions on the IS and OOS Counting Procedure.
R2-1712308 3GPP TSG-RAN WG2 Meeting #100, Reno, USA, Nov. 27-Dec. 1, 2017, Source: TCL, Title: Interaction between PDCP and RLC Entities for duplication in NR-NR DC.

(56) References Cited

OTHER PUBLICATIONS

R2-1712435 3GPP TSG-RAN WG2 Meeting #100, Reno, USA, Nov. 27-Dec. 1, 2017, Source: ZTE Corporation, Title: Consideration on PDCP Duplication in NR.
R2-1712559 3GPP TSG-RAN WG2 Meeting #100, Reno, USA, Nov. 27-Dec. 1, 2017, Source: Huawei, HiSilicon, Title: RLF for NR.
R2-1712736 3GPP TSG-RAN WG2 Meeting #100, Reno, USA, Nov. 27-Dec. 1, 2017, Source: Huawei, ASUSTek, HiSilicon, Title: PDCP operation for packet duplication.
R2-1712737 3GPP TSG-RAN WG2 Meeting #100, Reno, USA, Nov. 27-Dec. 1, 2017, Source: Huawei, HiSilicon, Title: PDCP data volume calculation for packet duplication.
R2-1712738 3GPP TSG-RAN WG2 Meeting #100, Reno, USA, Nov. 27-Dec. 1, 2017, Source: Huawei, HiSilicon, Title: Clarification on bearer type for packet duplication.
R2-1712739 3GPP TSG-RAN WG2 Meeting #100, Reno, USA, Nov. 27-Dec. 1, 2017, Source: Huawei, HiSilicon, Title: Enhancements for DL packet duplication.
R2-1712753 3GPP TSG-RAN WG2 Meeting #100, Reno, USA, Nov. 27-Dec. 1, 2017, Source: vivo, Title: RLM/RLF in NR.
R2-1712914 3GPP TSG-RAN WG2 Meeting #100, Reno, USA, Nov. 27-Dec. 1, 2017, Source: Lenovo, Motorola Mobility, Title: PDCP packet duplication.
R2-1712926 3GPP TSG-RAN WG2 Meeting #100, Reno, USA, Nov. 27-Dec. 1, 2017, Source: Ericsson, Title: PDCP duplication and discard.
R2-1712928 3GPP TSG-RAN WG2 Meeting #100, Reno, USA, Nov. 27-Dec. 1, 2017, Source: Ericsson, Title: PDCP duplication for AM operation.
R2-1712929 3GPP TSG-RAN WG2 Meeting #100, Reno, USA, November 27-Dec. 1, 2017, Source: Ericsson, Title: PDCP duplication transmit procedure.
R2-1712932 3GPP TSG-RAN WG2 Meeting #100, Reno, USA, Nov.r 27-Dec. 1, 2017, Source: Ericsson, Title: PDCP data volume reporting in duplication.
R2-1712964 3GPP TSG-RAN WG2 Meeting #100, Reno, USA, Nov. 27-Dec. 1, 2017, Source: Samsung, Title: Discussion on PDCP data volume calculation during PDCP Duplication.
R2-1712965 3GPP TSG-RAN WG2 Meeting #100, Reno, USA, Nov. 27-Dec. 1, 2017, Source: Institute for Information Industry (III), Title: Discussion on Uplink Packet Duplication.
R2-1713004 3GPP TSG-RAN WG2 Meeting #100, Reno, USA, Nov. 27-Dec. 1, 2017, Source: vivo, Title: Layer-2 behaviors of PDCP duplication deactivation.
R2-1713005 3GPP TSG-RAN WG2 Meeting #100, Reno, USA, Nov. 27-Dec. 1, 2017, Source: vivo, Title: PDCP duplication impacts on LCP.
R2-1713006 3GPP TSG-RAN WG2 Meeting #100, Reno, USA, Nov. 27-Dec. 1, 2017, Source: vivo, Title: Discussion on the PDCP data volume.
R2-1713009 3GPP TSG-RAN WG2 Meeting #100, Reno, USA, Nov. 27-Dec. 1, 2017, Source: vivo, Title: UE layer-2 behaviors at Scell-failure.
R2-1713584 3GPP TSG-RAN WG2 Meeting #100, Reno, USA, Nov. 27-Dec. 1, 2017, Source: Qualcomm Incorporated, Title: PDCP duplication.
R2-1713588 3GPP TSG-RAN WG2 Meeting #100, Reno, USA, Nov. 27-Dec. 1, 2017, Source: Ericsson, Title: Remaining open issues of RLM and RLF in NR.
R2-1713641 3GPP TSG-RAN WG2 Meeting #100, Reno, USA, Nov.r 27-Dec. 1, 2017, Source: ITL, Title: Configuration of PDCP duplication on default DRB.
R2-1713829 3GPP TSG-RAN WG2 Meeting #100, Reno, USA, Nov. 27-Dec. 1, 2017, Source: Samsung, Title: Activation and Deactivation of PDCP Duplication.
R2-1713830 3GPP TSG-RAN WG2 Meeting #100, Reno, USA, Nov. 27-Dec. 1, 2017, Source: Samsung, Title: Discussion on CA Duplication.
R2-1713831 3GPP TSG-RAN WG2 Meeting #100, Reno, USA, Nov. 27-Dec. 1, 2017, Source: Samsung, Title: Initial State of Uplink Packet Duplication.
R2-1713848 3GPP TSG-RAN WG2 Meeting #100, Reno, USA, Nov. 27-Dec. 1, 2017, Source: Samsung, Title: The Necessity of Fast RLF Recovery based on T312 in NR.
R2-1800155 3GPP TSG-RAN WG2 AH, Vancouver, Canada, Jan. 22-26, 2018, Source: OPPO, Title: Discussion on behaviour of ConfiguredGrantTimer.
R2-1800165 3GPP TSG-RAN WG2 AH, Vancouver, Canada, Jan. 22-26, 2018, Source: CATT, Title: UE behavior on configured grant timer upon DCI reception.
R2-1800334 3GPP TSG-RAN WG2 AH, Vancouver, Canada, Jan. 22-26, 2018, Source: Ericsson, Title: SPS and BWP inactivity timer interaction.
R2-1800373 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH, Vancouver, Canada, Jan. 22-26, 2018, Source: Samsung Electronics R&D Institute UK, Title: Corrections to preventing simultaneous Type 1 configured grants on SUL and UL.
R2-1800566 3GPP TSG-RAN WG2 AH, Vancouver, Canada, Jan. 22-26, 2018, Source: LG Electronics Inc., Title: BWP timer restart for DL SPS.
R2-1800586 3GPP TSG-RAN WG2 AH, Vancouver, Canada, Jan. 22-26, 2018, Source: Nokia, Nokia Shanghai Bell, Title: Prioritization between dynamic grant and configured grant.
R2-1800587 3GPP TSG-RAN WG2 AH, Vancouver, Canada, Jan. 22-26, 2018, Source: Nokia, Nokia Shanghai Bell, Title: Correction on prioritization between dynamic grant and configured grant.
R2-1800622 3GPP TSG-RAN WG2 AH, Vancouver, Canada, Jan. 22-26, 2018, Source: Samsung, Title: Correction for SPS and Type-2 Configured Grant Calculation.
R2-1800624 3GPP TSG-RAN WG2 AH, Vancouver, Canada, Jan. 22-26, 2018, Source: Samsung, Title: Impact of Flexible Transmission on Configured Grant Operation.
R2-1800659 3GPP TSG-RAN WG2 AH, Vancouver, Canada, Jan. 22-26, 2018, Source: Samsung, Title: Draft CR for correction on SPS and Type-2 configured grant.
R2-1800661 3GPP TSG-RAN WG2 AH, Vancouver, Canada, Jan. 22-26, 2018, Source: Samsung, Title: Draft CR for flexible configured grant transmission.
R2-1800708 3GPP TSG-RAN WG2 AH, Vancouver, Canada, Jan. 22-26, 2018, Source: Ericsson, Title: Confirmation of Configured UL Grant Type 2 Activation for Multiple Aggregated Cells.
R2-1800709 3GPP TSG-RAN WG2 AH, Vancouver, Canada, Jan. 22-26, 2018, Source: Ericsson, Title: Alignment of terminology for Configured Scheduling and SPS.
R2-1800818 3GPP TSG-RAN WG2 AH, Vancouver, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-162709 3GPP TSG-RAN WG2 Meeting #93bis, Dubrovnik, Croatia, Apr. 11-15, 2016, Source: Beam support in NR.
May 27, 2019—Extended European Search Report—19155025.0.
NTT Docomo, Inc.: "F1 interface: Radio resource configuration management", May 15-19, 2017.
CMCC: "System information generation and delivery in CU-DU split architecture", Aug. 21-25, 2017.
ZTE: "Discussion on the solution for UE Initial Access", Oct. 9-13, 2017.
Feb. 27, 2019—EP Search Report—19151430.6.
May 14, 2017—TP for UE Radio Bearer Management.
NOKIA—May 1, 2010—"Enabling MRO in case of re-establishment request in unprepared eNB".
Apr. 8, 2019—Exended European Search Report—EP 19151473.6.
ZTE—Consideration on the activation or deactivation of duplication—Nov. 17, 2017.

(56) References Cited

OTHER PUBLICATIONS

CATT—Discussion on CA based PDCP Duplication—Sep. 30, 2017.
3GPP Standard—"3rd Generation Partnership Project: Technical Specificaiton Group Radio Access Network; NG- RAN; F1 application protocol (F1AP) (Release 15)"—Dec. 11, 2017.
3GPP Standard—"3rd Generation Partnership Project; Technical Specification Group Radio Access Network NR Radio Resource Control (RRC) protocol specification (Release 15)"—Jan. 4, 2018.
Aug. 6, 2019—European Extended Search Report—EP 19157448.2.
3GPP TSG-RAN WG2 #100: "Discussion on Inter-nodeRRC container", Dec. 1, 2017.
3GPP TSG-RAN Meeting #76: "Miscellaneous general corrections and clarifications resulting from ASN. 1 review", Jun. 5, 2017.
R1-1704159 3GPP TSG-RAN WG2 Meeting #98, Hangzhou, China, May 15-19, 2017, Source: Samsung, Title: Random Access Response in NR.
R1-1704672 3GPP TSG-RAN WG2 Meeting #98, Hangzhou, China, May 15-19, 2017, Source: ZTE, Title: Consideration on the 4-step random access procedure.
R2-1704901 3GPP TSG-RAN WG2 Meeting #98, Hangzhou, China, May 15-19, 2017, Source: Qualcomm Incorporated, Title: Prioritized random access in NR.
R3-172102 3GPP TSG-RAN3 NR AdHoc Meeting, Qingdao, China, Jun. 27-29, 2017, Source: China Telecom, Title: On the preliminary transport comparison between F1-C and F1-U protocols.
R3-172176 3GPP TSG-RAN3 NR AdHoc Meeting, Qingdao, China, Jun. 27-29, 2017, Source: Huawei, Title: F1AP procedures for RRC Connection Setup.
R3-172178 3GPP TSG-RAN3 NR AdHoc Meeting, Qingdao, China, Jun. 27-29, 2017, Source: Huawei, Title: TP on Transmitting RRC Connection Setup message over F1 to 38.470.
R3-172198 3GPP TSG-RAN3 NR AdHoc Meeting, Qingdao, China, Jun. 27-29, 2017, Source: Huawei, Title: Discussions on F1 interface management.
R3-172199 3GPP TSG-RAN3 NR AdHoc Meeting, Qingdao, China, Jun. 27-29, 2017, Source: Huawei, Title: TP on F1 interface management to 38.470.
R3-172200 3GPP TSG-RAN3 NR AdHoc Meeting, Qingdao, China, Jun. 27-29, 2017, Source: Huawei, HiSilicon, Title: TP on F1 interface management procedures to 38.473.
R3-172209 3GPP TSG-RAN3 NR AdHoc Meeting, Qingdao, China, Jun. 27-29, 2017, Source: Chinatelecom, Title: gNB and gNB-CU ID discussion.
R3-172218 3GPP TSG-RAN3 NR AdHoc Meeting, Qingdao, China, Jun. 27-29, 2017, Source: CATT, Title: Discussion on the F1AP functions necessary for Option 3.
R3-172244 3GPP TSG-RAN3 NR AdHoc Meeting, Qingdao, China, Jun. 27-29, 2017, Source: Samsung, KT, SK Telecom, Title: Centralized retransmission of lost PDUs.
R3-172250 3GPP TSG-RAN3 NR AdHoc Meeting, Qingdao, China, Jun. 27-29, 2017, Source: Samsung, KT, SK Telecom, Title: On-demand SI support in high layer functional split.
R3-172251 3GPP TSG-RAN3 NR AdHoc Meeting, Qingdao, China, Jun. 27-29, 2017, Source: Samsung, KT, SK Telecom, Title: Stage 2 text proposal for TS38.401 on mechanism of centralized retransmission of lost PDUs.
R3-172256 3GPP TSG-RAN3 NR AdHoc Meeting, Qingdao, China, Jun. 27-29, 2017, Source: Samsung, KT, SK Telecom, Title: Stage 2 text proposal for TS38.401 on supporting on-demand SI.
R3-172266 3GPP TSG-RAN3 NR AdHoc Meeting, Qingdao, China, Jun. 27-29, 2017, Source: LG Electronics Inc., Title: Issue on C-RNTI allocation for RRC connection resume.
R3-172309 3GPP TSG-RAN3 NR AdHoc Meeting, Qingdao, China, Jun. 27-29, 2017, Source: Nokia, Alcatel-Lucent Shanghai Bell, Title: Inter-gNB-DU Mobility procedure.
R3-172310 3GPP TSG-RAN3 NR AdHoc Meeting, Qingdao, China, Jun. 27-29, 2017, Source: Nokia, Alcatel-Lucent Shanghai Bell, Title: TP of Inter-gNB-DU Mobility procedure (TS 38.401).
R3-172321 3GPP TSG-RAN3 NR AdHoc Meeting, Qingdao, China, Jun. 27-29, 2017, Source: Nokia, Alcatel-Lucent Shanghai Bell, Title: Retransmission procedure in radio link outage.
R3-172322 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.401).
R3-172323 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.475).
R3-172324 3GPP TSG-RAN3 NR AdHoc Meeting, Qingdao, China, Jun. 27-29, 2017, Source: Nokia, Title: [Draft] LS on retransmission procedure in radio link outage.
R3-172333 3GPP TSG-RAN3 NR AdHoc Meeting, Qingdao, China, Jun. 27-29, 2017, Source: Nokia, Alcatel-Lucent Shanghai Bell, Title: UE Initial Access Procedure.
R3-172334 3GPP TSG-RAN3 NR AdHoc Meeting, Qingdao, China, Jun. 27-29, 2017, Source: Nokia, Alcatel-Lucent Shanghai Bell, Title: TP of UE Initial Access procedure (TS 38.401).
R3-172342 3GPP TSG-RAN3 NR AdHoc Meeting, Qingdao, China, Jun. 27-29, 2017, Source: LG Electronics Inc., Title: Consideration on C-RNTI during initial UE access.
R3-172343 3GPP TSG-RAN3 NR AdHoc Meeting, Qingdao, China, Jun. 27-29, 2017, Source: LG Electronics Inc., Title: TP for consideration on C-RNTI during initial UE access.
R3-172344 3GPP TSG-RAN3 NR AdHoc Meeting, Qingdao, China, Jun. 27-29, 2017, Source: LG Electronics Inc., Title: TP for consideration on C-RNTI during initial UE access.
R3-172345 3GPP TSG-RAN3 NR AdHoc Meeting, Qingdao, China, Jun. 27-29, 2017, Source: ZTE, Title: RRC message transmission over F1 interface for TS 38.401.
R3-172346 3GPP TSG-RAN3 NR AdHoc Meeting, Qingdao, China, Jun. 27-29, 2017, Source: ZTE, Title: RRC message transmission over F1 interface for TS 38.470.
R3-172347 3GPP TSG-RAN3 NR AdHoc Meeting, Qingdao, China, Jun. 27-29, 2017, Source: ZTE, Title: RRC message transmission over F1 interface for TS 38.473.
R3-172356 3GPP TSG-RAN3 NR AdHoc Meeting, Qingdao, China, Jun. 27-29, 2017, Source: ZTE, China Telecom, Title: Discussion on flow control over F1-U.
R3-172357 3GPP TSG-RAN3 NR AdHoc Meeting, Qingdao, China, Jun. 27-29, 2017, Source: ZTE, Title: Update on flow control over F1 interface for TS 38.401.
R3-172358 3GPP TSG-RAN3 NR AdHoc Meeting, Qingdao, China, Jun. 27-29, 2017, Source: ZTE, Title: Flow control over F1 interface for TS 38.475.
R3-172399 3GPP TSG-RAN3 NR AdHoc Meeting, Qingdao, China, Jun. 27-29, 2017, Source: NEC, Title: How many gNB-DUs can be operated by one gNB-CU.
R2-1800898 3GPP TSG-RAN WG2 AH, Vancouver, Canada, Jan. 22-26, 2018, Source: vivo, Title: Text proposal for repetition of the configured grant.
R2-1800902 3GPP TSG-RAN WG2 AH, Vancouver, Canada, Jan. 22-26, 2018, Source: vivo, Title: Collision between dynamic grant and configured grant.
R2-1800925 3GPP TSG-RAN WG2 AH, Vancouver, Canada, Jan. 22-26, 2018, Source: Intel Corporation, Title: URLLC exception for dynamic grant.
R2-1801032 3GPP TSG-RAN WG2 AH, Vancouver, Canada, Jan. 22-26, 2018, Source: Huawei, HiSilicon, Title: Leftovers of HARQ Transmission with Configured Grant Timer.
R2-1801033 3GPP TSG-RAN WG2 AH, Vancouver, Canada, Jan. 22-26, 2018, Source: Huawei, HiSilicon, Title: Corrections on HARQ Transmission with ConfiguredGrantTimer in TS 38.321.
R2-1801034 3GPP TSG-RAN WG2 AH, Vancouver, Canada, Jan. 22-26, 2018, Source: Huawei, HiSilicon, Title: Corrections on Retransmission for Configured Grant.
R2-1801035 3GPP TSG-RAN WG2 AH, Vancouver, Canada, Jan. 22-26, 2018, Source: Huawei, HiSilicon, Title: Corrections on calculations of transmission occasions of configured grant.

(56) References Cited

OTHER PUBLICATIONS

R2-1801036 3GPP TSG-RAN WG2 AH, Vancouver, Canada, Jan. 22-26, 2018, Source: Huawei, HiSilicon, Title: Further discussion on configuration of ConfiguredGrantTimer.
R2-1801037 3GPP TSG-RAN WG2 AH, Vancouver, Canada, Jan. 22-26, 2018, Source: Huawei, HiSilicon, Title: Corrections on flexible occasion of initial transmission and repetition for configured grant.
R2-1801038 3GPP TSG-RAN WG2 AH, Vancouver, Canada, Jan. 22-26, 2018, Source: Huawei, HiSilicon, Title: Impact of SUL on configured grant.
R2-1801039 3GPP TSG-RAN WG2 AH, Vancouver, Canada, Jan. 22-26, 2018, Source: Huawei, HiSilicon, Title: Configured grant Type1 operation with BWP switch.
R2-1801052 3GPP TSG-RAN WG2 AH, Vancouver, Canada, Jan. 22-26, 2018, Source: LG Electronics Inc., Title: Correction on ConfiguredGrantTimer.
R2-1801063 3GPP TSG-RAN WG2 AH, Vancouver, Canada, Jan. 22-26, 2018, Source: LG Electronics Inc., Title: Repetition transmission on configured uplink grant.
R2-1801081 3GPP TSG-RAN WG2 AH, Vancouver, Canada, Jan. 22-26, 2018, Source: ZTE, Title: Consideration on the configured grant for supporting SUL.
R2-1801125 3GPP TSG-RAN WG2 AH, Vancouver, Canada, Jan. 22-26, 2018, Source: InterDigital Inc., Title: Correction on override of configured assignment by dynamic assignment.
R2-1801126 3GPP TSG-RAN WG2 AH, Vancouver, Canada, Jan. 22-26, 2018, Source: InterDigital Inc., Title: Override of configured grant by dynamic grant in case of URLLC.
R2-1801239 3GPP TSG-RAN WG2 AH, Vancouver, Canada, Jan. 22-26, 2018, Source: LG Electronics Inc., Title: Prioritization between dynamic grant and configured grant for URLLC.
R2-1801277 3GPP TSG-RAN WG2 AH, Vancouver, Canada, Jan. 22-26, 2018, Source: LG Electronics Inc., Title: Restart condition of sCellDeactivationTimer with skipping operation.
R2-1801371 3GPP TSG-RAN WG2 AH, Vancouver, Canada, Jan. 22-26, 2018, Source: Samsung, Title: Remaining Issue on SPS/Grant-free: How to Handle Dynamic Grant Coinciding with Configured Grant.
R2-1801475 3GPP TSG-RAN WG2 AH, Vancouver, Canada, Jan. 22-26, 2018, Source: LG Electronics Inc., Title: Prevention of using CS grant.
R3-174356 3GPP TSG-RAN WG3 Meeting #98, Reno, USA, Nov. 27-Dec. 1, 2017, Source: Nokia, Nokia Shanghai Bell, Title: Transport layer protocol for F1-C.
R3-174357 3GPP TSG-RAN WG3 Meeting #98, Reno, USA, Nov. 27-Dec. 1, 2017, Source: Nokia, Nokia Shanghai Bell, Title: Transport layer protocol for F1-U.
R3-174359 3GPP TSG-RAN WG3 Meeting #98, Reno, USA, Nov. 27-Dec. 1, 2017, Source: Nokia, Nokia Shanghai Bell, Title: UE Initial Access procedure.
R3-174360 3GPP TSG-RAN WG3 Meeting #98, Reno, USA, Nov. 27-Dec. 1, 2017, Source: Nokia, Nokia Shanghai Bell, KT, Title: FFS resolution in intra-gNB-CU mobility.
R3-174361 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.470).
R3-174362 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.473).
R3-174364 3GPP TSG-RAN WG3 Meeting #98, Reno, USA, Nov. 27-Dec. 1, 2017, Source: Nokia, Nokia Shanghai Bell, Title: FFS resolution in Centralized Retransmission.
R3-174396 3GPP TSG-RAN WG3 Meeting #98, Reno, USA, Nov. 27-Dec. 1, 2017, Source: ZTE, China Telecom, Title: Solution for UE Initial Access.
R3-174397 3GPP TSG-RAN WG3 Meeting #98, Reno, USA, Nov. 27-Dec. 1, 2017, Source: ZTE, Title: Update on UE Context Management for TS38.470.
R3-174398 3GPP TSG-RAN WG3 Meeting #98, Reno, USA, Nov. 27-Dec. 1, 2017, Source: ZTE, Title: Update on UE Context Management for TS38.473.
R3-174405 3GPP TSG-RAN WG3 Meeting #98, Reno, USA, Nov. 27-Dec. 1, 2017, Source: ZTE, China Unicom, Title: Remaining Issues of Mobility Aspects.
R3-174408 3GPP TSG-RAN WG3 Meeting #98, Reno, USA, Nov. 27-Dec. 1, 2017, Source: ZTE, Title: Consideration on the activation or deactivation of duplication.
R3-174409 3GPP TSG-RAN WG3 Meeting #98, Reno, USA, Nov. 27-Dec. 1, 2017, Source: ZTE, China Telecom, Title: Remaining Issues of Centralized Retransmissions.
R3-174410 3GPP TSG-RAN WG3 Meeting #98, Reno, USA, Nov. 27-Dec. 1, 2017, Source: ZTE, Title: TP for Centralized Retransmissions kept in TS38.475.
R3-174411 3GPP TSG-RAN WG3 Meeting #98, Reno, USA, Nov. 27-Dec. 1, 2017, Source: ZTE, Title: TP for Centralized Retransmissions kept in TS38.425.
R3-174473 3GPP TSG-RAN WG3 Meeting #98, Reno, USA, Nov. 27-Dec. 1, 2017, Source: Huawei, Title: pCR on open issues for PDCP duplication over F1 to 38.473.
R3-174482 3GPP TSG-RAN WG3 Meeting #98, Reno, USA, Nov. 27-Dec. 1, 2017, Source: Huawei, Title: Further discussions on radio link outage indication.
R3-174533 3GPP TSG-RAN WG3 Meeting #98, Reno, USA, Nov. 27-Dec. 1, 2017, Source: CATT, Title: Discussion on CA based PDCP Duplication.
R3-174535 3GPP TSG-RAN WG3 Meeting #98, Reno, USA, Nov. 27-Dec. 1, 2017, Source: CATT, Title: Discussion on F1 Setup procedure.
R3-174536 3GPP TSG-RAN WG3 Meeting #98, Reno, USA, Nov. 27-Dec. 1, 2017, Source: CATT, Title: Discussion on Initial UE Access.
R3-174537 3GPP TSG-RAN WG3 Meeting #98, Reno, USA, Nov. 27-Dec. 1, 2017, Source: CATT, Title: Introduction of UE Reconfiguration Complete procedure.
R3-174538 3GPP TSG-RAN WG3 Meeting #98, Reno, USA, Nov. 27-Dec. 1, 2017, Source: CATT, Title: TP for 38.473 on UE Reconfiguration Completion procedure.
R3-174542 3GPP TSG-RAN WG3 Meeting #98, Reno, USA, Nov. 27-Dec. 1, 2017, Source: CATT, Title: Discussion on inter-DU mobility without MN involved.
R3-174543 3GPP TSG-RAN WG3 Meeting #98, Reno, USA, Nov. 27-Dec. 1, 2017, Source: CATT, Title: Stage 3 TP on inter-DU mobility without MN involved.
R3-174545 3GPP TSG-RAN WG3 Meeting #98, Reno, USA, Nov. 27-Dec. 1, 2017, Source: CATT, Title: Discussion on the Intral-cell HO and SCG change procedure.
R3-174546 3GPP TSG-RAN WG3 Meeting #98, Reno, USA, Nov. 27-Dec. 1, 2017, Source: CATT, Title: TP for 38.473 on Intra-cell HO and SCG change procedure.
R3-174606 3GPP TSG-RAN WG3 Meeting #98, Reno, USA, Nov. 27-Dec. 1, 2017, Source: Samsung, KT, Title: Initial access procedure considering CU-DU split.
R3-174607 3GPP TSG-RAN WG3 Meeting #98, Reno, USA, Nov. 27-Dec. 1, 2017, Source: Samsung, KT, Title: Stage 3 TP for TS38.473 to reflect initial access procedure.
R3-174608 3GPP TSG-RAN WG3 Meeting #98, Reno, USA, November 27-Dec. 1, 2017, Source: Samsung, KT, Title: RRC connection resume procedure considering CU-DU split.
R3-174609 3GPP TSG-RAN WG3 Meeting #98, Reno, USA, Nov. 27-Dec. 1, 2017, Source: Samsung, KT, Title: RRC connection reestablishment procedure considering CU-DU split.

* cited by examiner

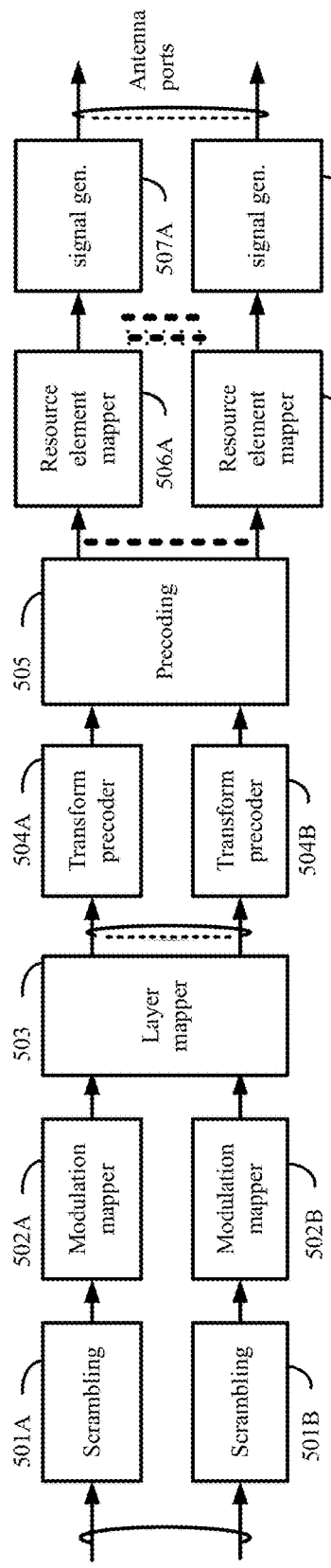
FIG. 5A Example uplink physical channel
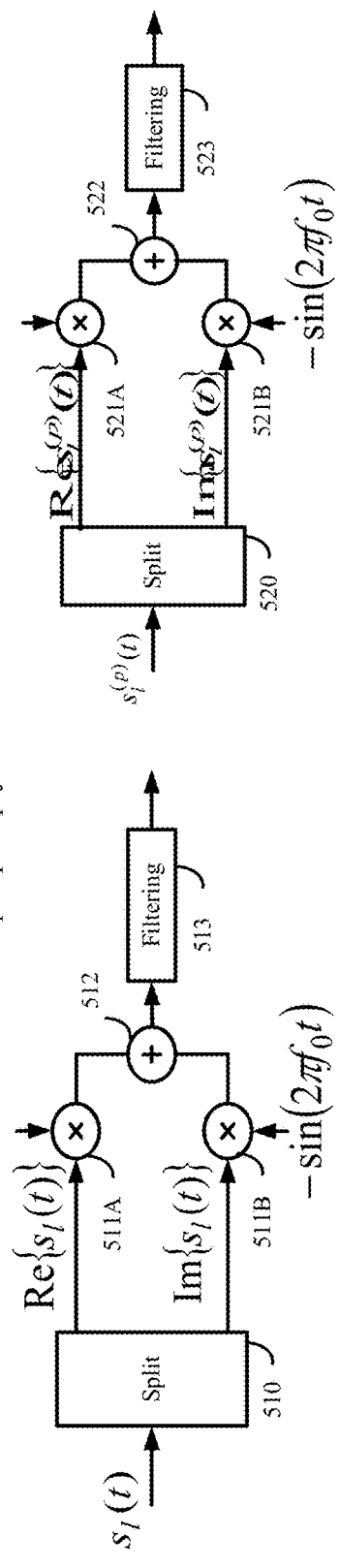
FIG. 5B Example uplink modulation
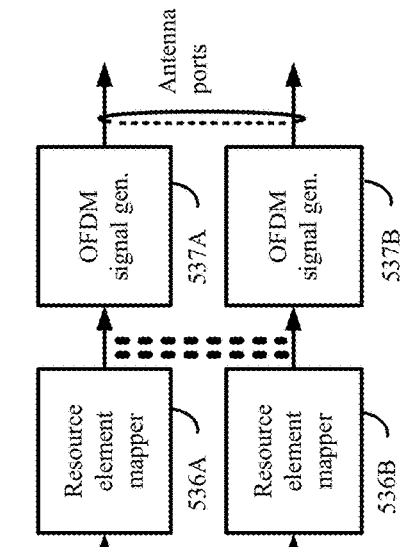
FIG. 5D Example downlink modulation
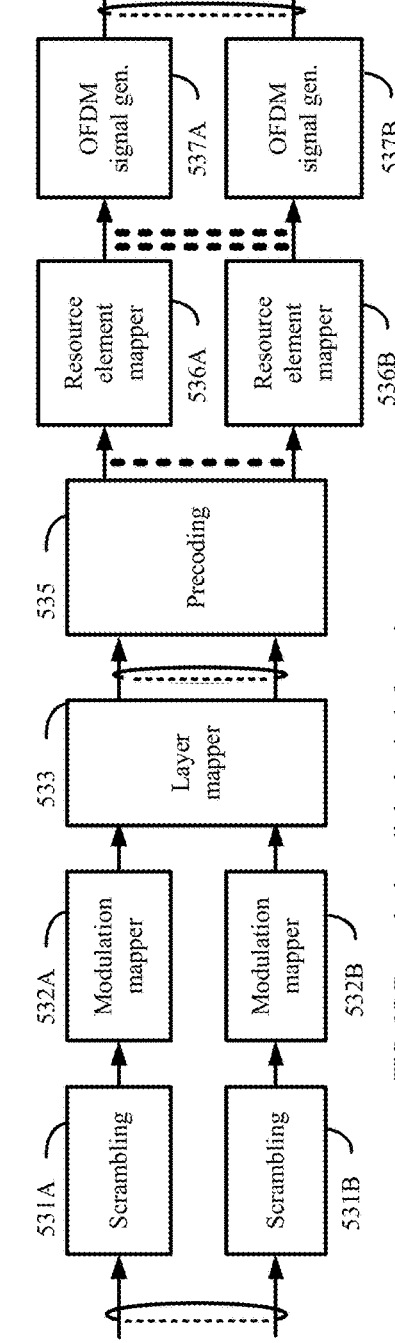
FIG. 5C Example downlink physical channel Example 1: 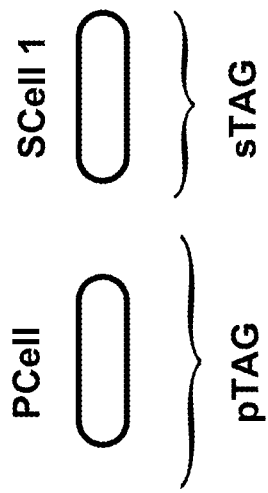
Example 2: 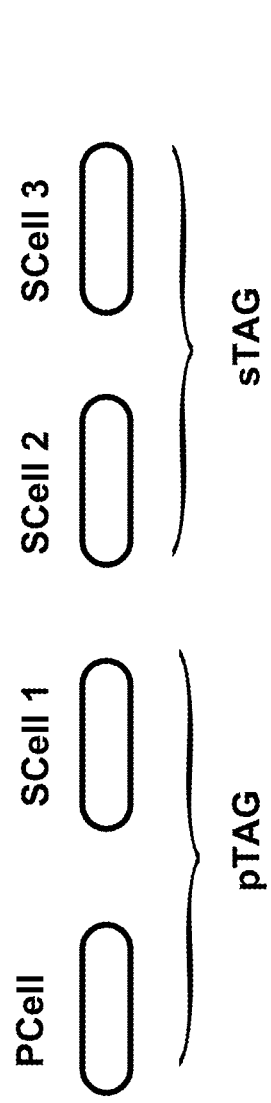
Example 3: 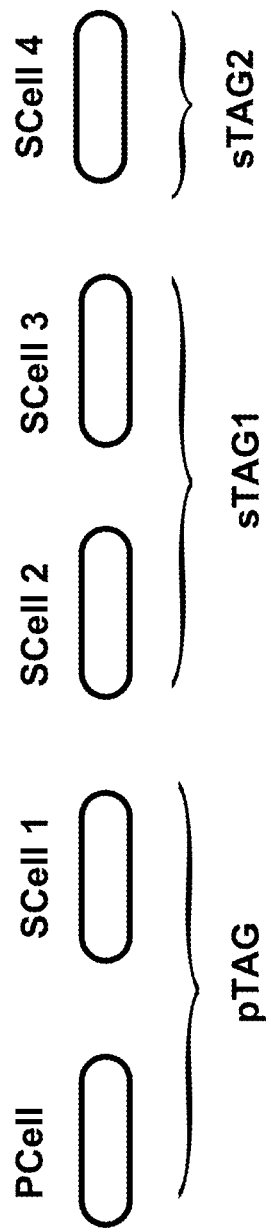
FIG. 8

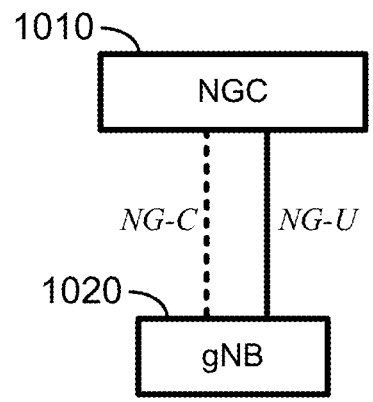
FIG. 10A gNB connected to NGC
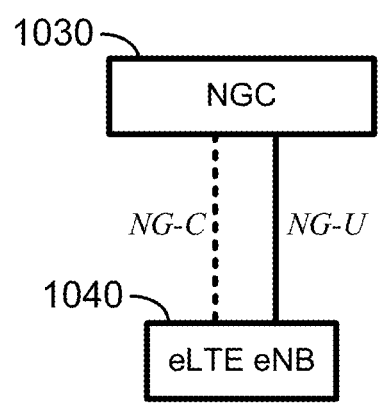
FIG. 10B eLTE eNB connected to NGC

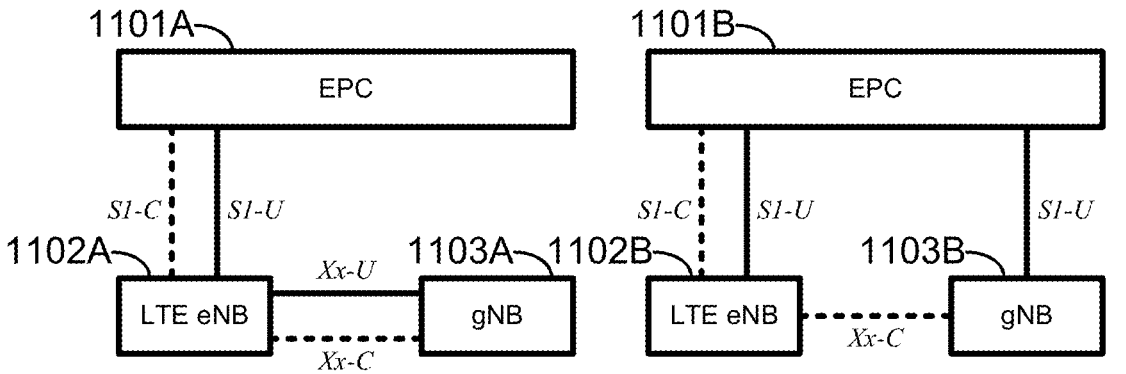

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

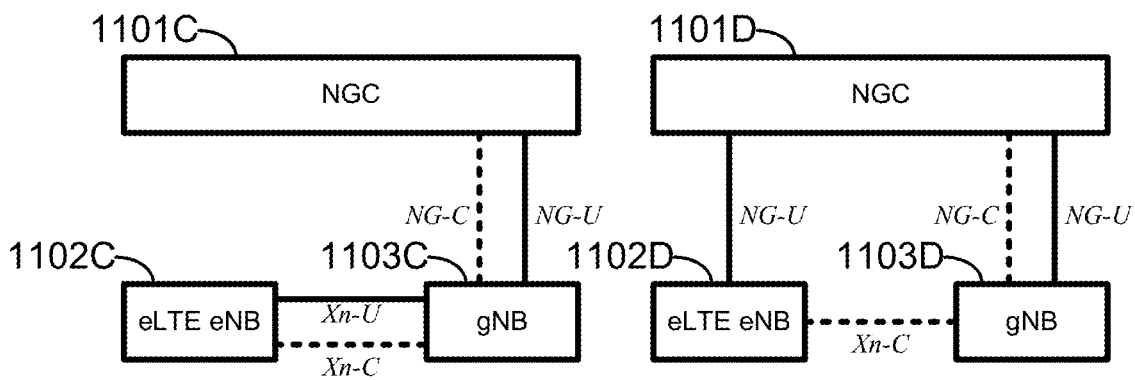

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

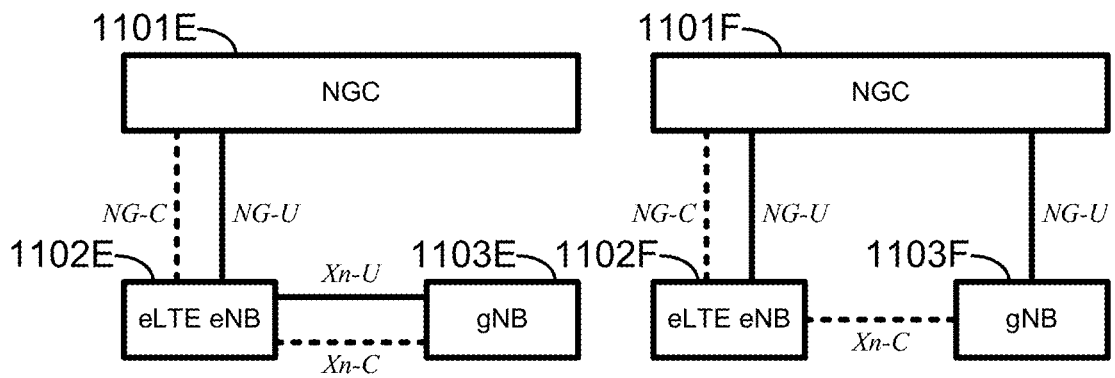

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

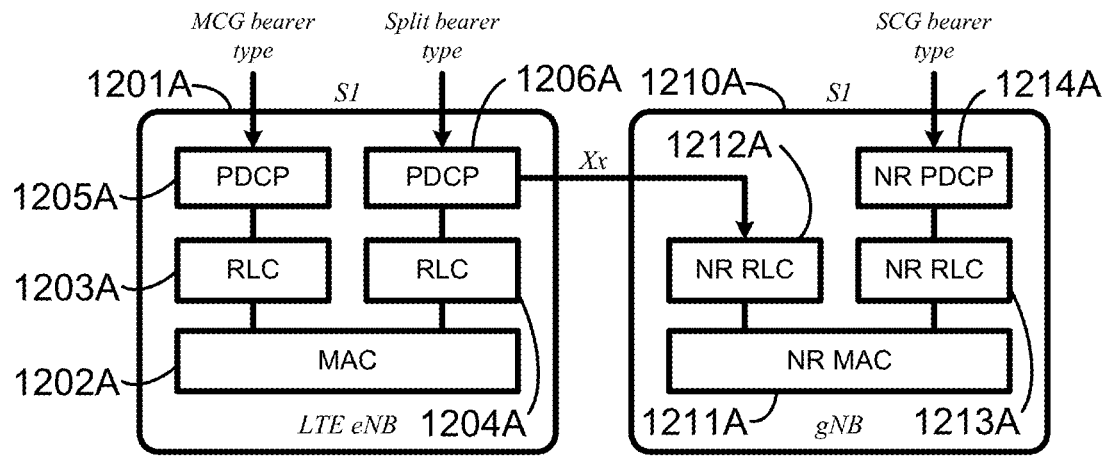
FIG. 12A Radio protocol architecture for split bearer and SCG bearer. LTE eNB connected to EPC with non-standalone gNB.
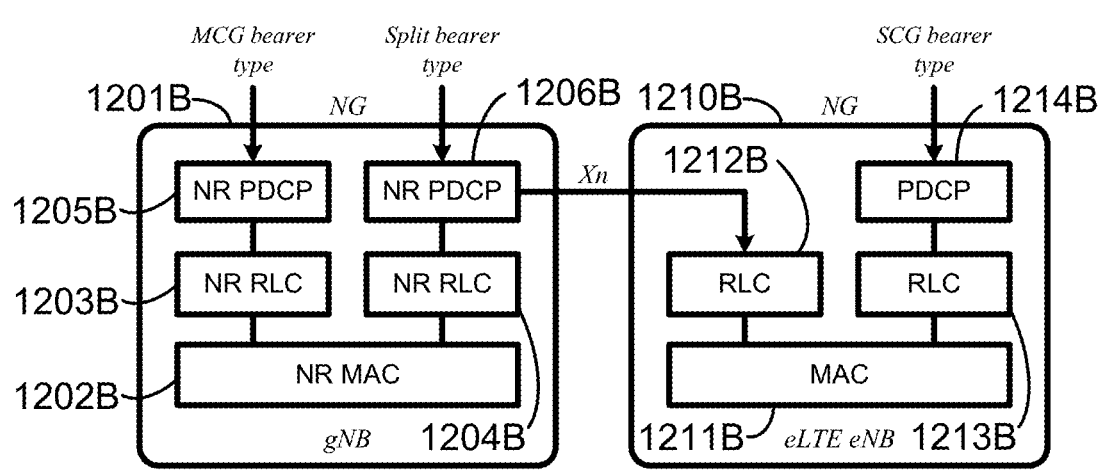
FIG. 12B Radio protocol architecture for split bearer and SCG bearer. gNB connected to NGC with non-standalone eLTE eNB.
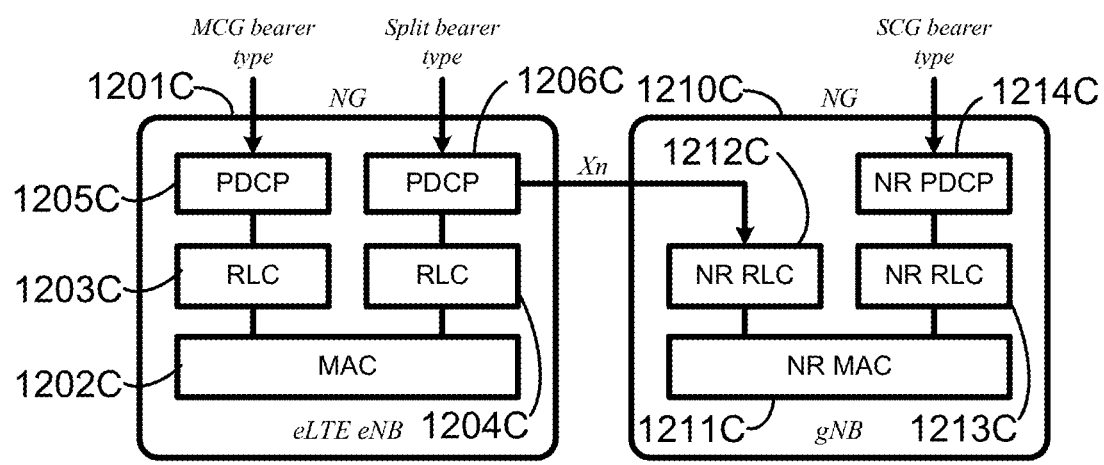
FIG. 12C Radio protocol architecture for split bearer and SCG bearer. eLTE eNB connected to NGC with non-standalone gNB.

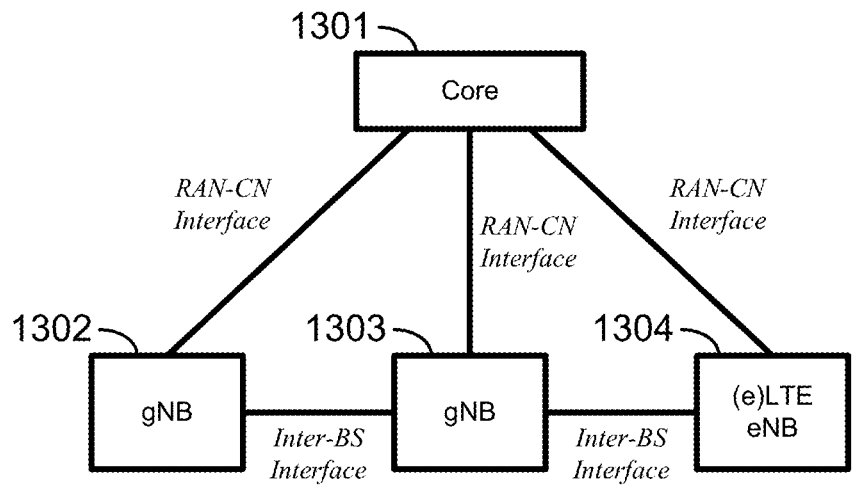
FIG. 13A Non-centralized deployment
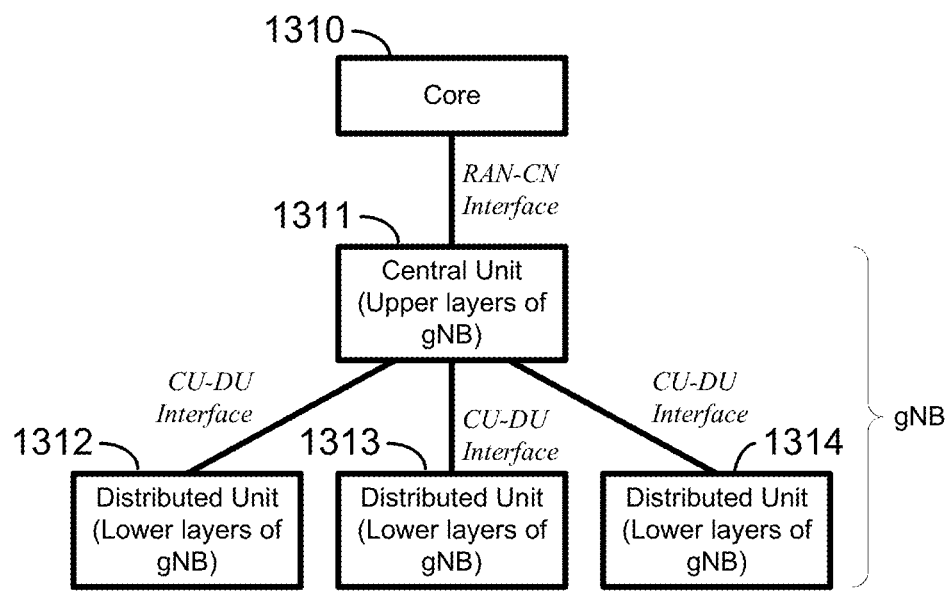
FIG. 13B Centralized deployment FIG. 17B: Contention free RA procedure FIG. 17A: Contention-based RA procedure

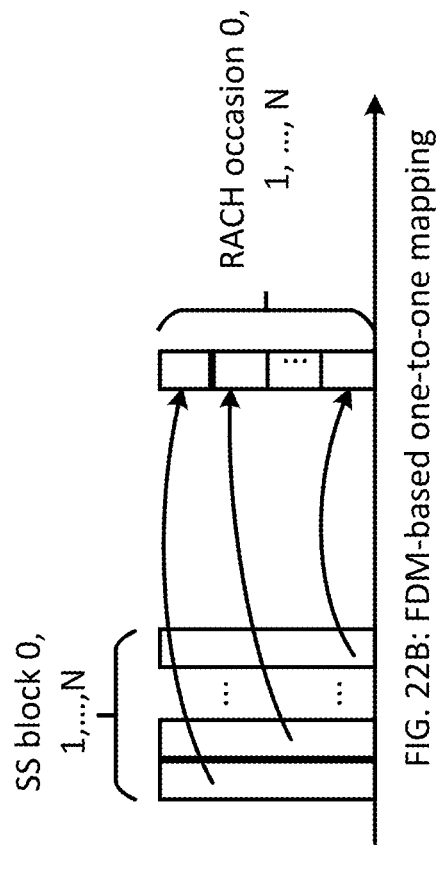
FIG. 22A: TDM-based one-to-one mapping
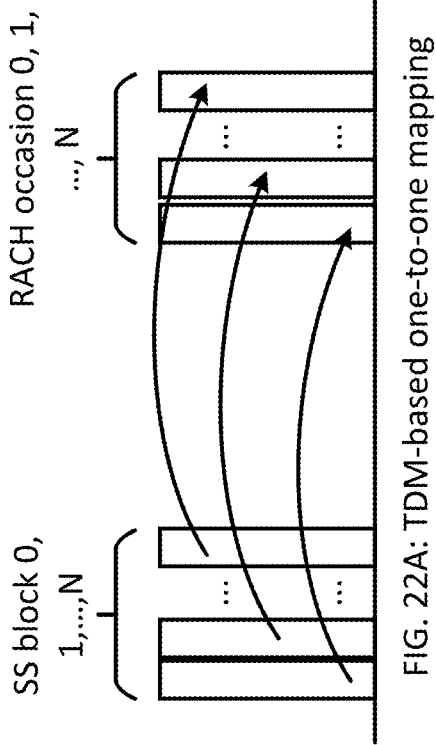
FIG. 22B: FDM-based one-to-one mapping
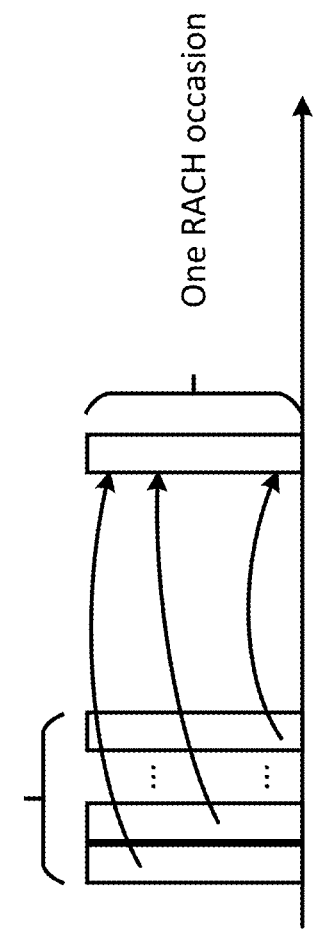
FIG. 22C: multi-to-one mapping

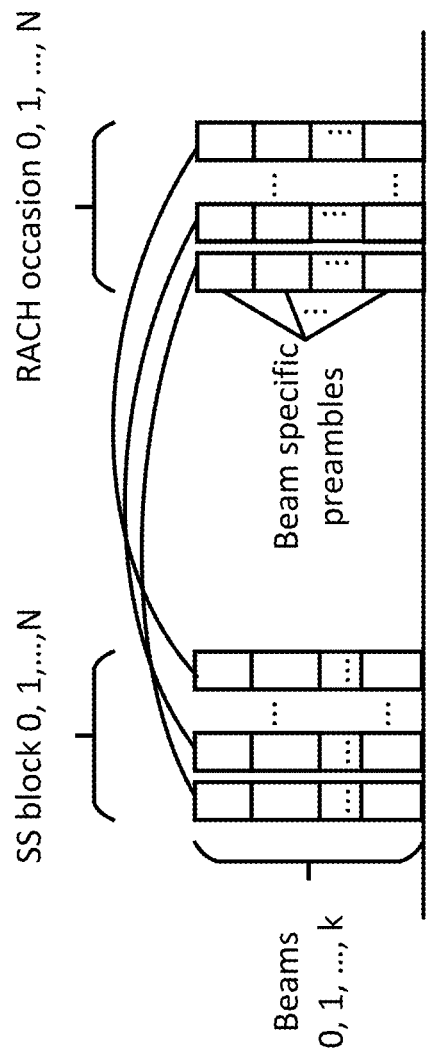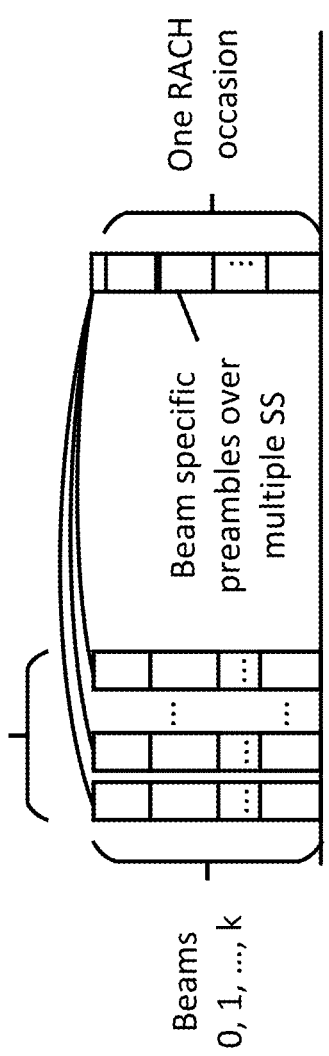
FIG. 25A: one-to-one mapping
FIG. 25B: multi-to-one mapping

CONTENTION FREE RANDOM ACCESS FAILURE

CROSS-REFERENCE TO RELATED APPLICATIONS

This application is a continuation of and claims priority to U.S. patent application Ser. No. 16/102,408, filed Aug. 13, 2018, which claims the benefit of U.S. Provisional Application No. 62/544,157, filed Aug. 11, 2017, each of which is hereby incorporated by reference in its entirety for all purposes.

BACKGROUND

Many operators of wireless networks provide complementary access utilizing unlicensed spectrum. This is exemplified by the large number of operator-deployed Wi-Fi networks and the 3GPP standardization of LTE/WLAN interworking solutions. Unlicensed spectrum may complement licensed spectrum for operators of wireless networks.

SUMMARY

The following summary presents a simplified summary of certain features. The summary is not an extensive overview and is not intended to identify key or critical elements.

Systems, apparatuses, and methods are described for random access of a wireless device. A distributed radio access network (RAN) entity may configure a random access (RA) resource and a RA preamble for a contention free random access of a wireless device. The wireless device that received the configuration information may (or may not) transmit the RA preamble via the RA resource to the distributed RAN entity. The distributed RAN entity may be able to determine whether it detects the RA preamble on the RA resource. The distributed RAN entity may transmit, to a central RAN entity, a RA failure indication if it does not detect the RA preamble on the RA resource from the wireless device. The contention free RA may be for a secondary cell synchronization and/or a handover of the wireless device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployments.

FIG. 22A, FIG. 22B, and FIG. 22C shows examples of time division multiplexing (TDM) and frequency division multiplexing (FDM) mapping of physical RACH (PRACH) resources.

FIG. 25A and FIG. 25B shows examples of mapping beam specific preambles to PRACH occasions.

DETAILED DESCRIPTION

Figure 1:
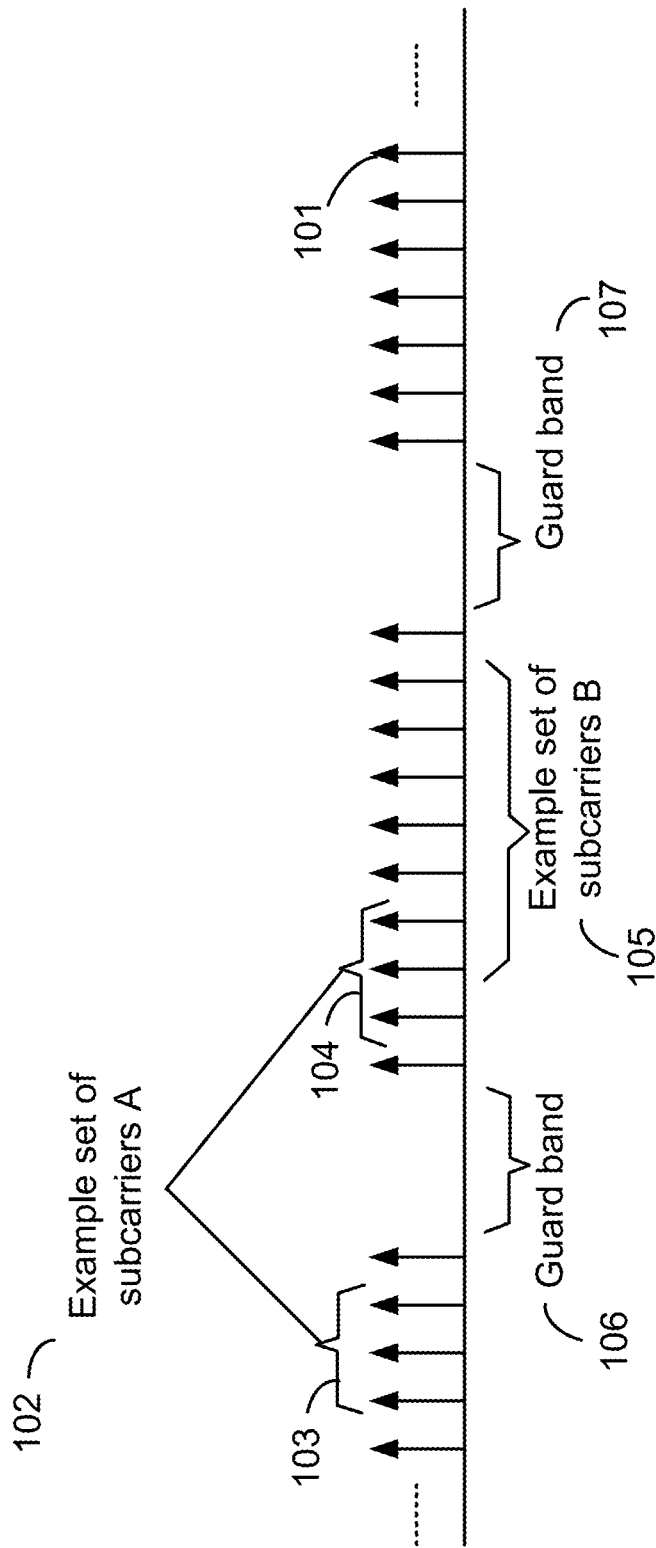
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to contention free random access failure in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays
Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG secondary timing advance group
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may comprise, but are not limited to: CDMA, OFDM, TDMA, Wavelet technologies, and/or the like. Hybrid transmission mechanisms such as TDMA/CDMA, and OFDM/CDMA may also be used. Various modulation schemes may be used for signal transmission in the physical layer. Examples of modulation schemes comprise, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may comprise more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 comprises subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
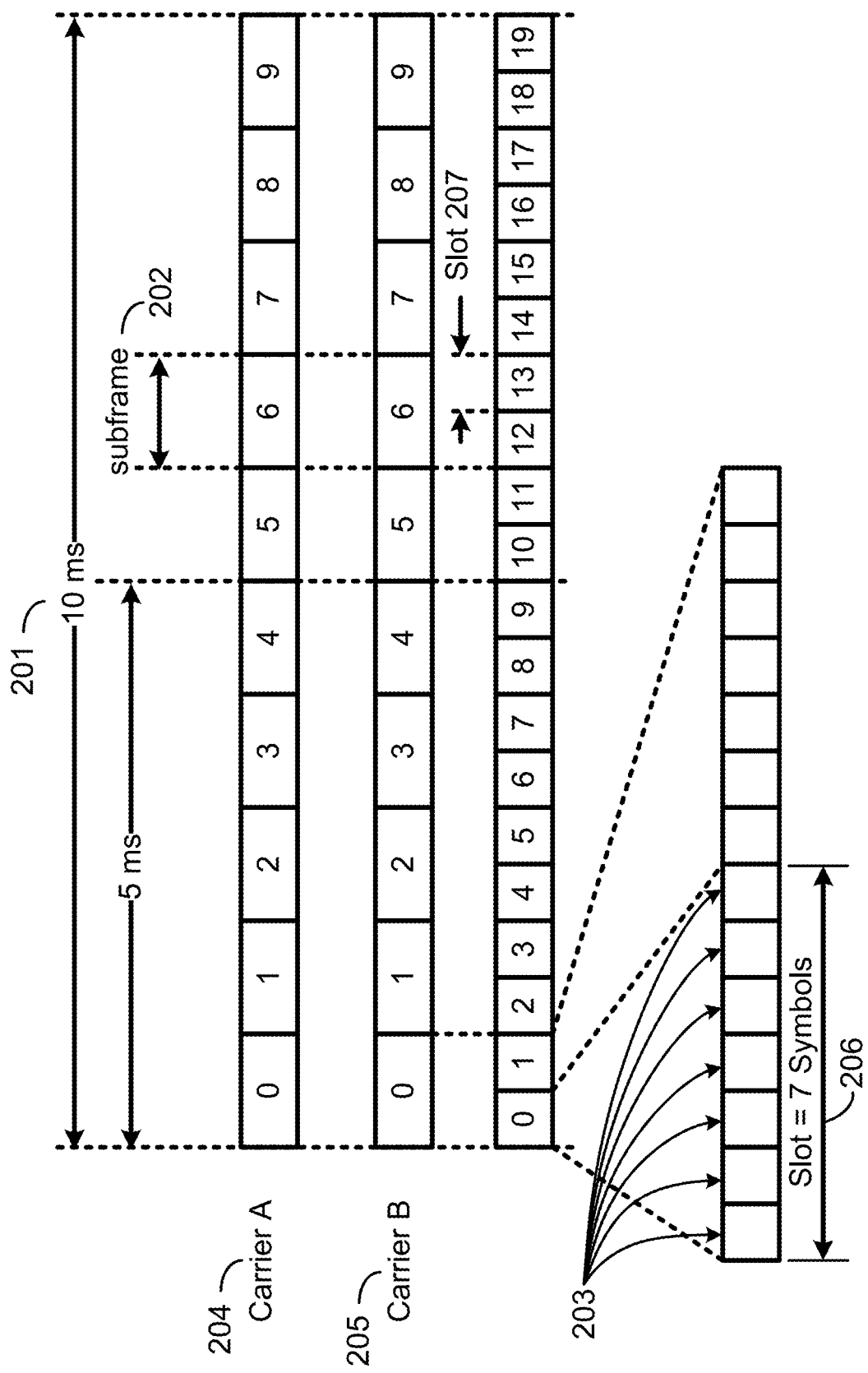
FIG. 2 shows example transmission time and reception time for two carriers in a carrier group.

FIG. 2 shows an example timing arrangement with transmission time and reception time for two carriers. A multicarrier OFDM communication system may comprise one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as comprising 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. A mini-slot may start at an OFDM symbol in a subframe. For example, a mini-slot may have a duration of one or more OFDM symbols. Slot(s) may comprise a plurality of OFDM symbols 203. The number of OFDM symbols 203 in a slot 206 may depend on the cyclic prefix length and subcarrier spacing.

Figure 3:
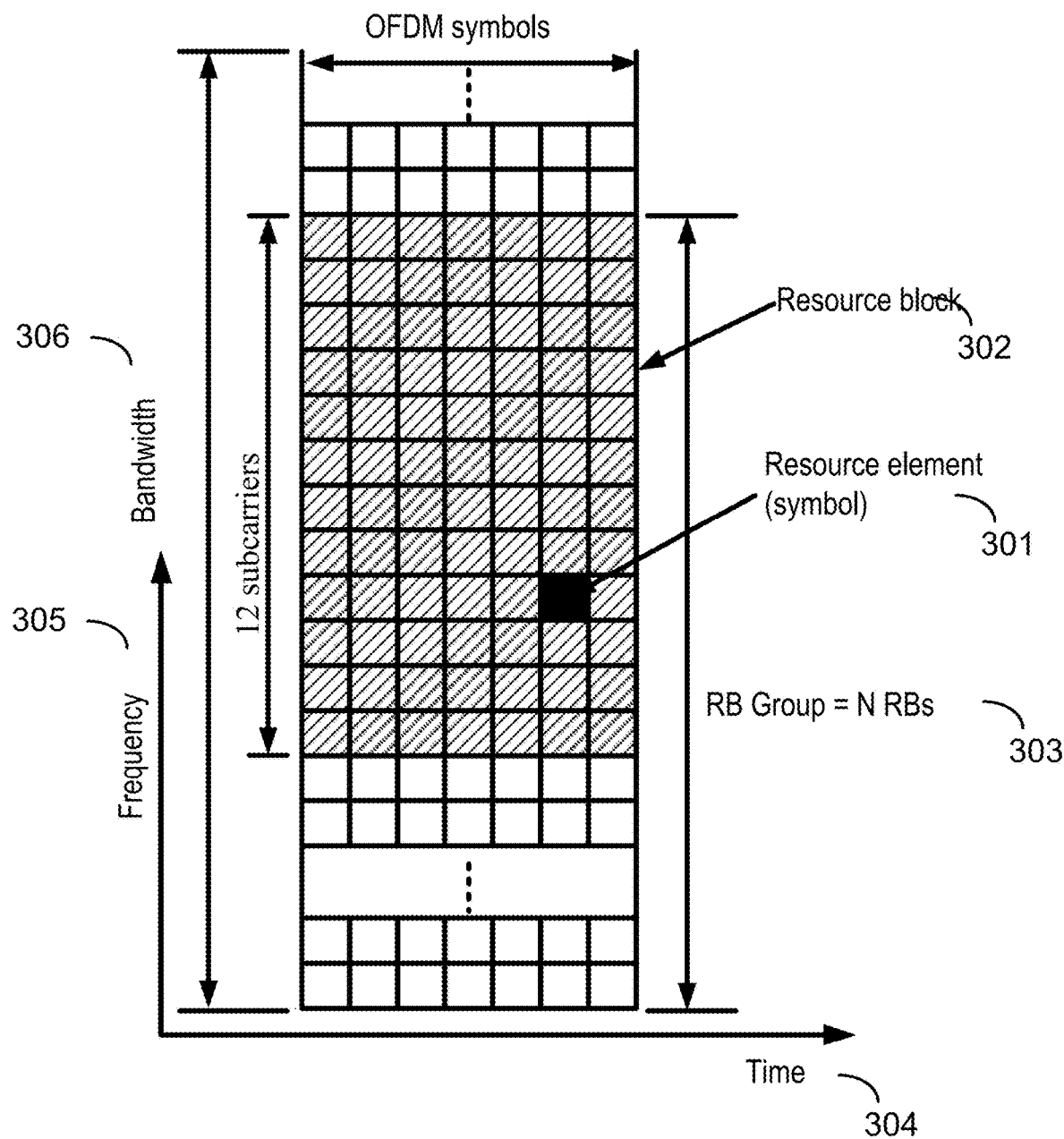
FIG. 3 shows example OFDM radio resources.

FIG. 3 shows an example of OFDM radio resources, including a resource grid structure in time 304 and frequency 305. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
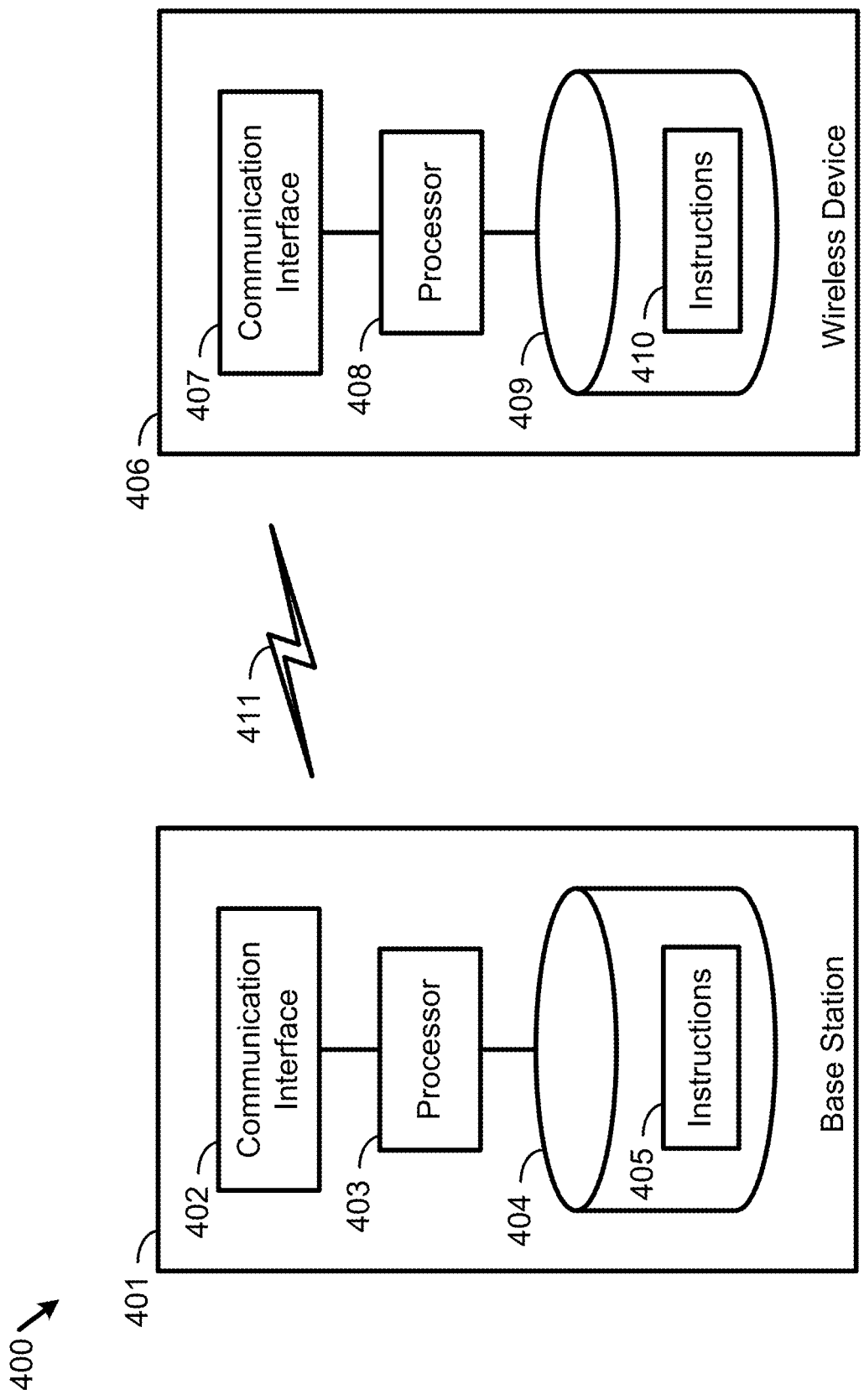
FIG. 4 shows hardware elements of a base station and a wireless device.

FIG. 4 shows hardware elements of a base station 401 and a wireless device 406. A communication network 400 may comprise one or more base station 401 and one or more a wireless device 406. The base station 401 may comprise one or more communication interface 402, one or more processors 403, and one or more set of program code instructions 405 stored in non-transitory memory 404 and executable by the one or more processors 403. The wireless device 406 may comprise one or more communication interface 407, one or more processors 408, and one or more set of program code instructions 410 stored in non-transitory memory 409 and executable by the one or more processors 408. A communication interface 402 in the base station 401 may be configured to engage in communication with a communication interface 407 in the wireless device 406, such as via a communication path that comprises one or more wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may comprise structure and operations of transceiver(s). A transceiver is a device that comprises both a transmitter and receiver. Transceivers may be used in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., a wireless device, base station, eNB, a gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (a gNB) (e.g., 401) providing New Radio (NR) user plane and control plane protocol terminations towards a first a wireless device (e.g., 406). A RAN node may be a next generation evolved Node B (ng-eNB), providing Evolved UMTS Terrestrial Radio Access (E-UTRA) user plane and control plane protocol terminations towards a second a wireless device. The first a wireless device may communicate with a gNB over a Uu interface. The second a wireless device may communicate with a ng-eNB over a Uu interface. Base station 401 may comprise one or more of a gNB, ng-eNB, and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_I-NACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer, or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g., packet filtering, gating, Uplink (UL)/Downlink (DL) rate enforcement, uplink traffic verification (e.g., Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between 3rd Generation Partnership Project (3GPP) access networks, idle mode UE reachability (e.g., control and execution of paging retransmission), registration area management, support of intra-system and inter-system mobility, access authentication, access authorization comprising check of roaming rights, mobility management control (subscription and policies), support of network slicing and/or Session Management Function (SMF) selection An interface may be a hardware interface, a firmware interface, a software interface, and/or a combination thereof. The hardware interface may comprise connectors, wires, electronic devices such as drivers, amplifiers, and/or the like. A software interface may comprise code stored in a memory device to implement protocol(s), protocol layers, communication drivers, device drivers, combinations thereof, and/or the like. A firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a non-operational state, to provide the device with specific characteristics. Terms such as "a control message to cause in a device" may mean that a control message has parameters that may be used to configure specific characteristics in the device, whether the device is in an operational or a non-operational state.

A 5G network may comprise a multitude of base stations, providing a user plane NR PDCP/NR RLC/NR MAC/NR PHY and control plane (NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., a gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may comprise many sectors, for example: 1, 2, 3, 4, or 6 sectors. A base station may comprise many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on the capabilities of a wireless device, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to the SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its a wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g., RRC messages) that may comprise a plurality of configuration parameters for one or more cells. One or more cells may comprise one or more primary cell and one or more secondary cell. An RRC message may be broadcasted or unicasted to the wireless device. Configuration parameters may comprise common parameters and dedicated parameters.

Services and/or functions of a RRC sublayer may comprise one or more of: broadcast of system information related to AS and NAS; paging initiated by 5GC and/or NG-RAN; establishment, maintenance, and/or release of a RRC connection between a wireless device and NG-RAN, which may comprise one or more of addition, modification and release of carrier aggregation; or addition, modification, and/or release of dual connectivity in NR or between E-UTRA and NR. Services and/or functions of a RRC sublayer may further comprise one or more of security functions comprising key management; establishment, configuration, maintenance, and/or release of Signaling Radio Bearers (SRBs) and/or Data Radio Bearers (DRBs); mobility functions which may comprise one or more of a handover (e.g., intra NR mobility or inter-RAT mobility) and a context transfer; or a wireless device cell selection and reselection and control of cell selection and reselection. Services and/or functions of a RRC sublayer may further comprise one or more of QoS management functions; a wireless device measurement configuration and/or reporting; detection of and/or recovery from radio link failure; or NAS message transfer to/from a core network entity (e.g., AMF, Mobility Management Entity (MME)) from/to the wireless device.

A RRC sublayer may support a RRC_Idle state, a RRC_Inactive state and/or a RRC_Connected state for a wireless device. In a RRC_Idle state, a wireless device may perform one or more of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In a RRC_Inactive state, a wireless device may perform one or more of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In a RRC_Idle state of a wireless device, a base station (e.g., NG-RAN) may keep a 5GC-NG-RAN connection (both C/U-planes) for the wireless device; and/or store a UE AS context for the wireless device. In a RRC_Connected state of a wireless device, a base station (e.g., NG-RAN) may perform one or more of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In a RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or on request from a wireless device. A minimum SI may be transmitted via two different downlink channels using different messages (e.g., MasterinformationBlock and SystemInformationBlockType1). The other SI may be transmitted via SystemInformationBlockType2. For a wireless device in a RRC_Connected state, dedicated RRC signaling may be used for the request and delivery of the other SI. For the wireless device in the RRC_Idle state and/or the RRC_Inactive state, the request may trigger a random-access procedure.

A wireless device may send its radio access capability information that may be static. A base station may request what capabilities for a wireless device to send based on band information. If allowed by a network, a temporary capability restriction request may be sent by the wireless device to signal the limited availability of some capabilities (e.g., due to hardware sharing, interference or overheating) to the base station. The base station may confirm or reject the request. The temporary capability restriction may be transparent to 5GC (e.g., static capabilities may be stored in 5GC).

If CA is configured, a wireless device may have a RRC connection with a network. At a RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition, and removal of SCells may be performed by RRC. At intra-NR handover, RRC may also add, remove, or reconfigure SCells for usage with the target PCell. If adding a new SCell, dedicated RRC signaling may be used to send all required system information of the SCell. In connected mode, wireless devices may not need to acquire broadcasted system information directly from the SCells.

A RRC connection reconfiguration procedure may be used to modify a RRC connection, (e.g., to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify a RRC connection. It may convey information for measurement configuration, mobility control, radio resource configuration (e.g., RBs, MAC main configuration and physical channel configuration) comprising any associated dedicated NAS information and security configuration. If the received RRC Connection Reconfiguration message comprises the sCellToReleaseList, the wireless device may perform a SCell release. If the received RRC Connection Reconfiguration message comprises the sCellToAddModList, the wireless device may perform SCell additions or modification.

A RRC connection establishment (or reestablishment, resume) procedure may establish (or re-establish, resume) a RRC connection. a RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may transfer measurement results from a wireless device to NG-RAN. The wireless device may initiate a measurement report procedure, e.g., after successful security activation. A measurement report message may be used to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-TDMA baseband signal, e.g., for each antenna port and/or for the complex-valued physical random access channel (PRACH) baseband signal. For example, the baseband signal, represented as s1(t), may be split, by a signal splitter 510, into real and imaginary components, Re{s1(t)} and Im{s1(t)}, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be used by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 534 configured to perform precoding of the complex-valued modulation symbols on each layer for transmission on the antenna ports; one or more resource element mappers 535A and 535B configured to perform mapping of complex-valued modulation symbols for each antenna port to resource elements; one or more OFDM signal generators 536A and 536B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as s1(p)(t), may be split, by a signal splitter 520, into real and imaginary components, Re{s1(p)(t)} and Im{s1(p)(t)}, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be used by the filtering device 523 prior to transmission.

Figure 6:
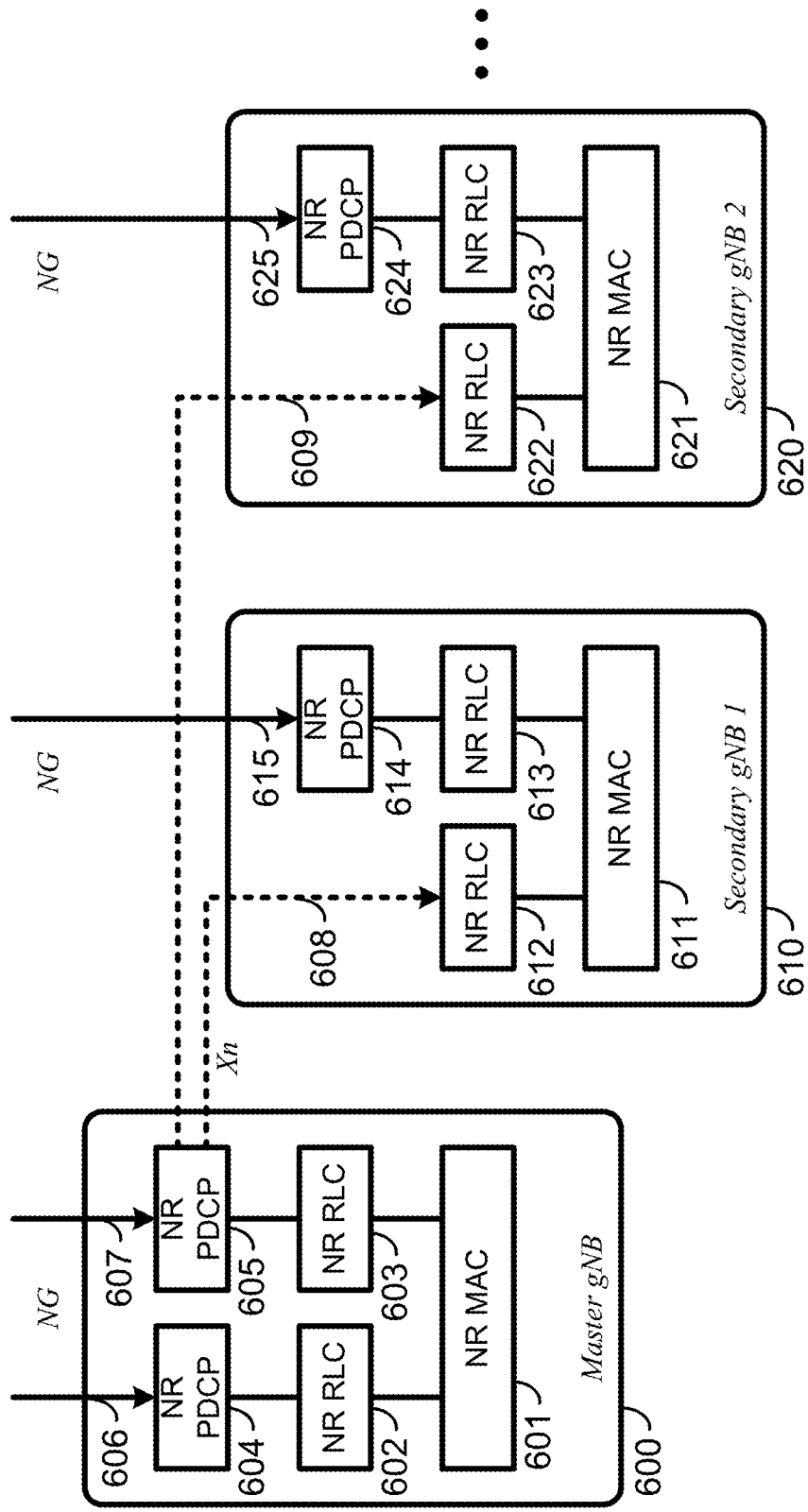
FIG. 6 shows an example protocol structure with multi-connectivity.
Figure 7:
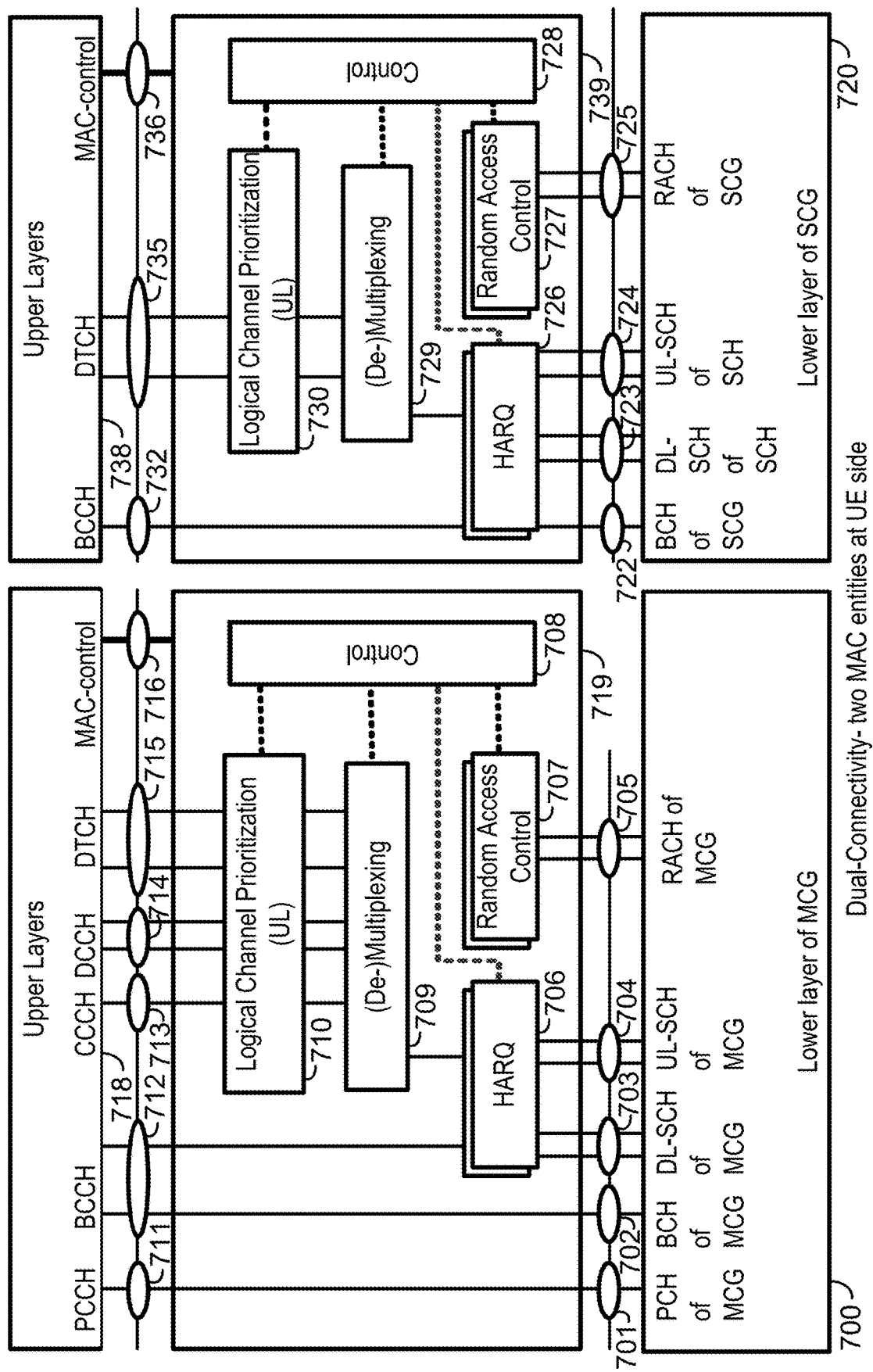
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (Rx/Tx) a wireless device in RRC_CONNECTED may be configured to utilize radio resources provided by multiple schedulers located in multiple gNBs connected via a non-ideal or ideal backhaul over the Xn interface. gNBs involved in multi-connectivity for certain wireless devices may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the master gNB 600 and/or the secondary gNBs 610 and 620 may be a Next Generation (NG) NodeB (a gNB). The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 621, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may comprise Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be comprised but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. A NR RRC may be located in a master gNB and SRBs may be configured as a MCG bearer type and may use the radio resources of the master gNB. Multi-connectivity may have one or more bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

One or more cell in the SCG may have a configured UL component carrier (CC) and one of the UL CCs, e.g., named PSCell (or PCell of SCG, or sometimes called PCell), may be configured with PUCCH resources. If the SCG is configured, there may be one or more SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then a RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer. Like the PCell, a PSCell may not be de-activated. The PSCell may be changed within an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For a wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., which may be for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARQ) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use one or more downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG). In a multiple TAG configuration, one or more TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs comprising a pTAG and one or more sTAGs.

FIG. 8 shows example TAG configurations. In Example 1, a pTAG comprises a PCell, and a sTAG comprises a SCell1. In Example 2, a pTAG comprises a PCell and a SCell1, and a sTAG comprises a SCell2 and a SCell3. In Example 3, a pTAG comprises a PCell and a SCell1, and sTAG1 comprises a SCell2 and a SCell3, and a sTAG2 comprises a SCell4. Up to four TAGs may be supported in a cell group (MCG or SCG), and other example TAG configurations may also be provided. In various examples, structures and operations are described for use with a pTAG and a sTAG. Some of the examples may be used in configurations with multiple sTAGs.

An eNB may initiate a RA procedure, via a PDCCH order, for an activated SCell. The PDCCH order may be sent on a scheduling cell of this SCell. If cross carrier scheduling is configured for a cell, the scheduling cell may be different from the cell that is used for preamble transmission, and the PDCCH order may comprise a SCell index. At least a non-contention based RA procedure may be supported for SCell(s) assigned to sTAG(s).

Figure 9:
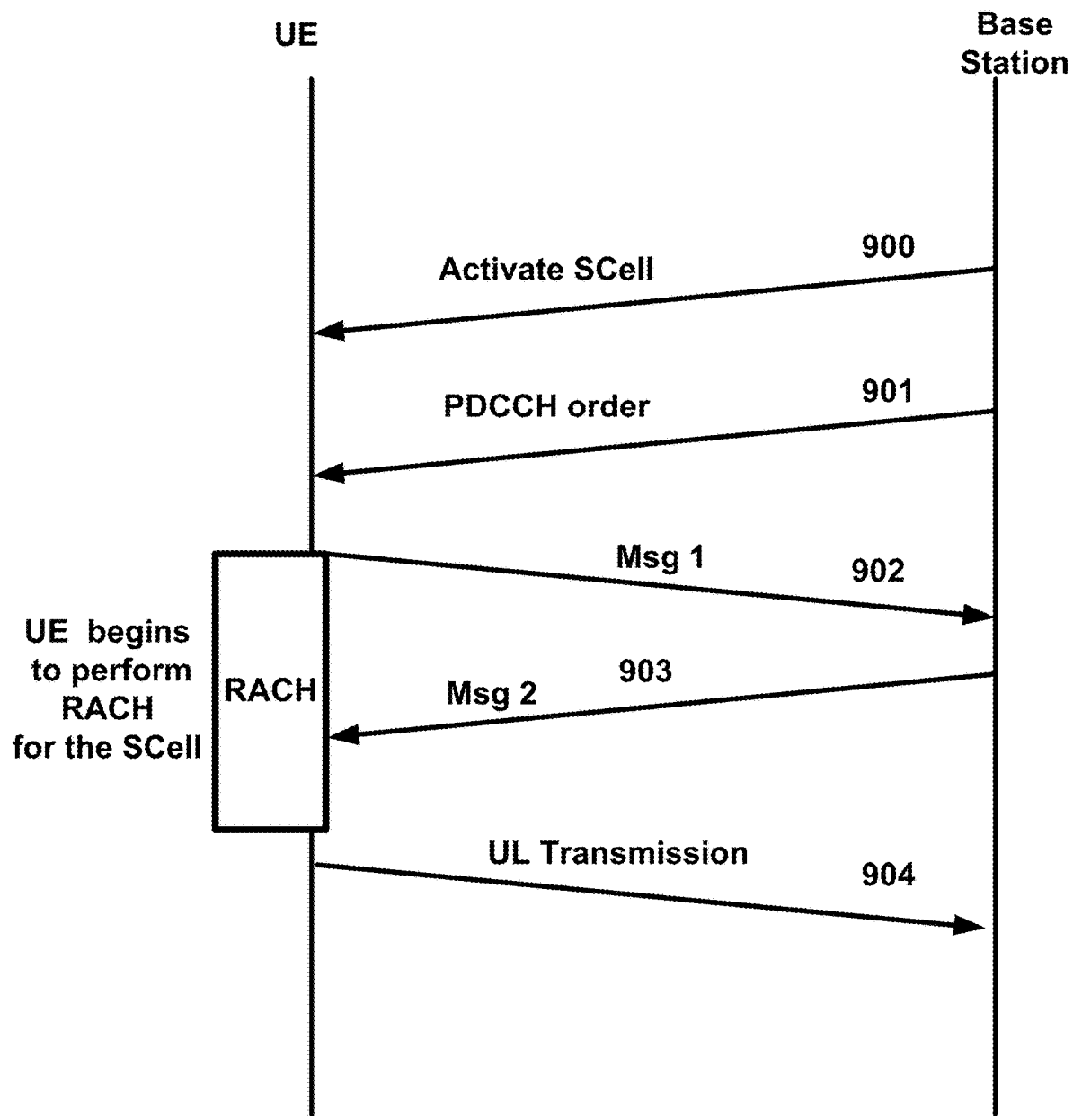
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate a SCell. The base station may also transmit a PDDCH order 901 to the wireless device, which may be transmitted, e.g., after the activation command 900. The wireless device may begin to perform a RACH process for the SCell, which may be initiated after receiving the PDDCH order 901. A wireless device may transmit to the base station (e.g., as part of a RACH process) a preamble 902 (e.g., Msg1), such as a random access preamble (RAP). The preamble 902 may be transmitted based on the PDCCH order 901. The wireless device may transmit the preamble 902 via a SCell belonging to a sTAG. Preamble transmission for SCells may be controlled by a network using PDCCH format 1A. The base station may send a random access response (RAR) 903 (e.g., Msg2 message) to the wireless device. The RAR 903 may be based on the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or based on the wireless device receiving the RAR 903 from the base station. The wireless device may transmit an uplink transmission 904, e.g., after the RACH process. The uplink transmission 904 may comprise uplink packets transmitted via the same SCell used for the preamble 902 transmission.

Initial timing alignment for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs a SCell addition configuration, the related TAG configuration may be configured for the SCell. An eNB may modify the TAG configuration of a SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with a SCell, but rather, the SCell may need to be removed and a new SCell may need to be added with another TAG. If there is a need to move a SCell from a sTAG to a pTAG, one or more RRC message, such as one or more RRC reconfiguration message, may be sent to the wireless device. The one or more RRC message may be sent to the wireless device to reconfigure TAG configurations, e.g., by releasing the SCell and configuring the SCell as a part of the pTAG. If, e.g., a SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on a SCell may be used to offload the PUCCH resource from the PCell. More than one PUCCH may be configured. For example, a PUCCH on a PCell may be configured and another PUCCH on a SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be used, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., a gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (Rx/Tx) a wireless device in a RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for certain wireless devices may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone a gNB 1210A, via an Xx interface between the PDCP 1206A and an NR RLC 1212A. The LTE eNB 1201A may comprise protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may comprise protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may comprise protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may comprise protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone a gNB 1210C, via an Xn interface between the PDCP 1206C and an NR RLC 1212C. The eLTE eNB 1201C may comprise protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may comprise protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have one or more bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

One or more cell in the SCG may have a configured UL CC and one of them, e.g., a PSCell (or the PCell of the SCG, which may also be called a PCell), is configured with PUCCH resources. If the SCG is configured, there may be one or more SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: a RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for a wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., which may be for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployments. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
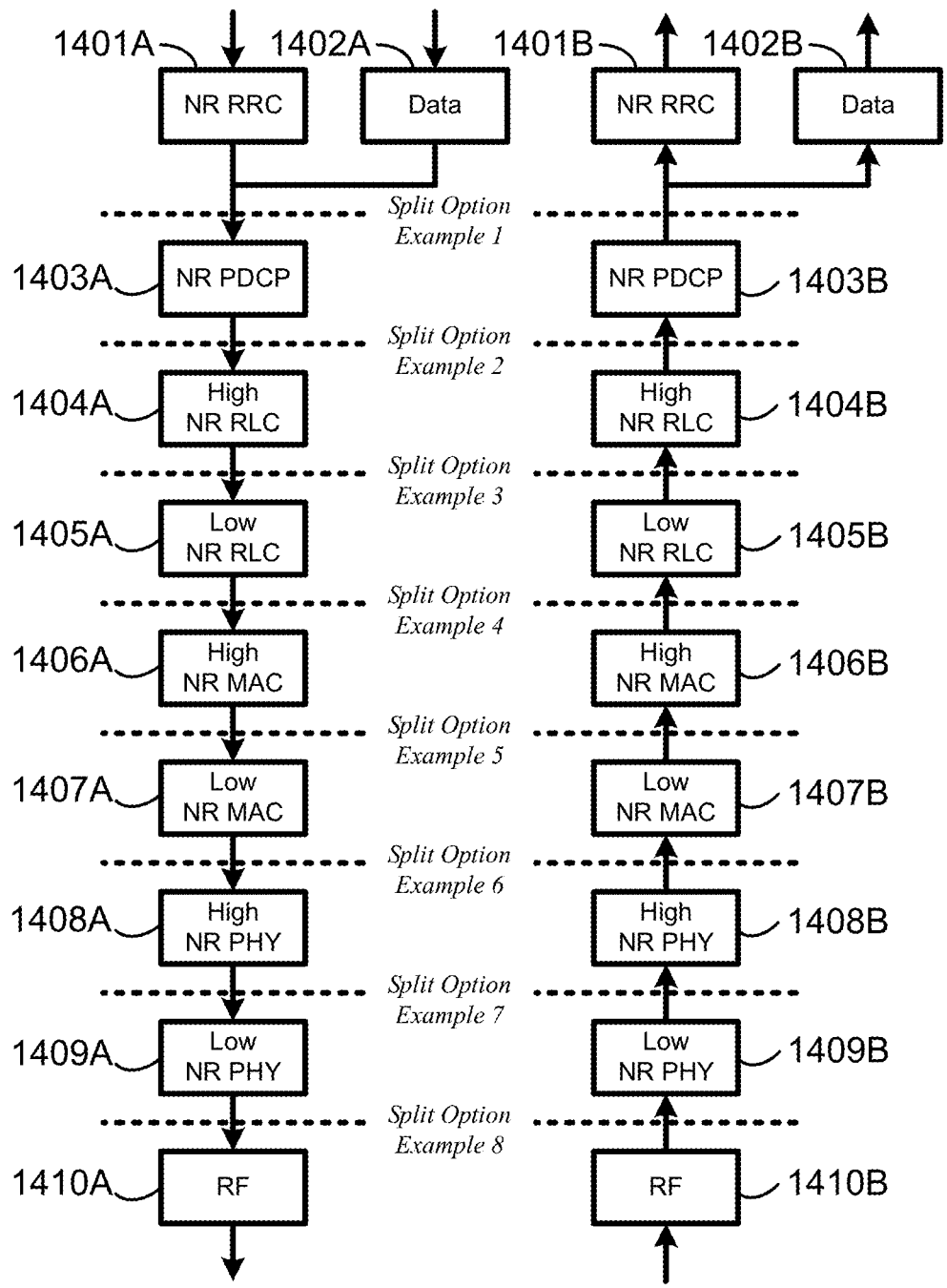
FIG. 14 shows functional split option examples of a centralized gNB deployment.

FIG. 14 shows examples for different functional split options of a centralized a gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per a wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per a wireless device split, a gNB (e.g., a CU and a DU) may provide different split options for different wireless devices. In a per bearer split, different split options may be utilized for different bearer types. In a per slice splice, different split options may be used for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If RAN resource isolation is implemented, a shortage of shared resources in one slice may not cause a violation of a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand Considering user expectations of high data rates along with seamless mobility, it is beneficial that more spectrum be made available for deploying macro cells as well as small cells for communication systems. Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing network efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be utilized for fair sharing of the unlicensed spectrum.

Discontinuous transmission on an unlicensed carrier with limited maximum transmission duration may be allowed. Some of these functions may be supported by one or more signals to be transmitted from the beginning of a discontinuous LAA downlink transmission. Channel reservation may be allowed by the transmission of signals, by an LAA node, e.g., after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and/or frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported. LBT procedures may be employed for fair and friendly coexistence of LAA with other operators and technologies operating in unlicensed spectrum.

LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may include (or may not preclude) static or semi-static setting of the threshold. A Category 4 LBT mechanism or other type of LBT mechanisms may be implemented. For some signals, no LBT procedure may be performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. A random number may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities and/or multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same a wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

A wireless device may transmit, to distributed radio access network (RAN) entity (e.g., a gNB-DU) for a central RAN entity (e.g., a gNB-CU), a measurement report of a cell. The wireless device may receive, from the central RAN entity via the distributed RAN entity, cell configuration parameters of the cell. The wireless device may receive, from the distributed RAN entity, an indication of a random access (RA) resource. The RA resource may comprise an indication of one or more of: a secondary cell synchronization, or a handover of the wireless device. The wireless device may receive the indication of the RA resource via a radio resource control message. The wireless device may receive, from the distributed RAN entity, a first RA preamble of at least one RA preamble. The wireless device may transmit, via the RA resource of the cell, a second RA preamble of the at least one RA preamble. The first RA preamble and the second RA preamble may be a same RA preamble. The distributed RAN entity may transmit, to a central RAN entity, the second RA preamble. The wireless device may receive, from the distributed RAN entity, cell reconfiguration parameters. The wireless device may reconfigure the RA resource. The wireless device may transmit, using the reconfigured RA resource, the at least one RA preamble.

A distributed RAN entity (e.g., a gNB-DU) may receive, from a central RAN entity (e.g., a gNB-CU), a first message comprising cell configuration parameters of a cell. The first message may comprise a radio resource control message. The distributed RAN entity may transmit, to a wireless device, the first message and an indication of a random access (RA) resource of the cell. The distributed RAN entity may monitor the RA resource of the cell, which may comprise determining whether the RA resource of the cell comprises at least one RA preamble from the wireless device. If the distributed RAN entity receives the at least one RA preamble from the wireless device, the distributed RAN entity may transmit a RA response to the wireless device. The wireless device may transmit, and the distributed RAN entity may receive, via the cell, transport blocks. The distributed RAN entity may transmit, to the central RAN entity, the transport blocks. The distributed RAN entity may transmit, to the central RAN entity, a RA failure indication, if the distributed RAN entity does not receive at least one RA preamble from the wireless device.

A distributed RAN (e.g., a gNB-DU) entity may monitor a RA resource of a cell, which may comprise determining whether at least one RA preamble transmitted by a wireless device is detected. Based on monitoring the RA resource of the cell, the distributed RAN entity may determine that the at least one RA preamble is not detected. Based on determining that the at least one RA preamble is not detected, the distributed RAN entity may transmit, to a central RAN entity (e.g., a gNB-CU), a first message indicating a RA failure of the wireless device. The distributed RAN entity may transmit, to the central RAN entity, a RA command configured to initiate an RA. The RA command may comprise one or more of: a first field indicating the RA resource, or an index of the RA preamble. The distributed RAN entity may transmit, to the central RAN entity, RA configuration information. The RA configuration information may comprise one or more of: a first field indicating the RA resource, or an index of the RA preamble. The central RAN entity may transmit, to the wireless device via a second device, one or more of: the RA command, or the RA configuration information. The second device may comprise one or more of: the distributed RAN entity or a neighboring base station. The central RAN entity may transmit, to the distributed RAN entity, one or more of: scheduling information of the RA resource, or an index of the RA preamble. The central RAN entity may release one or more configurations of the cell for the wireless device, e.g., after receiving or in response to the first message indicating an RA failure of the wireless device. The distributed RAN entity may release a wireless device context for the wireless device, e.g., if the RA preamble is not detected and/or if the RA is for a handover of the wireless device.

Network slicing may allow differentiated treatment depending on requirements for each type of tenant, user, use, service, device, communications, etc. With slicing, Mobile Network Operators (MNO) may be able to determine, for users and/or devices or groups of users and/or devices, one or more different types, such as tenant types, user types, use types, service types, device types, communication types, etc. Each type may include different service requirements. As examples, communications may be for enhanced mobile broadband (eMBB), ultra-reliable low-latency communications (URLLC), or any other type of communications. One or more Service Level Agreements (SLAs) or subscriptions may be associated with different service requirements and may determine what slice types each different type (e.g., tenant, user, use, service, device, communication, etc.) may be eligible to use. NSSAI (Network Slice Selection Assistance Information) may include one or more S-NSSAIs (single NSSAI). Each network slice may be uniquely identified by a S-NSSAI. A wireless device may store a configured and/or accepted NSSAI per PLMN. The NSSAI may have standard values or PLMN specific values. For signaling between RAN and CN, a slice ID may be represented by an NSSAI and/or S-NSSAI.

Base stations and wireless devices may use resource status information to provide dynamic operations for a wireless device that requires service of one or more slices. Resource status information may include information about resources in a network (e.g., a RAN), such as radio resources, hardware resources, and/or interface resources. Decisions for handover, multi-connectivity initiation, and/or multi-connectivity modification for a wireless device may use resource status information to provide improved decisions to serve network slices for the wireless device based on current network conditions. For example, a wireless device with particular requirements or requests relating to the use of one or more network slices, or one or more services associated therewith, may be served by a base station making a decision for a handover, multi-connectivity initiation, and/or multi-connectivity modification for the wireless device that accounts for resources related to the one or more network slices, or associated services, for the wireless device. A base station and/or a cell may support a resource isolation between different network slices. For example, a base station and/or a cell may provide a reliable service for a first slice if a second slice is in a high load status. To provide the resource isolation between network slices, neighboring base stations may provide load balancing and/or differentiated handling of communications by controlling multiple network slices. Base stations may control multiple network slices separately or simultaneously and/or may exchange resource status information for different network slices with neighboring base stations.

Network slicing in a RAN may be based on the following. RAN awareness of slices may indicate that the RAN may support a differentiated handling of traffic for different network slices, e.g., which may have been pre-configured. RAN may support the slice enabling in terms of RAN functions (e.g., the set of network functions that includes each slice) in various ways. Selection of the RAN part of the network slice may indicate that the RAN may support the selection of the RAN part of the network slice. One or more slice ID(s) may be provided by the wireless device or the CN, which may identify one or more pre-configured network slices in the PLMN. The accepted NSSAI may be sent, e.g., by a CN to a wireless device and a RAN, after network slice selection. Resource management between slices may indicate that the RAN may support policy enforcement between slices, e.g., based on service level agreements. A single RAN node may support multiple slices. The RAN may be able to apply the best RRM policy for the SLA in place to each supported slice. Support of QoS may indicate that the RAN may support QoS differentiation within a slice.

RAN selection of a CN entity may be supported. For an initial attach, a wireless device may provide one or more slice ID(s). If available, the RAN may use the slice ID(s) for routing the initial NAS to an NGC CP function. If the wireless device does not provide any slice ID(s), the RAN may send the NAS signaling to a default NGC CP function. For subsequent accesses, the wireless device may provide a temporary identifier (Temp ID), which may be assigned to the wireless device by the NGC, e.g., to allow the RAN to route the NAS message to the appropriate NGC CP function as long as the Temp ID is valid (e.g., the RAN may be aware of and may be able to reach the NGC CP function which may be associated with the Temp ID). One or more methods for initial attach may apply. Resource isolation between slices may be supported by the RAN. RAN resource isolation may be performed by using one or more RRM policies or protection mechanisms. For example, a shortage of shared resources in one slice that may otherwise break the service level agreement for another slice may be avoided. It may be possible to fully dedicate RAN resources to a certain slice.

Slice availability may be dependent on the RAN. Some slices may be available only in part of a network. Awareness in a gNB of the slices supported in the cells of its neighboring gNBs may be beneficial for inter-frequency mobility, e.g., in a connected mode. That the slice configuration may or may not change within the wireless device's registration area. The RAN and the CN may handle a service request for a slice that may or may not be available in a given area. Admission or rejection of access to a slice may depend upon one or more factors such as support for the slice, availability of resources, or support of the requested service by other slices. Slice availability in a RAN may be handled during mobility. Neighbor gNBs may exchange slice availability on the interface connecting two nodes, e.g., an Xn interface between gNBs or any other interface between base stations. The core network may provide the RAN a mobility restriction list. This list may include those tracking areas (TAs) that support, or do not support, the slices for the wireless device. The slices supported at the source node may be mapped to other slices at a target node. Examples of possible mapping mechanisms may be one or more of: mapping by the CN, e.g., if there may be a signaling interaction between the RAN and the CN and performance may not be impacted; mapping by the RAN, e.g., as an action following prior negotiation with the CN during a wireless device connection setup; and/or mapping by the RAN autonomously, e.g., if prior configuration of mapping policies took place at the RAN. Associating a wireless device with multiple network slices simultaneously may be supported. If a wireless device is associated with multiple slices simultaneously, a single signaling connection may be maintained.

A slice ID may be introduced as part of a PDU session information that may be transferred during mobility signaling, e.g., to provide mobility slice awareness for network slicing. By providing the slice ID, slice-aware admission and congestion control may be allowed. If a target cell is selected, handover signaling may be initiated and may attempt to move PDU session resources for active slices of the wireless device from one node to another node. A first gNB (e.g., source gNB) may be required to pass on slices, which a wireless device in question may be using, to a second gNB (e.g., target gNB) as part of a handover procedure. If a handover procedure involves a NGC (e.g., a core network node), during the procedure the target AMF (Access and Mobility Management Function, e.g., a core network node) may align the set of slices supported in the new registration area between the wireless device and the network at a NAS level. PDU sessions that may be associated with the removed slices may be not admitted at a target node.

A core network node may validate that a wireless device has the rights to access a network slice. The RAN may be allowed to apply some provisional and/or local policies, e.g., prior to receiving an initial context setup request message, based on awareness of to which slice the wireless device may be requesting access. The CN may be aware of network slices to which the wireless device may belong. The RAN may be informed of network slices for which resources may be requested, e.g., during the initial context setup.

Network slicing in a RAN may include slice awareness in the RAN that may be introduced at a PDU session level, e.g., by indicating the slice ID corresponding to the PDU session. An indication of a slice ID may further indicate that: QoS flows within a PDU session may belong to the same network slice; within a slice, QoS differentiation may be supported; connection of a wireless device to multiple network slices may be supported, e.g., as multiple PDU sessions per a wireless device may be able to be established; as a consequence of slice awareness at a PDU session level, user data pertinent to different network slices may or may not share the same NG-U tunnel; by adding the slice ID information to the PDU session information, mobility signaling may also become slice-aware and may allow per-slice admission and/or congestion control.

Following one or more of an initial access, an establishment of a RRC connection, and a selection of a correct CN instance, the CN may establish the complete a wireless device context by sending the initial context setup request message to the gNB over a NG-C interface. The message may include the slice ID as part of the PDU session(s) resource description. If the wireless device context is successfully established and PDU resources are allocated to the relevant network slice(s), the RAN may respond with the initial context setup response message.

If new PDU sessions are to be established, and/or if existing PDU sessions are to be modified or released, the CN may request the RAN to allocate and/or release resources relative to the relevant PDU sessions, e.g., using the PDU session setup/modify/release procedures over a NG-C interface. For network slicing, slice ID information may be added per PDU session. By adding slice ID information, the RAN may be allowed to apply policies at the PDU session level according to the SLA represented by the network slice, e.g., and the RAN may still be able to apply differentiated QoS within the slice. The RAN may confirm the establishment, modification, and/or release of a PDU session associated with a certain network slice, e.g., by responding with the PDU session setup/modify/release response message over the NG-C interface.

New Radio (NR) may expand and support a variety of applications that may continue beyond the 3G and 4G standards, such as enhanced Mobile Broadband (eMBB), Ultra Reliable Low Latency Communication (URLLC), and massive Machine Type Communication (mMTC). In NR, the performance requirements for URLLC may be different from those for eMBB and/or mMTC. URLLC may have stringent requirements on latency and reliability. URLLC traffic may be sporadic or periodic and packet sizes of URLLC traffic may depend on time and may vary in different transmissions. A wireless device may not finish an uplink (UL) transmission within the resources allocated by a base station in the NR, which may be referred to as a gNB. The different requirement for URLLC may necessitate a different treatment of URLLC traffic and the varying packet sizes of URLLC may require a flexible radio resource allocation that may reflect the change of packet size. The periodic URLLC traffic may require one or more radio resources allocated to a wireless device in accordance with the traffic periodicity. Considering these requirements, a semi-static resource configuration dedicated to a wireless device for URLLC may not satisfy URLLC services and/or packet sizes, which may result in wasting the radio resources and leading inefficient resource utilization.

NR may support an uplink (UL) transmission without a UL grant, referred to as a grant-free (GF) UL transmission, for one or more service types, e.g., URLLC. A gNB may allocate to a wireless device one or more GF UL radio resources. A wireless device configured by the gNB to use the GF UL radio resources may transmit one or more data packets without a UL grant, which may result in reducing the signaling overhead comparing with a grant-based (GB) UL transmission. Such a service type that has strict requirements, such as URLLC in terms of latency and reliability, may be a candidate for which a gNB may configure a wireless device with the GF UL transmission. The wireless device configured with the GF UL radio resource may skip a UL transmission on the GF UL radio resource if there is no data to transmit. The GF UL transmission may support multiple wireless devices to access the same GF UL radio resources, which may be referred to as GF radio resource pool. GF radio resource pooling may be utilized to provide lower latency and lower signaling overhead than a GB UL transmission. A GF radio resource pool may be defined as a subset of one or more radio resources from a common radio resource set (e.g., from all uplink shared channel radio resources). The GF radio resource pool may be employed to allocate exclusive or partially overlapped one or more radio resources for GF UL transmissions in a cell or to organize frequency/time reuse between different cells or parts of a cell (e.g., cell-center and cell-edge).

If a gNB configures multiple wireless devices with the same (or partially overlapped) GF radio resource pool, there may be a collision between two or more wireless devices on the GF UL transmissions. A gNB may configure one or more parameters to assign a wireless device specific demodulation reference signal (DMRS) along with the GF radio resource pool configuration to identify a wireless device ID. The one or more parameters may indicate one or more of a root index of a set of Zadoff-Chu (ZC) sequences, a cyclic shift (CS) index, a TDM/FDM pattern index, or an orthogonal cover code (OCC) sequences or index.

For a wireless device ID identification, a gNB may employ one or more preamble sequences that may be transmitted together with the PUSCH data. The one or more preamble sequences may be designed to be reliable enough and to meet the detection requirement of a service, e.g., URLLC. For wireless devices configured with a GF radio resource pool, a preamble sequence may be uniquely allocated to a wireless device. A gNB may configure different GF radio resources for different sets of wireless devices such that the preamble sequences may be reused in different GF radio resources. To have reliable detection performance, the preamble sequences may be mutually orthogonal, e.g., orthogonality between ZC root sequences with different cyclic shifts. A wireless device may transmit one or more preambles together with the data block and receive a response. The data may be repeated an arbitrary number of times depending on the gNB configuration. One or more preambles may not be repeated based on reliability metrics, which may be pre-determined and/or determined dynamically. The response from a gNB may be a UL grant or a dedicated ACK/NACK transmitted in the downlink control information (DCI).

The new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice by one or more slice ID(s) or NSSAI(s) provided by a wireless device or a NGC (e.g., NG CP). The slice ID(s) or NSSAI(s) may identify one or more of pre-configured network slices in a PLMN. For initial attach, a wireless device may provide a slice ID and/or an NSSAI, and a RAN node (e.g., a gNB) may use the slice ID or the NSSAI for routing an initial NAS signaling to an NGC control plane function (e.g., NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to allow a RAN node to route the NAS message to a relevant NGC control plane function. The new RAN may support resource isolation between slices. RAN resource isolation may be performed, e.g., by avoiding a shortage of shared resources in one slice and a violation of a service level agreement for another slice.

The amount of data traffic carried over wireless networks is expected to increase for many years to come. The number of users/devices is likely to continue increasing and each user/device is like to access an increasing number and variety of services. This demand for service requires not only high capacity in the network, but also provisioning very high data rates to meet customers' expectations on interactivity and responsiveness. More spectrum may be required for wireless operators to meet the increasing demand Considering user expectations of high data rates along with seamless mobility, it may be beneficial for more spectrum to be made available for deploying macro cells as well as small cells for wireless systems. Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may complement licensed spectrum for wireless operators to help in addressing increased traffic areas, such as hotspot areas. Licensed assisted access (LAA) offers an alternative for operators to make use of unlicensed spectrum and manage a radio network, thus offering new possibilities for optimizing the network's efficiency. Listen-before-talk (LBT) may be implemented for transmission in an LAA cell. In a LBT procedure, equipment may apply a clear channel assessment (CCA) check before using the channel. The CCA may utilize at least energy detection to determine the presence or absence of other signals on a channel to determine if a channel is occupied or clear, respectively. European and Japanese regulations have mandated the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be allowed. Some of these functions may be supported by one or more signals to be transmitted from the beginning of a discontinuous LAA downlink transmission. Channel reservation may be allowed by the transmission of signals, by an LAA node, e.g., after gaining channel access via a successful LBT operation so that other nodes that receive the transmitted signal with energy above a certain threshold sense the channel to be occupied. Functions that may be supported by one or more signals for LAA operation with discontinuous downlink transmission may include one or more of the following: detection of the LAA downlink transmission (including cell identification) by wireless devices, time synchronization of wireless devices, or frequency synchronization of wireless devices. DL LAA design may employ subframe boundary alignment according to LTE-A carrier aggregation timing relationships across serving cells aggregated by CA. The eNB transmissions may or may not start only at the subframe boundary. LAA may support transmitting via a PDSCH if not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. In some regions, regulatory requirements specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, such as adaptively lower the energy detection threshold from an upper bound. An adaptation mechanism may not preclude static or semi-static setting of the threshold. Category 4 LBT mechanisms or other type of LBT mechanisms may be implemented.

Various LBT mechanisms may be implemented. For some signals, no LBT procedure may performed by the transmitting entity. Category 2 (e.g., LBT without random back-off) may be implemented. The duration of time that the channel is sensed to be idle before the transmitting entity transmits may be deterministic. Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle before the transmitting entity transmits on the channel LAA may employ uplink LBT at the wireless device. The UL LBT scheme may be different from the DL LBT scheme (e.g., by using different LBT mechanisms or parameters) because the LAA UL may be based on scheduled access which affects a wireless device's channel contention opportunities. Other considerations motivating a different UL LBT scheme include, but are not limited to, multiplexing of multiple wireless devices in a single subframe. A DL transmission burst may be a continuous transmission from a DL transmitting node with no transmission immediately before or after from the same node on the same CC. An UL transmission burst from a wireless device perspective may be a continuous transmission from a wireless device with no transmission immediately before or after from the same a wireless device on the same CC. UL transmission burst may be defined from a wireless device perspective and/or from an eNB perspective. For an eNB operating DL+UL LAA over the same unlicensed carrier, DL transmission burst(s) and UL transmission burst(s) on LAA may be scheduled in a TDM manner over the same unlicensed carrier. An instant in time may be part of a DL transmission burst or an UL transmission burst. FIGS. 22A-C show examples of TDM and FDM mapping of PRACH resources. A number of SS blocks (0, 1, . . . , N) may be one-to-one mapped, on a TDM basis, to RACH Occasions (0, 1, . . . , N) (e.g., such as shown in FIG. 22A). A number of SS blocks (0, 1, . . . , N) may be one-to-one mapped, on a FDM basis, to RACH Occasions (0, 1, . . . , N) (e.g., such as shown in FIG. 22B). A number of SS blocks (0, 1, . . . , N) may be mapped to a single RACH occasion (e.g., such as shown in FIG. 22C).

NR (New Radio) may support a multi-beam operation. A gNB operating on a high frequency band may broadcast one or more NR synchronization signals (SS) using different transmitting beams in different radio resources in time and frequency. The NR SS may be based on Cyclic Prefix-Orthogonal Frequency Division Multiplexing (CP-OFDM). NR may define at least two types of synchronization signals: NR-PSS (Primary synchronization signal) and NR-SSS (secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS/SSS. NR may define one or more physical broadcast channel (NR-PBCH). A wireless device may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined depending on carrier frequency range.

NR may support time division multiplexing of NR-PSS, NR-SSS, and NR-PBCH in multi-beam and/or single beam operation. A gNB may transmit NR-PSS, NR-SSS and/or NR-PBCH within a SS block. For a given frequency band, a SS block may correspond to N OFDM symbols based on the default subcarrier spacing, and N may be a constant. The signal multiplexing structure may be fixed in NR. A wireless device may identify at least OFDM symbol index, slot index in a radio frame and radio frame number from a SS block. NR may support a SS burst including one or more SS blocks. One or more SS bursts may determine a SS burst set where the number of SS bursts within a SS burst set may be finite. NR may support one or more periodicity of SS burst set. From a wireless device perspective, SS burst set transmission may be periodic, and a wireless device may assume that a given SS block is repeated with a SS burst set periodicity. The NR-PBCH contents in a given repeated SS block may change. A single set of possible SS block time locations may be specified per frequency band. The maximum number of SS-blocks within SS burst set may be carrier frequency dependent. The position(s) of actual transmitted SS-blocks may be informed at least for helping CONNECTED/IDLE mode measurement, for helping CONNECTED mode a wireless device to receive downlink (DL) data/control in unused SS-blocks, or for helping IDLE mode a wireless device to receive DL data/control in unused SS-blocks. A wireless device may not assume that the gNB transmits the same number of physical beam(s). A wireless device may not assume the same physical beam(s) across different SS-blocks within a SS burst set. For initial cell selection, a wireless device may assume default SS burst set periodicity that may be frequency band-dependent. At least for multi-beams operation, the time index of SS-block may be indicated to the wireless device.

For CONNECTED and IDLE mode wireless devices, NR may support network indication of SS burst set periodicity and information to derive measurement timing/duration (e.g., time window for NR-SS detection). A gNB may provide one SS burst set periodicity information per frequency carrier to a wireless device and information to derive measurement timing/duration if possible. If one SS burst set periodicity and one information regarding timing/duration are indicated, a wireless device may assume the periodicity and timing/duration for all cells on the same carrier. If a gNB does not provide indication of SS burst set periodicity and information to derive measurement timing/duration, a wireless device may assume 5 ms (or any other time) as the SS burst set periodicity. NR may support set of SS burst set periodicity values for adaptation and network indication. For initial access, a wireless device may assume a signal corresponding to a specific subcarrier spacing of NR-PSS/SSS in a given frequency band given. For NR-PSS, a Zadoff-Chu (ZC) sequence may be employed as a sequence for NR-PSS. NR may define one or more basic sequence lengths for a SS for sequence-based SS. Any number of antenna ports may be utilized for NR-PSS. For NR-PBCH transmissions, NR may support a fixed number of antenna port(s). A wireless device may not require a blind detection of a NR-PBCH transmission scheme or number of antenna ports. A wireless device may assume the same PBCH numerology as that of NR-SS. For the minimum system information delivery, NR-PBCH may include a part of minimum system information. NR-PBCH contents may include at least a part of the SFN (system frame number) or CRC. A gNB may transmit the remaining minimum system information in shared downlink channel via NR-PDSCH.

A NR may support contention-based random access (CBRA) and contention-free random access (CFRA) procedures. The CBRA may include a four-step random access (RA) procedure which may include: RA preamble (RAP) transmission from a wireless device to a base station in NR (e.g., which may be referred to as a gNB), random access response (RAR) transmission from the base station (e.g., gNB) to the wireless device, scheduled transmission of one or more transport blocks (TBs) from the wireless device to the base station (e.g., gNB), and contention resolution. The CFRA may include the first two steps of CBRA, which may include the RAP and RAR transmissions. In the CI-RA, the base station (e.g., gNB) may assign a dedicated RAP to a wireless device via one or more radio resource control (RRC) messages or via a downlink control channel, e.g., PDCCH, EPDCCH, or MPDCCH, in the form of downlink control information (DCI), e.g., DCI formats 1A, 6-1A, or 6-1B in LTE. The dedicated RAP may result in completing a CFRA at the second step of CBRA by skipping a contention resolution.

For the RAP transmission, a base station (e.g., gNB) may transmit one or more radio resource control (RRC) messages and/or one or more control messages for indicating a random access channel (RACH) configuration which may include one or more or more physical random access channel (PRACH) resources for transmitting a RAP, a RAP format, or RACH sequence information for generating a RAP for transmitting to the base station.

For CBRA, a base station may broadcast RACH configurations, e.g., rach-ConfigCommon and prach-Config broadcast via SIB2 in LTE, possibly per beam via NR-PBCH. The wireless device may randomly determine a RAP from RACH sequences generated based on the RACH configuration and may transmit the determined RAP via one or more RACH resources configured by the RACH configuration. The random selection of RAP from the RACH sequences may result in multiple wireless devices transmitting the same RAP via the same RACH radio resource(s). A base station that may receive the same RAP from the multiple wireless devices may or may not detect the RAP. In the CBRA, the contention resolution resulted from the same RAP transmission by multiple wireless devices may be resolved in the last step of CBRA.

A wireless device may be configured with CFRA for handover to a new cell or for adding a secondary cell. For CFRA, the wireless device may receive the RACH configuration from one or more dedicated message transmitted by a base station for the wireless device. For handover, a wireless device may receive the RACH configuration via one or more RRC messages. For adding a secondary cell, a wireless device may receive the RACH configuration via a downlink control channel, e.g., PDCCH, EPDCCH, or MPDCCH, in the form of downlink control information (DCI), e.g., DCI formats 1A, 6-1A, or 6-1B in LTE.

For CFRA, the preamble to transmit by a wireless device may be explicitly indicated by a base station. For handover, one or more RRC messages transmitted by a base station for CFRA may include a dedicated RACH configuration for CFRA, e.g., RACH-ConfigDedicated in LTE. The dedicated RACH configuration may include at least a dedicated preamble index, e.g., ra-PreambleIndex in LTE, or RACH configuration index, e.g., ra-PRACH-MaskIndex in LTE.

Figure 21:
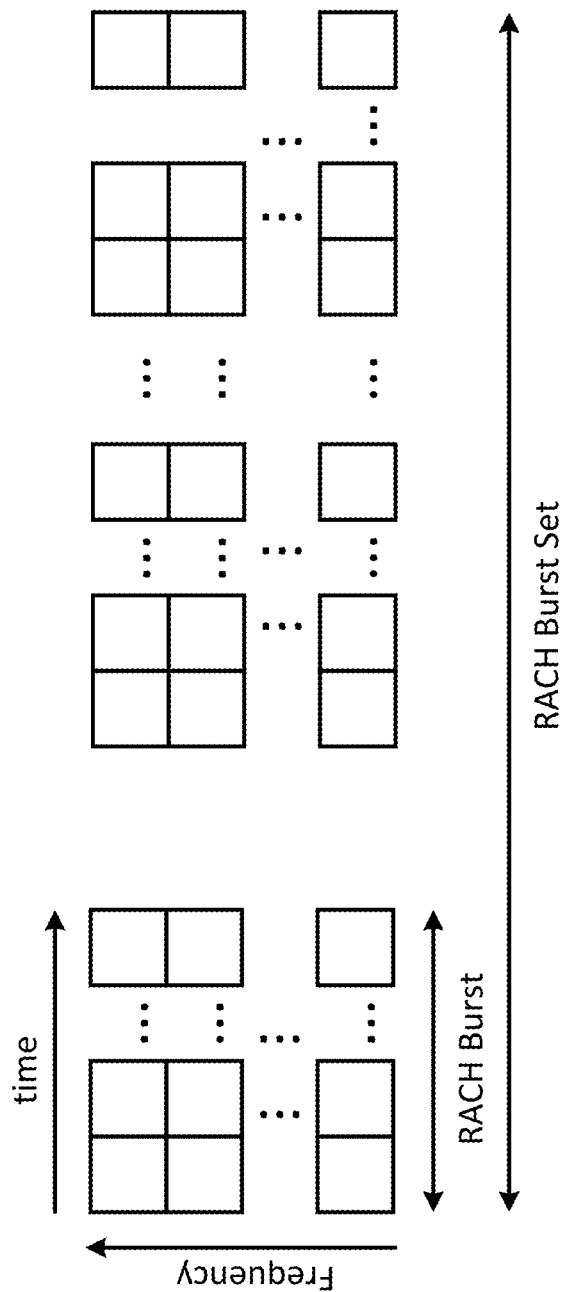
FIG. 21 shows an example of random access channel (RACH) Occasion, RACH Burst, and RACH Burst Set.

For adding a secondary cell, one or more control messages transmitted by a base station via a physical layer control channel may be scrambled by a C-RNTI assigned to a wireless device and may include at least a carrier indicator, e.g., 0 or 3 bits assigned for indicating a carrier in LTE, a preamble index, e.g., 6 bits assigned for indicating Preamble index in LTE, or RACH configuration index, e.g., 4 bits assigned for indicating PRACH Mask Index. Any number of bits might be utilized. FIG. 21 shows an example of RACH Occasion, RACH Burst, and RACH Burst Set. For CFRA, a dedicated preamble may be unique for a wireless device to avoid collision of the same RAP transmission by multiple wireless devices. A base station may select a RAP for CFRA from sequences outside one or more RAP sequence sets used for CBRA.

A base station may transmit a MAC packet data unit (PDU) including one or more RA responses (RARs) to the wireless device based on reception of a RAP that a wireless device transmits. A wireless device may monitor the physical-layer downlink control channel (PDCCH) for RARs identified by a random access radio network temporary identifier (RA-RNTI) in a RA response window that may starts at the subframe, slot, or mini-slot that may include the end of a RAP transmission plus a time offset. The size of the RA response window may be configurable. The RA-RNTI may be an identifier employed for a wireless device to identify a RAR that a base station scrambles with the RA-RNTI. The RA-RNTI may be determined based on a time and frequency radio resource where a wireless device transmits a RAP, which may result in a plurality of wireless devices having the same RA-RNTI. A wireless device may determine the RA-RNTI associated with the PRACH in which the wireless device transmits a RAP as follows:

$$RA\text{-}RNTI = 1 + t\_id + 10 * f\_id$$

where t_id is the index of the first subframe of the specified PRACH (0≤t_id<10), and f_id is the index of the specified PRACH within that subframe, in ascending order of frequency domain (0≤f_id<6). However, a wireless device may employ different formulas for RA-RNTI calculations.

The RA-RNTI associated with the PRACH in which the Random Access Preamble is transmitted may be determined as follows:

$$RA\text{-}RNTI=1+t\_id+10*f\_id+60*(SFN\_id \bmod(W\max/10))$$

where t_id is the index of the first subframe of the specified PRACH (0≤t_id<10), f_id is the index of the specified PRACH within that subframe, in ascending order of frequency domain (0≤f_id<6), SFN_id is the index of the first radio frame of the specified PRACH, and Wmax is 400. However, a maximum possible RAR window size for subframes may be utilized and it should be noted that the values above are provided for example only and any arbitrary value may be employed in practice.

The RA-RNTI associated with the PRACH in which the Random Access Preamble is transmitted, may be determined as follows:

$$RA\text{-}RNTI=1+\mathrm{floor}(SFN\_id/4)$$

where SFN_id is the index of the first radio frame of the specified PRACH.

Figure 20:
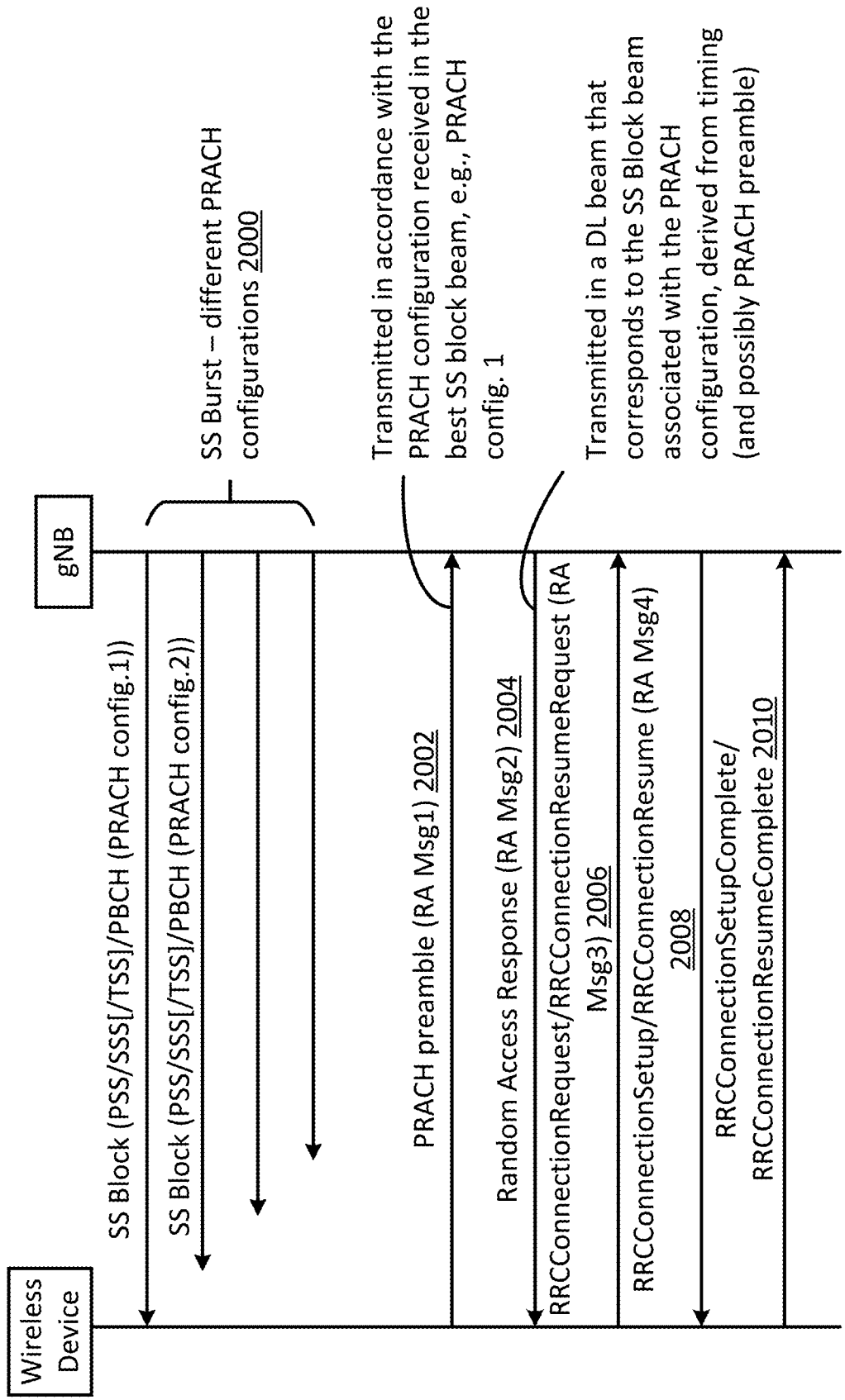
FIG. 20 shows an example of the RA procedure including broadcasting multiple SS blocks.

FIG. 20 shows an example of a RA procedure including broadcasting multiple SS blocks. At step 2000, one or more PRACH configurations are transmitted from a base station (e.g., a gNB) to a wireless device using a SS Burst. At step 2002, the wireless device transmits a PRACH preamble to a gNB. The PRACH preamble may be transmitted in accordance with the PRACH configuration received in the best SS block beam, e.g., PRACH config. 1. At step 2004, the gNB transmits a RA response to the wireless device. The RA response may be transmitted in a DL beam that corresponds to the SS Block beam associated with the PRACH configuration, derived from the timing and/or the PRACH preamble. At step 2006, the wireless device transmits a RRC-ConnectionRquest and/or a RRCConnectionResume Request to the gNB. At step 2008, the gNB transmits a RRCConnectionSetup and/or RRCConnectionResume to the wireless device. At step 2010, the wireless device transmits a RRCConnectionSetup Complete and/or a RRC-ConnectionResumeComplete to the gNB.

A wireless device may stop monitoring for RAR(s) after decoding of a MAC PDU for a RAR including a RAP identifier (RAPID) that matches the RAP transmitted by the wireless device. The MAC PDU may include one or more MAC RARs and a MAC header that may include a subheader having a backoff indicator (BI) and one or more subheaders that include RAPIDs. If a RAR includes a RAPID corresponding to the RAP that a wireless device transmits, the wireless device may employ one or more parameters in the RAR, e.g., a timing advance (TA) command, a UL grant, and a Temporary C-RNTI (TC-RNTI) in LTE, to a subsequent transmission. For CFRA, a wireless device may receive a dedicated RAP that is different from RAPs assigned to other wireless devices, and receiving a RAR including a RAPID corresponding to the transmitted RAP may be the last step of a CFRA procedure. There may be no need to handle contention since the wireless device may have a unique RAP assigned by a gNB. For CBRA, if a wireless device receives a RAR including a RAPID corresponding to the wireless device's transmitted RAP, the wireless device may adjust UL time alignment by employing the TA value corresponding to the TA command in the received RAR and may transmit one or more TBs to a gNB employing the UL resources assigned in the UL grant in the received RAR. The TBs that a wireless device transmits may include RRC signaling, such as a RRC connection request, a RRC connection re-establishment request, or a RRC connection resume request, and a wireless device identity, as the identity is used as part of the contention-resolution mechanism in the last step of the CBRA.

Figure 18:
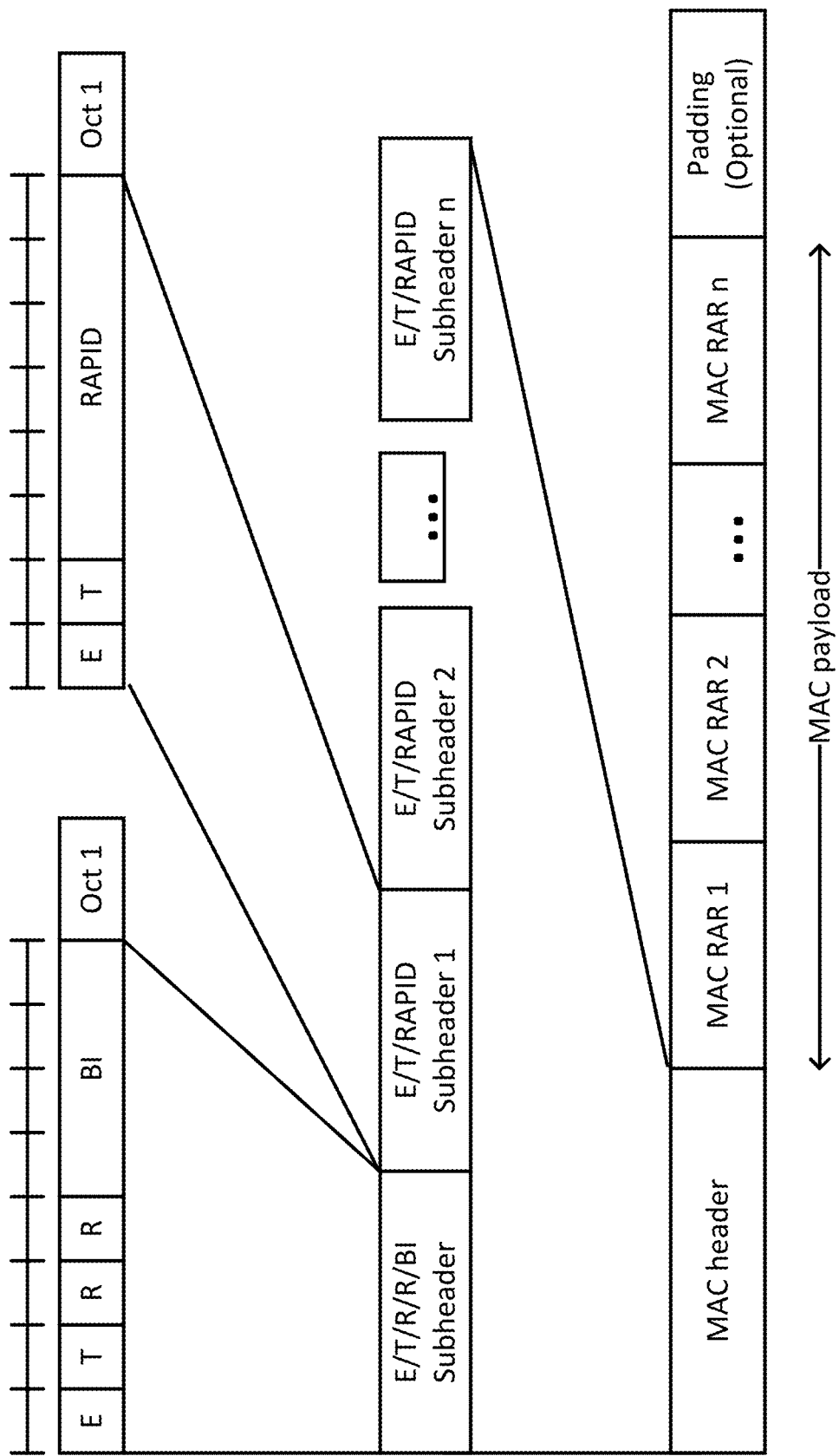
FIG. 18 shows an example media access control (MAC) packet data unit (PDU) format for a MAC PDU including a MAC header and MAC random access responses (RARs).
Figure 19:
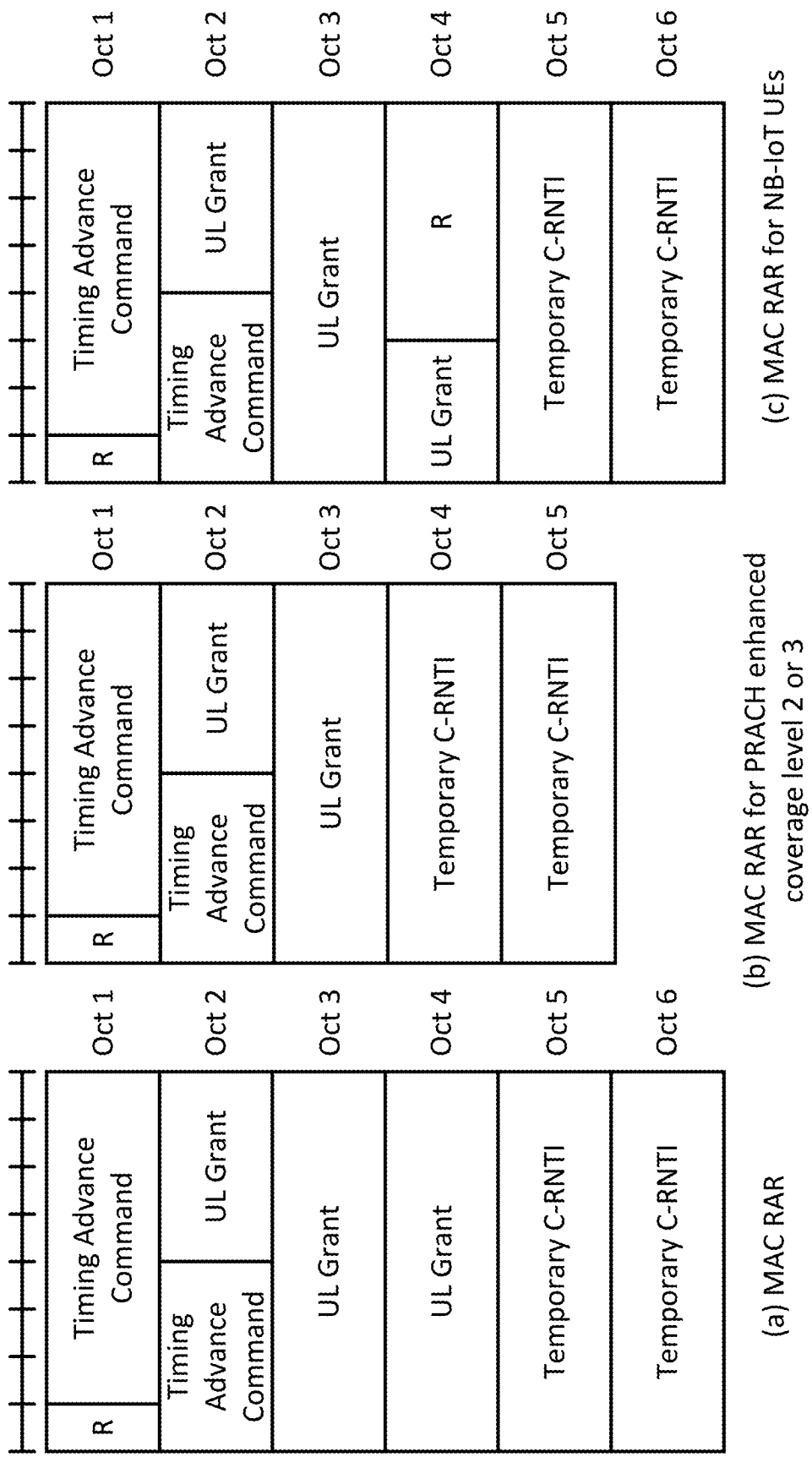
FIG. 19 shows an example MAC RAR format of an example of MAC RAR including a timing advance (TA) command.

FIG. 18 shows an example MAC PDU format for a MAC PDU including a MAC header and MAC RARs. FIG. 19 shows an example MAC RAR format of an example of MAC RAR including a TA command, UL Grant, and TC-RNTI.

The CBRA procedure may include a DL message for contention resolution. If multiple wireless devices perform simultaneous RAP transmission attempts using the same RAP, the multiple wireless devices may receive the same RAR with the same TC-RNTI in the second step. The contention resolution in the last step may increase a likelihood that a wireless device does not use another a wireless device ID. The contention resolution mechanism may be based on either C-RNTI on PDCCH or Contention Resolution Identity on DL-SCH depending on whether a wireless device has a C-RNTI or not. If a wireless device has a C-RNTI, the wireless device may determine the success of RA procedure, e.g., after or in response to detection of C-RNTI on the PDCCH. If a wireless device does not have C-RNTI pre-assigned, the wireless device may monitor DL-SCH associated with TC-RNTI that a gNB transmits in a RAR of the second step and may compare the identity in the data transmitted by the gNB on DL-SCH with the identity that the wireless device transmits. If the two identities are identical, the wireless device may determine the success of RA procedure and promote the TC-RNTI to the C-RNTI.

The RA procedure may allow hybrid automatic repeat request (HARQ) retransmission. A wireless device may start a mac-ContentionResolutionTimer if the wireless device transmits one or more TBs to a gNB in the third step and may restart mac-ContentionResolutionTimer at a HARQ retransmission. If a wireless device receives data on the DL resources identified by C-RNTI or TC-RNTI, the wireless device may stop the mac-ContentionResolutionTimer. If the wireless device does not detect the contention resolution identity that matches to the identity transmitted by the wireless device, the wireless device may determine the failure of RA procedure and discard the TC-RNTI. If the mac-ContentionResolutionTimer expires, the wireless device may determine the failure of RA procedure and discard the TC-RNTI. If the contention resolution fails, a wireless device may flush the HARQ buffer used for transmission of the MAC PDU and may restart the four-step RA procedure from the first step. The wireless device may delay the subsequent RAP transmission by the backoff time randomly selected according to a uniform distribution between zero and the backoff parameter value corresponding the BI in the MAC PDU for RAR. The first two steps may provide an UL time alignment and an UL grant for a wireless device. However, the UL time alignment may not be necessary in some instances, such as in small cells or for stationary wireless devices, the process for acquiring the UL time alignment if either a TA equal to zero may be sufficient (e.g., small cells) or a stored TA value from the last RA may serve for the current RA (stationary a wireless device). If a wireless device is in a RRC Connected state with a valid TA value and with no resources configured for UL transmission, the UL time alignment may not be necessary if the wireless device needs to obtain an UL grant.

In multi-beam operation, a gNB may need a downlink beam sweep to provide coverage for DL synchronization signals (SSs) and common control channels. To allow wireless devices to access the cell, the wireless devices may need the similar sweep for UL direction. In single beam operation, a gNB may configure time-repetition within one SS block in a wide beam. In multi-beam operation, a gNB may configure one or more SS blocks with multiple transmitting (Tx) beams such that a wireless device identifies one or more of an OFDM symbol index, a slot index in a radio frame, or a radio frame number from a SS block. In NR with multi-beam operation, the SS block may include an association between SS blocks and a subset of RACH resources and/or a subset of RAP indices. A wireless device may determine a subset of RACH resources and/or a subset of RAP indices based on DL measurements on SS blocks. In multi-beam operation, a gNB may repeat a transmission of PSS/SSS/PBCH using different Tx beams, e.g., Tx beam sweeping, to provide a DL coverage for supporting cell selection/reselection and initial access procedures. NR may support a SS including a tertiary synchronization signal (TSS). The TSS may be used to indicate one or more differences in the repeated PRACH configurations via one or more beams within a SS Burst. Under the assumption that PBCH carries the PRACH configuration, a gNB may broadcast PRACH configurations, which may be per beam with the TSS.

A base station (e.g., a gNB) may configure (e.g., in NR) an association between DL signal/channel of a SS block, a subset of RACH resources, and/or a subset of preamble indices, for determining a DL Tx beam for transmitting a RAR. For multiple SS blocks broadcast by a gNB, a wireless device may measure DL signal/channel of the multiple SS blocks and select one or more of the configured PRACH radio resources associated with one of the multiple SS blocks. The selected PRACH radio resource(s) may be associated with a SS block providing a received signal strength higher than a predefined threshold at the wireless device. Transmitting a RAP over the PRACH radio resources may indicate a preferred DL Tx beam for a wireless device to a gNB. If the gNB detect the RAP, a RAR corresponding to the RAP may be transmitted to the DL Tx beam that the wireless device prefers.

A gNB may configure (e.g., in a multi-beam system) different types of PRACH resources associated with SS blocks and/or DL beams. A PRACH transmission occasion (e.g., in NR) may be a time-frequency radio resource on which a wireless device transmits a preamble using the configured PRACH preamble format with a wireless device Tx beam and for which the gNB performs PRACH preamble detection. One or more PRACH occasions may be used to cover Tx/Rx beam non-correspondence at a transmission and reception point (TRP) and/or a wireless device. A gNB may perform Rx sweep during PRACH occasion as a wireless device Tx beam alignment is fixed during single occasion. A PRACH burst may include a set of PRACH occasions allocated consecutively in time domain. A PRACH burst set may include a set of PRACH bursts to allow full Rx sweep. There may be an association between SS blocks (DL signal/channel) and PRACH occasion and a subset of the PRACH preamble resources. One PRACH occasion may include a set of preambles. The gNB may need to know which beam or set of beams it may use to send RAR (e.g., in multi-beam operation) and the preambles may be used to indicate that.

The timing from a SS block to the PRACH resource may be indicated in the MIB. Different TSS may be used for different timings such that the detected sequence within TSS indicates the PRACH resource. This PRACH configuration may be specified as a timing relative to the SS block, and may be given as a combination of the payload in the MIB and another broadcasted system information. Association between SS block and a subset of RACH resources and/or a subset of preamble indices may be configured so that TRP may identify the best DL beam for a wireless device according to resource location or preamble index of received preamble. An association may be independent. A subset of RACH resources and/or subset of preamble indices may not be allowed to be associated with multiple SS blocks. PRACH resources may be partitioned based on SS-block in the multiple beam operation. There may be one to one and/or many to one mapping between SS-blocks and PRACH occasions. Wireless devices may detect SS-blocks based on DL synchronization signals and differentiate SS-blocks based on the time index. With one-to-one mapping of beam or beams used to transmit SS-block and a specific PRACH occasion, the transmission of the PRACH preamble resources may be an indication informed by a wireless device to a gNB of the preferred SS-block. The PRACH preamble resources of single PRACH occasion may correspond to specific SS-block and mapping may be done based on the SS-block index. There may be one to one mapping between a SS-block beam and a PRACH occasion. There may not be such mapping for the SS-block periodicity and RACH occasion periodicity.

Depending on the gNB capability (e.g., the beamforming architecture utilized), there may not be a one to one mapping between SS-blocks and RACH occasions. If beam(s) used for transmitting SS-blocks and receiving during RACH occasions do not correspond directly, a gNB may form receive beams that cover multiple SS-blocks beams. The preambles of PRACH occasions may be divided between the different SS-blocks in a manner such that a subset of PRACH preambles map to specific SS-blocks. Based on the mapping between DL beams transmitting SS blocks and PRACH resources (e.g., time/frequency slot and/or preamble partitioning), a wireless device may be under the coverage of a given DL beam or at least a subset of them in a cell (e.g., in multi-beam RACH operation). That may allow a gNB to transmit a RAR in the DL beam and/or perform a beam sweeping procedure (e.g., not transmitting the same RAR message in possible beams), such as transmitting the RAR in a single beam.

With beam-specific PRACH resources, a gNB DL Tx beam may be associated with a subset of preambles. The beam specific PRACH preamble resources may be associated with DL Tx beams that are identified by periodical beam and/or CSI-RS, e.g., CSI-RS for L3 Mobility (same signals may be used for L2 beam management/intra-cell mobility as well). A wireless device may detect the beams without a RRC configuration, e.g., reading the beam configuration from minimum SI (MIB/SIB). A gNB may transmit to a wireless device one or more messages including configuration parameters of one or more cells. The configuration parameters may include parameters of a plurality of CSI-RS signal format and/or resources. The configuration parameters may include one or more parameters for indicating one or more of CSI-RS periodicity, CSI-RS subcarriers (e.g., resource elements), and/or CSI-RS sequence. The PRACH resource mapping to specific beams may use SS-block association. Specific beams may be associated with the beams used for transmitting SS-blocks. A gNB may transmit SS-blocks using one or multiple beams (e.g., for analog/hybrid beamforming), but individual beams may not be detected. From the wireless device perspective, this may be a single beam transmission. A gNB may transmit a CSI-RS (for Mobility) using individual beams associated with specific SS-block. A wireless device may detect individual beams based on the CSI-RS.

Figure 24B:
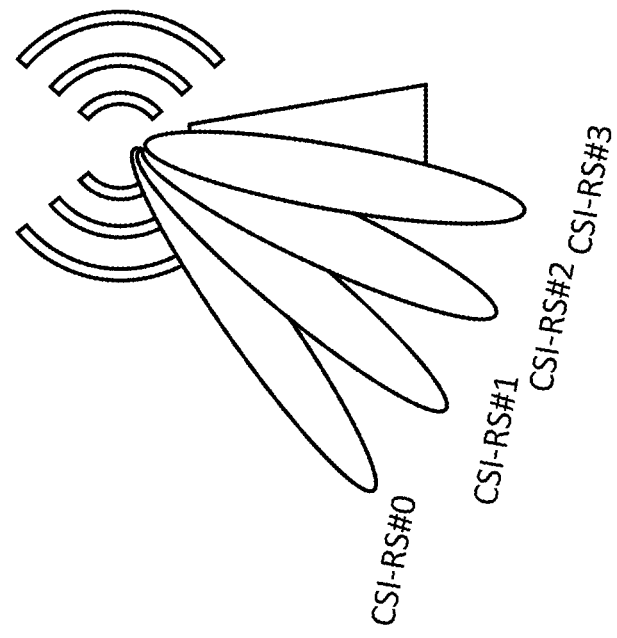
FIG. 24A and FIG. 24B show examples of one or more beams configured with a SS block and a CSI-RS.
Figure 24A:
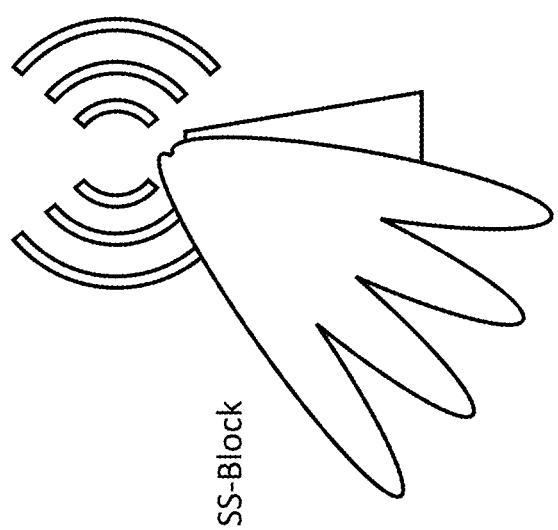

FIGS. 24A and 24B show examples of one or more beams configured with SS blocks and a CSI-RS. FIGS. 25A and 25B are examples of mapping beam specific preambles to PRACH occasion: FIG. 25A shows an example of a one-to-one mapping and FIG. 25B shows an example of a k-to-one mapping.

A base station (e.g., a gNB) may transmit to a wireless device the one or more messages including one or more parameters for indicating the correspondence between SS blocks and CSI-RS signals. The one or more messages may be a RRC connection setup message, a RRC connection resume message, and/or a RRC connection reconfiguration message. A wireless device in RRC-Idle mode may not be configured with CSI-RS signals and may receive SS blocks and may measure a path loss based on SS signals. A wireless device in RRC-connected mode may be configured with CSI-RS signals and may be measure path loss based on CSI-RS signals. A wireless device in a RRC inactive mode may measure the path loss based on SS blocks, such as if the wireless device moves to a different a gNB that has a different CSI-RS configuration compared with the serving a gNB.

A wireless device may measure one or more SS blocks and/or CSI-RSs in a neighboring cell (e.g., for a handover). If one or more of the neighboring cell SS-block measurements triggers a handover request, a source gNB may transmit one or more parameters for indicating one or more preferred beams in a handover request to a target gNB based on the measurements. Based on receiving the one or more preferred beams, the target gNB may transmit one or more beam-specific dedicated RACH resources and/or one or more RAPs in a handover command. The target gNB may provide a set of dedicated resources (e.g., one or more SS-blocks) in the handover command. The wireless device may transmit the one or more RAPs corresponding to the preferred DL beam in the target cell.

PRACH occasions may be mapped to a corresponding SS-block and/or a set of PRACH preambles may be divided between beams. Similar to mapping of multiple SS-blocks to a single PRACH occasion, multiple beams of a SS-block may be mapped to one or more PRACH occasions. If a PRACH occasion is configured with k preambles, and a PRACH occasion is configured to be SS-block specific, the whole set of preambles may be used to indicate specific SS-blocks. There may be N PRACH occasions corresponding to N SS-blocks. If multiple SS-blocks are mapped to single PRACH occasion, the preambles may be divided between SS-blocks and, depending on the number of SS-blocks, the available preambles per SS-block may be K/N (for K preambles, N SS-blocks). If K SS-block specific preambles are divided between CSI-RS beams in the corresponding PRACH occasions, the number of available preambles per beam may be determined by the number of preambles divided by the number of beams. If the preambles are partitioned in a SS-block specific manner, the wireless device may indicate preferred SS-blocks but not the preferred individual DL Tx beam to a gNB. The network may configure the mapping/partitioning of PRACH preamble resources to SS-blocks and/or to individual beams. A wireless device may determine the partitioning of PRACH preambles (e.g., based on the PRACH configuration). Beam-specific PRACH configurations may be configurable if a gNB uses analog Rx beamforming. If a wireless device sends a preamble in a beam-specific time/frequency slot associated with one or multiple SS Block transmissions, the gNB may use the appropriate Rx beamforming for receiving the preamble in the time/frequency slot and use the corresponding DL beam for transmitting the RAR. Beam-specific PRACH configurations may allow the gNB to direct its Rx beamforming in the direction of the same beam for monitoring the associated PRACH resources.

NR may support the CFRA with one or more RACH resources dedicated for the CFRA, e.g., for one or more of a handover, DL data arrival, and/or positioning and obtaining timing advance alignment for a secondary TAG. For the CFRA, NR may allow a wireless device to perform multiple RAP transmissions before the end of a RAR window. A wireless device may transmit multiple RAPs over dedicated multiple RACH transmission occasions in a time domain before the end of a monitored RAR window if the configuration of dedicated multiple RACH transmission occasions in a time domain is supported. The time resources employed for dedicated RACH in a time domain may be different from the time resources of the CBRA. A wireless device may transmit the multiple RAPs with same or different Tx beams. Based on the multiple RAP transmissions, a wireless device and/or a gNB without Tx/Rx beam correspondence may identify a Tx/Rx beam correspondence. The multiple RAP transmission may result in an increasing probability of success for the preamble transmission.

A wireless device may skip one or more RAP transmissions on one or more configured PRACH radio resources. A wireless device may determine whether to transmit a RAP on a PRACH radio resource based on a DL measurement on one or more SS blocks and/or CSI-RSs associated with the PRACH radio. The wireless device may skip a RAP transmission on a PRACH radio resource if a DL measurement on a SS block associated with the PRACH radio resource is below a threshold. The threshold may be predefined and/or determined dynamically. A gNB may configure a number of RAP transmissions that a wireless device may perform before the end of a RAR window. The number of RAP transmissions configured by the gNB may be predefined. The gNB may transmit the number of RAP transmissions configured by the gNB along with a RACH configuration for the CFRA, such as via one or more broadcast messages, one or more RRC messages dedicated for a wireless device, and/or via one or more PDCCH orders.

A base station may include a central RAN entity and one or more distributed RAN entities. A distributed RAN entity of the one or more distributed RAN entity may serve one or more cells. The central RAN entity may provide at least a radio resource control (RRC) functionality and/or a packet data convergence protocol (PDCP) layer functionality. The distributed RAN entity may provide at least a radio link control (RLC) layer functionality, a medium access control (MAC) layer functionality, and/or a physical (PHY) layer functionality. A F1 interface (e.g., a logical direct interface) may be setup between the central RAN entity and the distributed RAN entity. The F1 interface may include a user plane interface and/or a control plane interface. RRC messages may be transmitted from the central RAN entity to a wireless device or from a wireless device to the central RAN entity via the distributed RAN entity. Data packets may be transmitted from the central RAN entity to a wireless device or from a wireless device to the central RAN entity via the distributed RAN entity. Data packets transmitted over the F1 interface may be PDCP layer packets. RRC messages transmitted over the F1 interface may be included in an F1 interface message, and/or the RRC messages included in the F1 interface message may be one or more PDCP layer packets associated with one or more signaling radio bearers.

A distributed radio access network (RAN) entity, such as a DU, may configure a random access (RA) resource and a RA preamble for contention free random access of a wireless device. The wireless device that receives the configuration information may (or may not) transmit the RA preamble, via the RA resource, to the distributed RAN entity. The distributed RAN entity may be able to at least determine whether it detects the RA preamble on the RA resource. The distributed RAN entity may transmit, to a central RAN entity (such as a CU), a RA failure indication if it does not detect the RA preamble on the RA resource from the wireless device. The contention free RA may be for a secondary cell synchronization and/or a handover of the wireless device.

Figure 15:
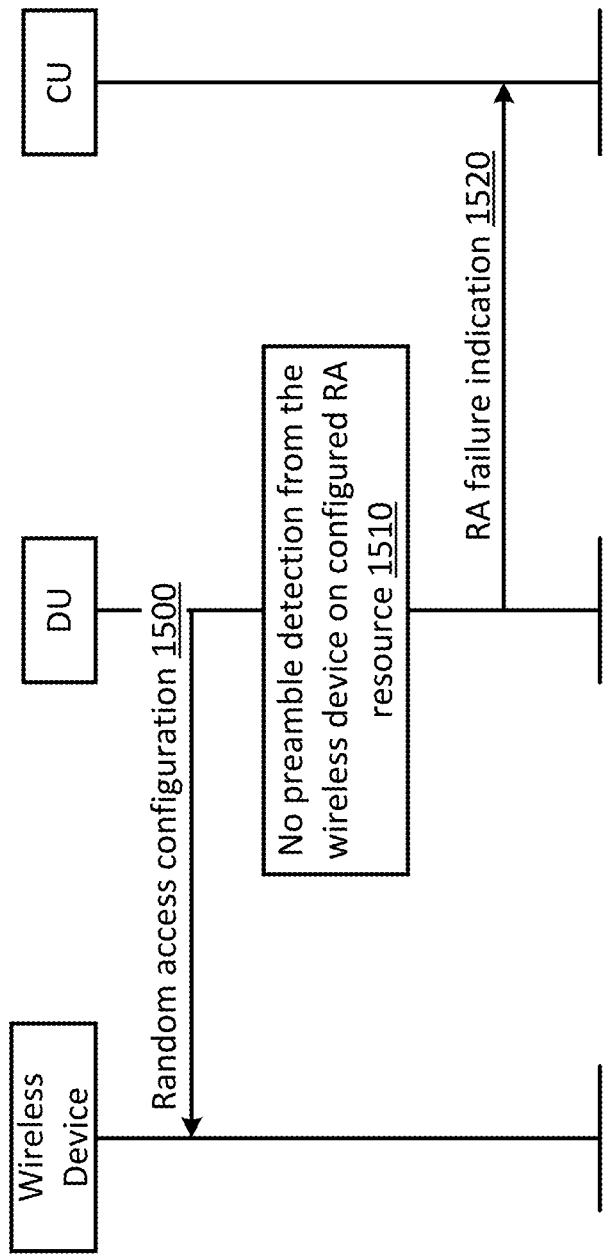
FIG. 15 shows an example of a contention free radio access (RA) failure report for a secondary cell.

FIG. 15 shows an example of a contention free RA failure report for a secondary cell. At step 1500, a DU may transmit a RA configuration to a wireless device. At step 1510, the DU may not detect a preamble from the wireless device on a configured resource. At step 1520, the DU may transmit a RA failure indication to a CU.

A distributed radio access network (RAN) entity (e.g., a gNB-DU, a base station distributed unit, or a distributed unit) may monitor a random access (RA) resource of a cell to determine whether a RA preamble transmitted by a wireless device is detected. The RA preamble may be transmitted by the wireless device to initiate a contention free RA procedure. The contention free RA procedure may be commanded by the distributed RAN entity to adjust uplink time alignment of the wireless device for the cell. The cell may be a secondary cell of the wireless device. The contention free RA procedure may be initiated to execute a handover of the wireless device. During a handover procedure, the wireless device may transmit a preamble, via a handover target cell, to initiate a RA procedure (e.g., the contention free RA procedure). If the distributed RAN entity does not detect the RA preamble on the RA resource, the distributed RAN entity may determine that the contention free RA procedure of the wireless device has failed.

Figure 16:
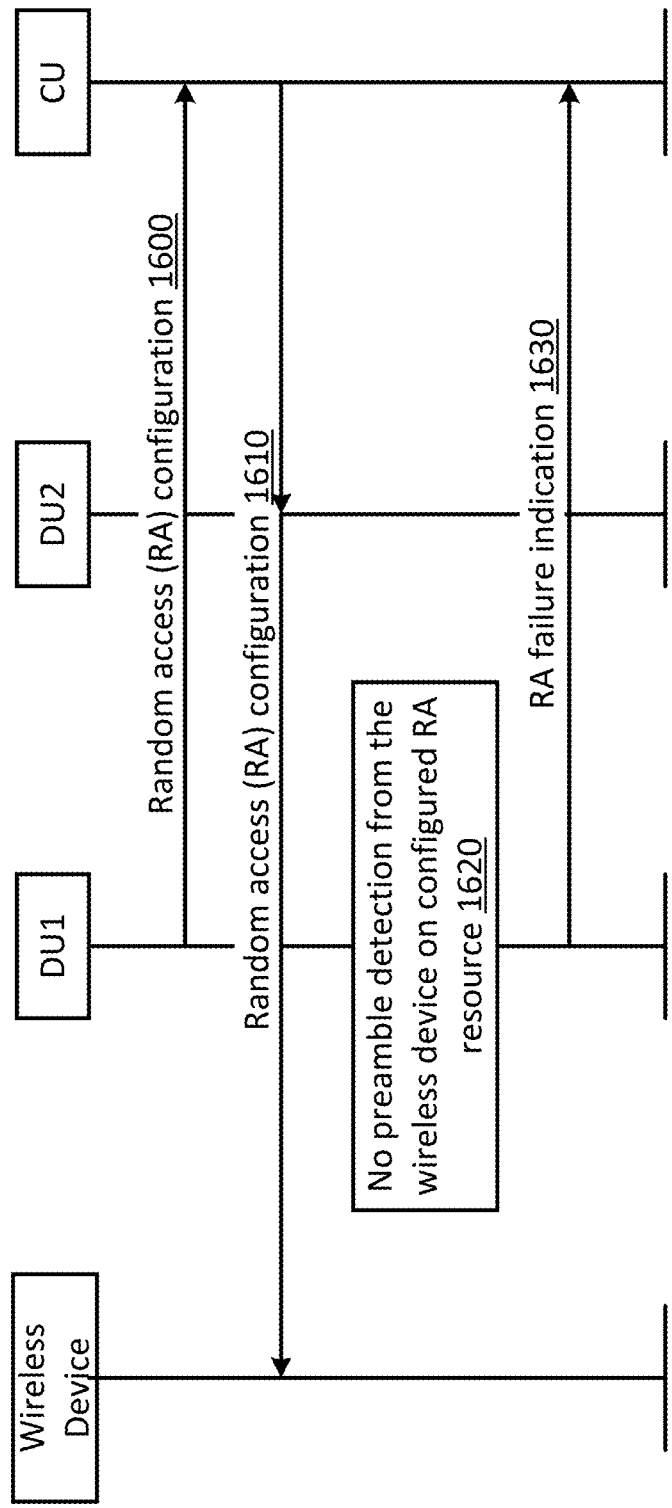
FIG. 16 shows an example of a contention free RA failure report for a handover procedure.

FIG. 16 shows an example of a contention free RA failure report for a handover procedure. At step 1600, a DU1 may transmit a RA configuration to a CU. At step 1610, the CU may transmit the RA configuration to a wireless device via a DU2. At step 1620, the DU1 may not detect a preamble from the wireless device on the configured RA resource. At step 1630, the DU1 may transmit a RA failure indication to the CU.

If the distributed RAN entity initiates the contention free RA procedure to adjust an uplink time alignment of the wireless device for the cell (e.g., before monitoring the RA resource of the cell), the distributed RAN entity may transmit, to the wireless device, a RA command configured to initiate a RA. The RA command may include a first field indicating the RA resource and/or an index of the RA preamble. The RA command may be transmitted via a physical downlink control channel (PDCCH) order (e.g., DCI, DCI format 1A, DCI format 6-1A, and/or the like). The RA command may include a resource block assignment information (e.g., having variable bits and setting all bits to 1), a preamble index (e.g., 6 bits), and/or a PRACH mask index (e.g., 4 bits). If the contention free RA procedure is for a handover of the wireless device towards the cell (e.g., inter-DU handover, inter-gNB handover, and/or the like), the distributed RAN entity may transmit, to a central RAN entity (e.g., a gNB-CU, a base station central unit, or a central unit), a RA configuration information including a first field indicating the RA resource and/or an index of the RA preamble. One or more elements of the RA configuration information may be transmitted to the wireless device by the central RAN entity. The one or more elements of the RA configuration information may be transmitted by the central RAN entity to the wireless device via a neighboring base station.

The central RAN entity may forward the first field of the RA resource and/or the index of the RA preamble in the RA configuration information to the wireless device via a source DU, e.g., for inter-DU handover (e.g., intra-gNB handover). The source DU may be a distributed RAN entity that serves the wireless device before initiating the handover (e.g., inter-DU handover).

Figure 26:
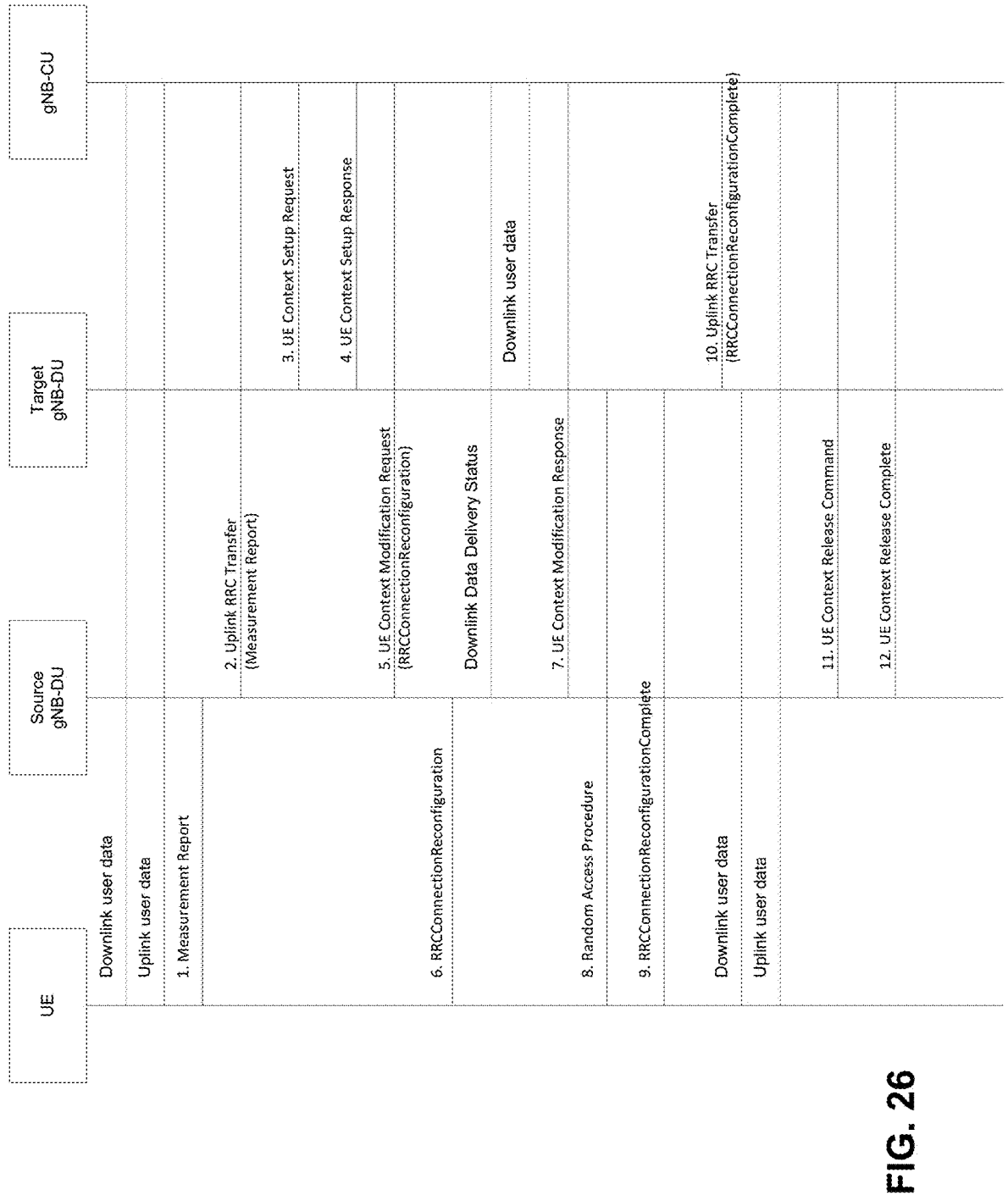
FIG. 26 shows an example of an inter-distributed unit (DU) handoff.

FIG. 26 shows an example of an inter-DU handover. Techniques for inter-DU handovers that can be utilized are described, e.g., in 3GPP TS 38.401 v. 15.2.0.

The central RAN entity may forward the first field of the RA resource and/or the index of the RA preamble in the RA configuration information to the wireless device via a source base station (e.g., a source gNB), e.g., for inter-gNB handover. The source base station may be a base station that serves the wireless device before initiating the handover (e.g., inter-gNB handover).

Figure 27:
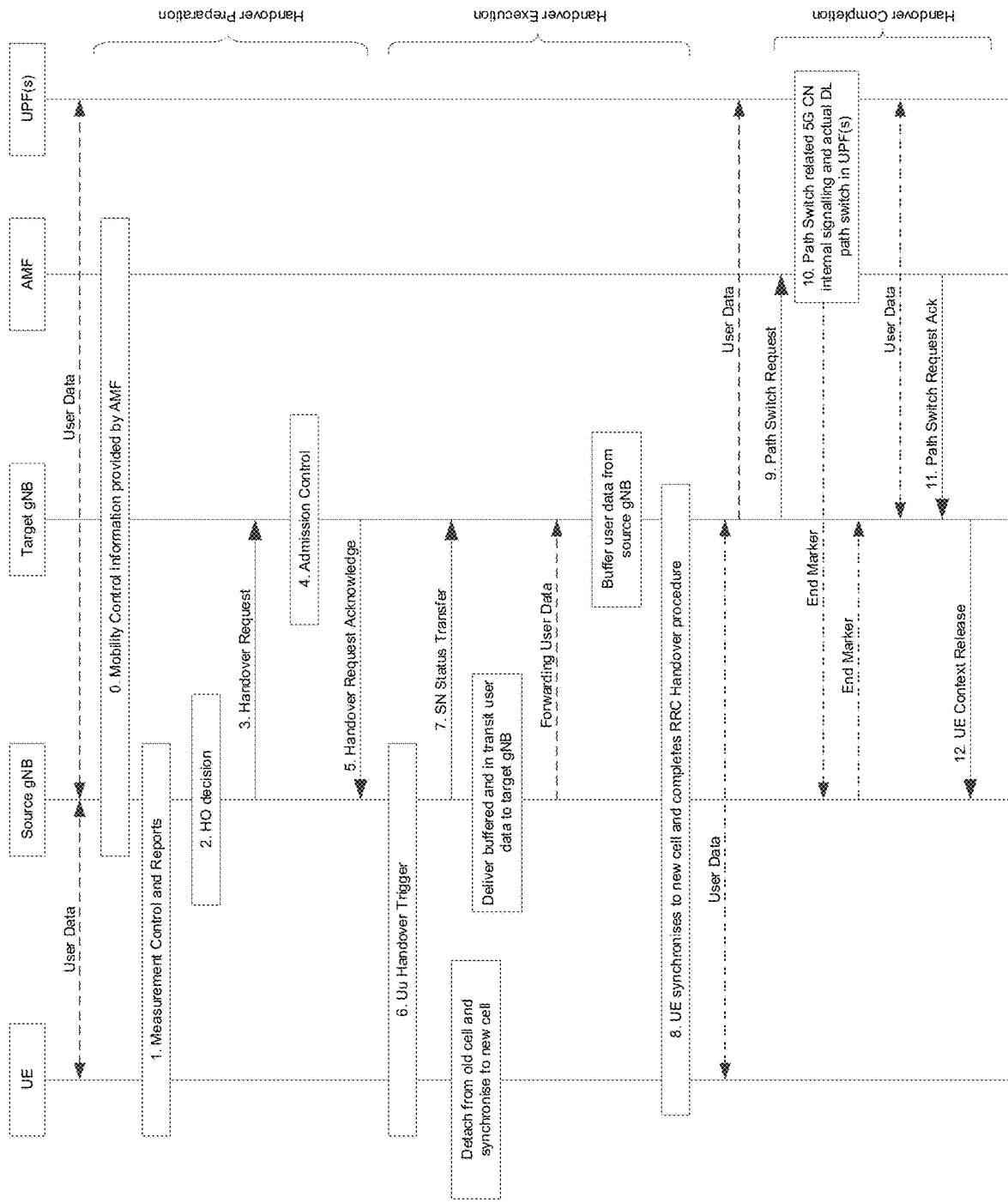
FIG. 27 shows an example of an inter-gNB handoff.

FIG. 27 shows an example of an inter-gNB handover. Techniques for inter-gNB handovers that can be utilized are described, e.g., in 3GPP TS 38.300.

The first field of the RA resource and/or the index of the RA preamble may be configured by the central RAN entity for the contention free RA procedure of the wireless device. The central RAN entity may transmit the first field of the RA resource, and/or the index of the RA preamble, to the distributed RAN entity. The distributed RAN entity may reserve the RA resource and monitor the RA resource to detect the RA preamble. If the distributed RAN entity does not detect the RA preamble on the RA resource, e.g., after monitoring the RA resource of the cell, the distributed RAN entity may transmit, to the central RAN entity, a first message indicating a RA failure of the wireless device. The first message may indicate that the distributed RAN entity does not detect the RA preamble on the RA resource. The first message may indicate that the contention free RA procedure of the wireless device associated with the RA preamble and/or the RA resource has failed. The first message may include a wireless device identifier (e.g., C-RNTI, TMSI, IMSI, and/or the like) of the wireless device, a RA failure indication, a cell identifier (e.g., global cell identifier, physical cell identifier, and/or the like) of the cell, the first field indicating the RA resource, the index of the RA preamble, and/or a type of the contention free RA procedure (e.g., contention free RA, RA for secondary cell synchronization, RA associated with a secondary cell activation, and/or RA for a handover procedure).

The first message may be configured based on one or more RA failures. The distributed RAN entity may determine the number of failures allowed for RA attempts, e.g., based on failures in detecting RA preambles for associated RA resources. The RA preambles and/or the associated RA resources may be configured by the distributed RAN entity, and/or the central RAN entity, for one or more RA procedures. The first message may include the number of failures for RA attempts. The first message may be transmitted if the number of failed of RA attempts is larger than a threshold number. The number of failures of RA attempts may be pre-defined and/or determined dynamically per a wireless device, per a RA preamble, per a RA resource, and/or per a cell. The first message may include a secondary cell activation failure, a secondary cell configuration failure, a secondary cell failure, and/or failures for the wireless device based on failing in detecting the RA preamble on the RA resource. The first message may include a handover failure indication of the wireless device. The handover failure indication may be determined based on a failure in detecting the RA preamble on the RA resource. The first message may be transmitted if the distributed RAN entity does not receive a contention based RA preamble from the wireless device for a time period, e.g., after a failure in detecting the RA preamble on the RA resource for the contention free RA procedure.

The central RAN entity may release a cell from a list of secondary cells for the wireless device, and/or may release corresponding configuration parameters for the cell as a secondary cell for the wireless device, based on one or more elements of the first message. The central RAN entity may confirm that a handover procedure of the wireless device has failed, e.g., based on one or more elements of the first message. The central RAN entity may release a wireless device context for the wireless device based on one or more elements of the first message. The wireless device context may include one or more: bearers, QoS flows, PDU sessions, NG interface configurations, logical channels, security configurations, and/or resource configurations for the wireless device. The central RAN entity may transmit a wireless device context release request (e.g., a wireless device context release request message) to a core network entity (e.g., AMF, MME, and/or the like) based on one or more elements of the first message.

Based on one or more elements of the first message, the central RAN entity may configure one or more: handover decision parameters (e.g., a handover threshold and/or a handover offset), secondary cell addition decision parameters, measurement configuration parameters, or additional configuration parameters. The central RAN entity may transmit a handover failure indication (and/or a radio link failure report) to the source base station of the wireless device based on one or more elements of the first message. The handover failure indication may be associated with a handover procedure using a contention free RA procedure. The handover failure indication may include a wireless device identifier (e.g., a C-RNTI in a source cell and/or in the cell, TMSI, and/or IMSI) of the wireless device, a handover report type (e.g., handover too early, handover to wrong cell, and/or handover too late), a handover cause, a cell identifier of a handover source cell and/or the cell (e.g., a handover target/failure cell), mobility information (e.g., a wireless device type, a wireless device moving speed, and/or mobility type), and/or a wireless device radio link failure report container (e.g., if the wireless device connects to the distributed RAN entity and/or the central RAN entity after failing the contention free RA procedure).

A distributed RAN entity may monitor a RA resource of a cell, e.g., to determine whether a RA preamble transmitted by a wireless device is detected. If the distributed RAN entity does not detect the RA preamble on the RA resource, the distributed RAN entity may transmit, to a central RAN entity, a first message indicating a RA failure of the wireless device. The distributed RAN entity may transmit (e.g., before the monitoring), to the wireless device, a RA command configured to initiate a RA. The RA command may include a first field indicating the RA resource and/or an index of the RA preamble. Before the monitoring, the distributed RAN entity may transmit, to the central RAN entity, a RA configuration information including a first field indicating the RA resource and/or an index of the RA preamble. One or more elements of the RA configuration information may be transmitted to the wireless device by the central RAN entity. The one or more elements of the RA configuration may be transmitted by the central RAN entity, to the wireless device, via a neighboring base station. The distributed RAN entity may receive, from the central RAN entity, scheduling information of the RA resource and an index of the RA preamble. The central RAN entity may release one or more configurations of the cell for the wireless device, e.g., based on the first message. The distributed RAN entity may release a wireless device context for the wireless device if the RA preamble is not detected and the RA is for a handover of the wireless device.

Figure 17:
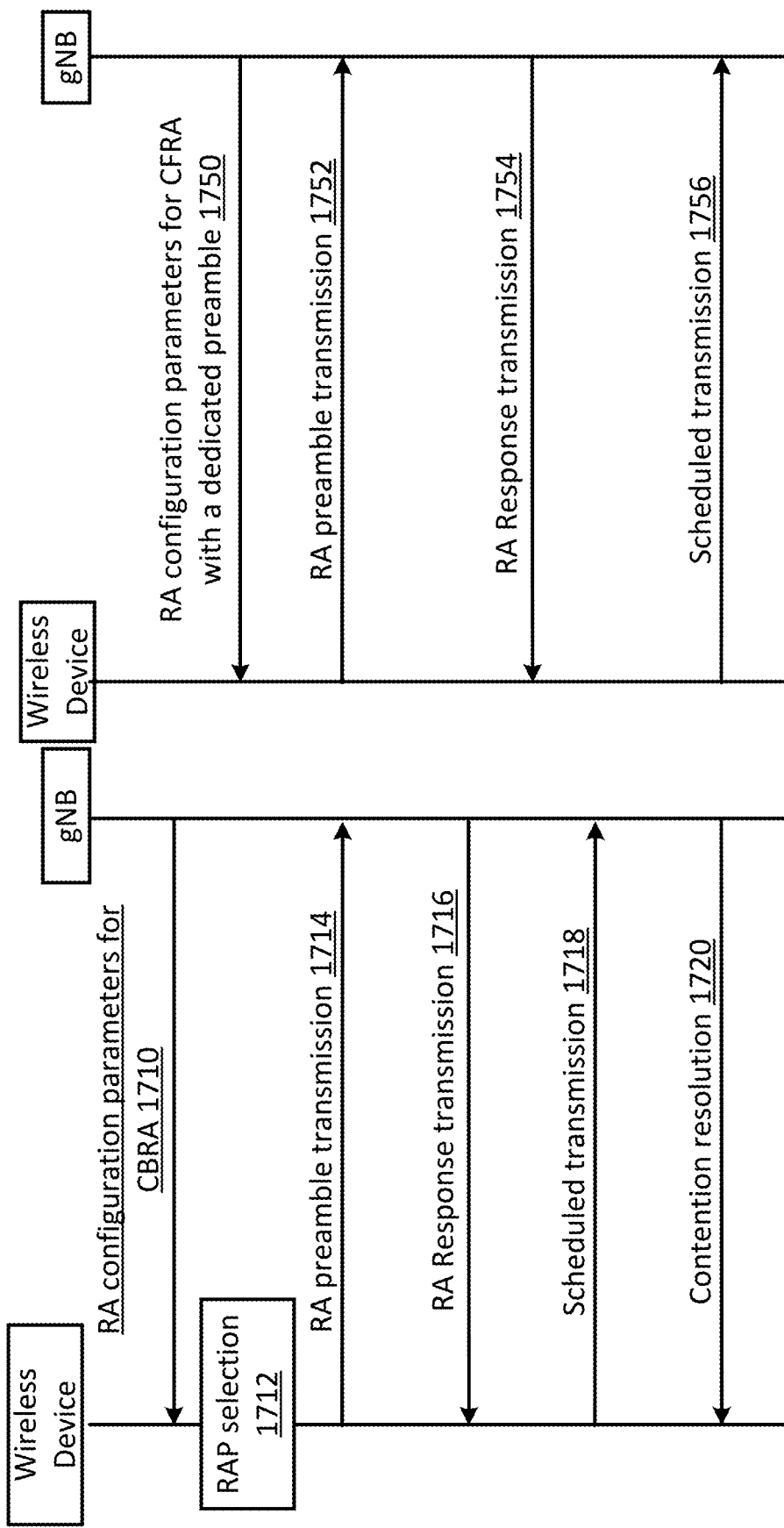
FIG. 17A and FIG. 17B are examples of a contention-based four-step RA procedure and contention free RA procedure.

FIG. 17A and FIG. 17B show examples of a contention-based four-step RA procedure and contention free RA procedure. In FIG. 17A, at step 1710, a gNB may transmit RA configuration parameters for CBRA to a wireless device. At step 1712, the wireless device may select a RAP. At step 1714, the wireless device may transmit a RA preamble to the gNB. At step 1716, the gNB may transmit a RA response to the wireless device. At step 1718, the wireless device may transmit a scheduled transmission to the gNB. At step 1720, the gNB may transmit a contention resolution to the wireless device. In FIG. 17B, at step 1750, the gNB may transmit RA configuration parameters for CFRA with a dedicated preamble to the wireless device. At step 1752, the wireless may transmit a RA preamble to the gNB. At step 1754, the gNB may transmit a RA response to the wireless device. At step 1756, the wireless device may transmit a scheduled transmission to the gNB.

Figure 23:
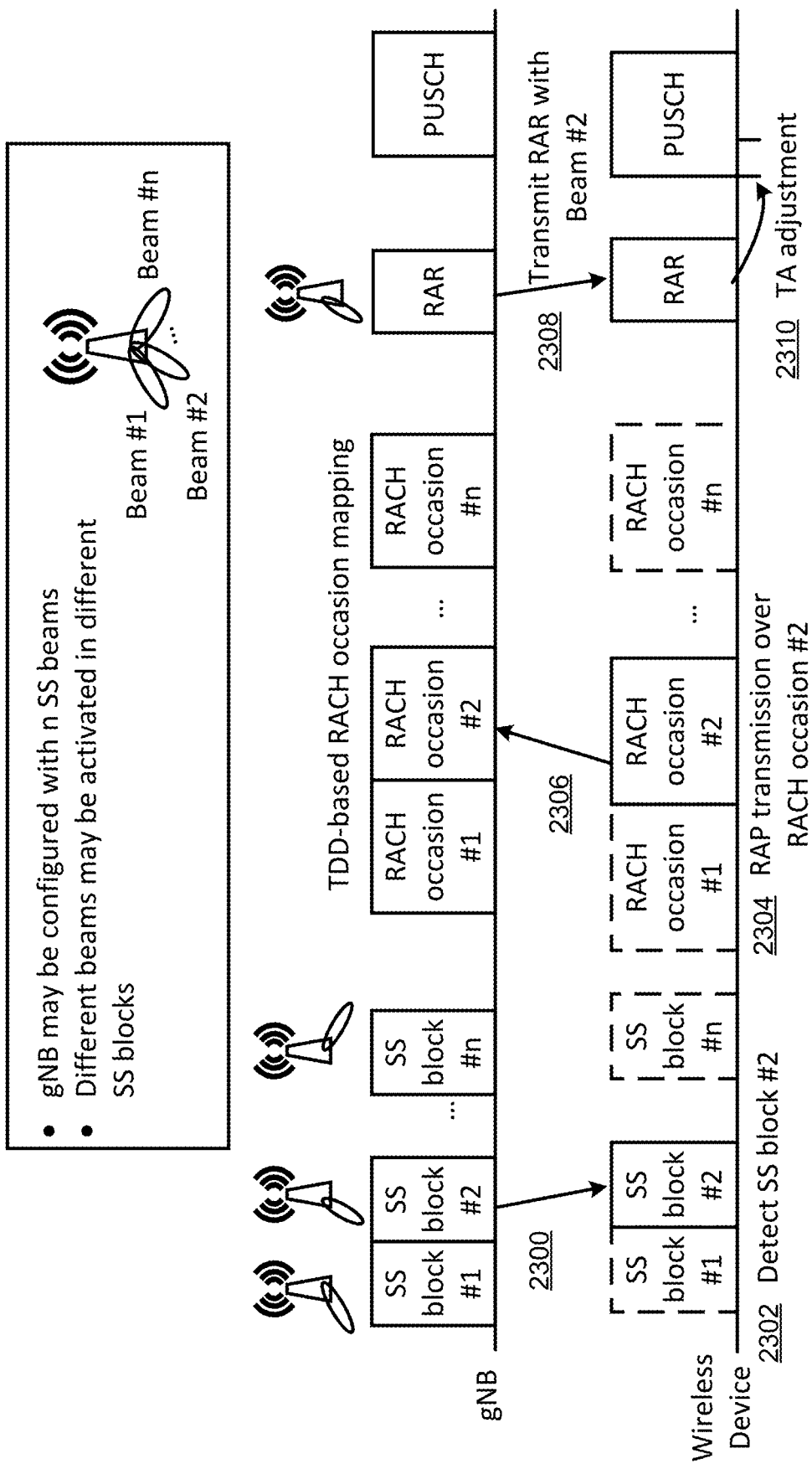
FIG. 23 shows an example of RA procedure with multi-beams.

FIG. 23 shows an example of RA procedure with multi-beams. At step 2300, a gNB may transmit SS blocks to a wireless device. At step 2302, the wireless device may detect a SS block. At step 2304, the wireless device may determine a RACH occasion, which may be mapped to the detected SS block. At step 2306, the wireless device may transmit a RAP transmission over the determined RACH occasion to the gNB. At step 2308, the gNB may transmit a RAR with a particular beam. At step 2310, the wireless device may adjust its TA.

Figure 28:
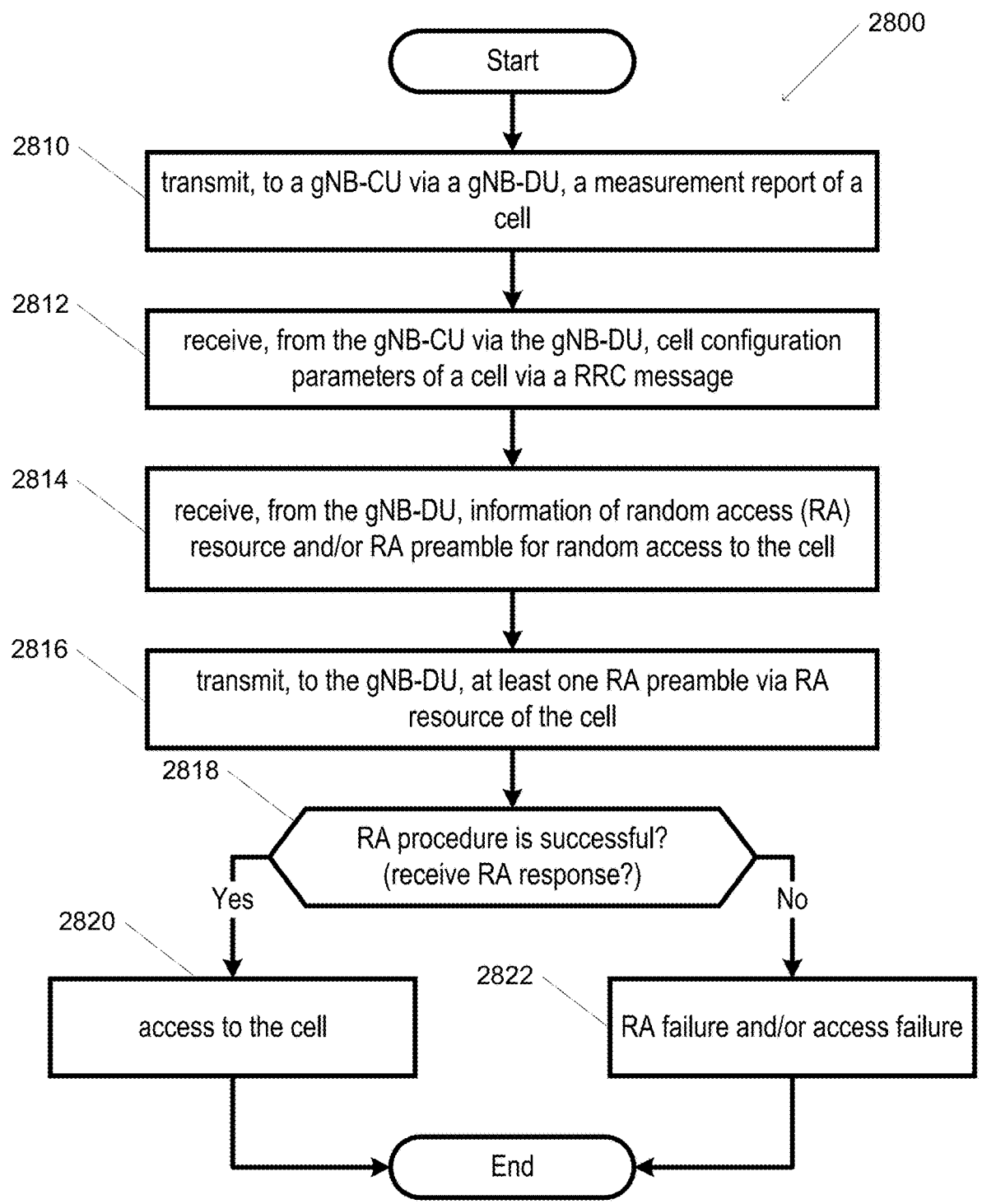
FIG. 28 shows an example of an inter-cell handoff from a wireless device.

FIG. 28 shows an example of an inter-cell handoff from a wireless device. Example 2800 may include a wireless device transmitting (2810), to a gNB-CU via a gNB-DU, a measurement report of a cell. The wireless device may receive (2812), from the gNB-CU via the gNB-DU, cell configuration parameters of a cell via a RRC message. The wireless device may receive (2814), from the gNB-DU, information describing the random access (RA) resource and/or the RA preamble for random access to the cell. The wireless device may transmit (2816), to the gNB-DU, one or more RA preambles via RA resource of the cell. If the RA procedure is successful (e.g., a RA response is received (2818)), the wireless device may access (2820) the cell. If the RA procedure is not successful (e.g., a RA response is not received (2818)), the wireless device may experience a RA failure and/or access failure (2822).

Figure 29:
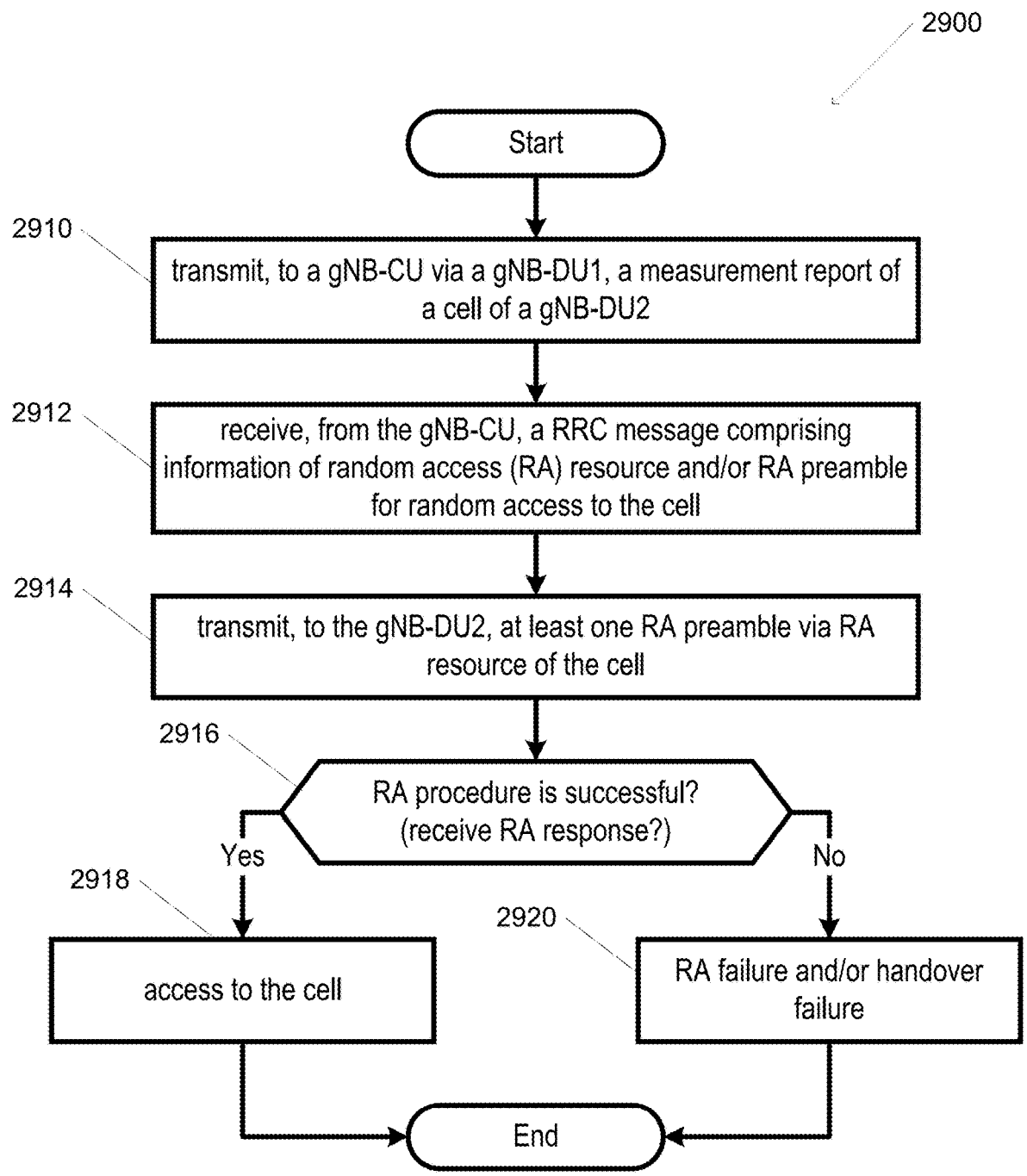
FIG. 29 shows an example of an inter-DU handoff from a wireless device.

FIG. 29 shows an example of an inter-DU handoff from a wireless device. Example 2900 may include a wireless device transmitting (2910), to a gNB-CU via a gNB-DU1, a measurement report of a cell of a gNB-DU2. The wireless device may receive (2912), from the gNB-CU, a RRC message comprising information describing the random access (RA) resource and/or the RA preamble for random access to the cell. The wireless device may transmit (2914), to the gNB-DU2, one or more RA preambles via RA resource of the cell. If the RA procedure is successful (e.g., a RA response is received (2916)), the wireless device may access (2918) the cell. If the RA procedure is not successful (e.g., a RA response is not received (2916)), the wireless device may experience a RA failure and/or access failure (2920).

Figure 30:
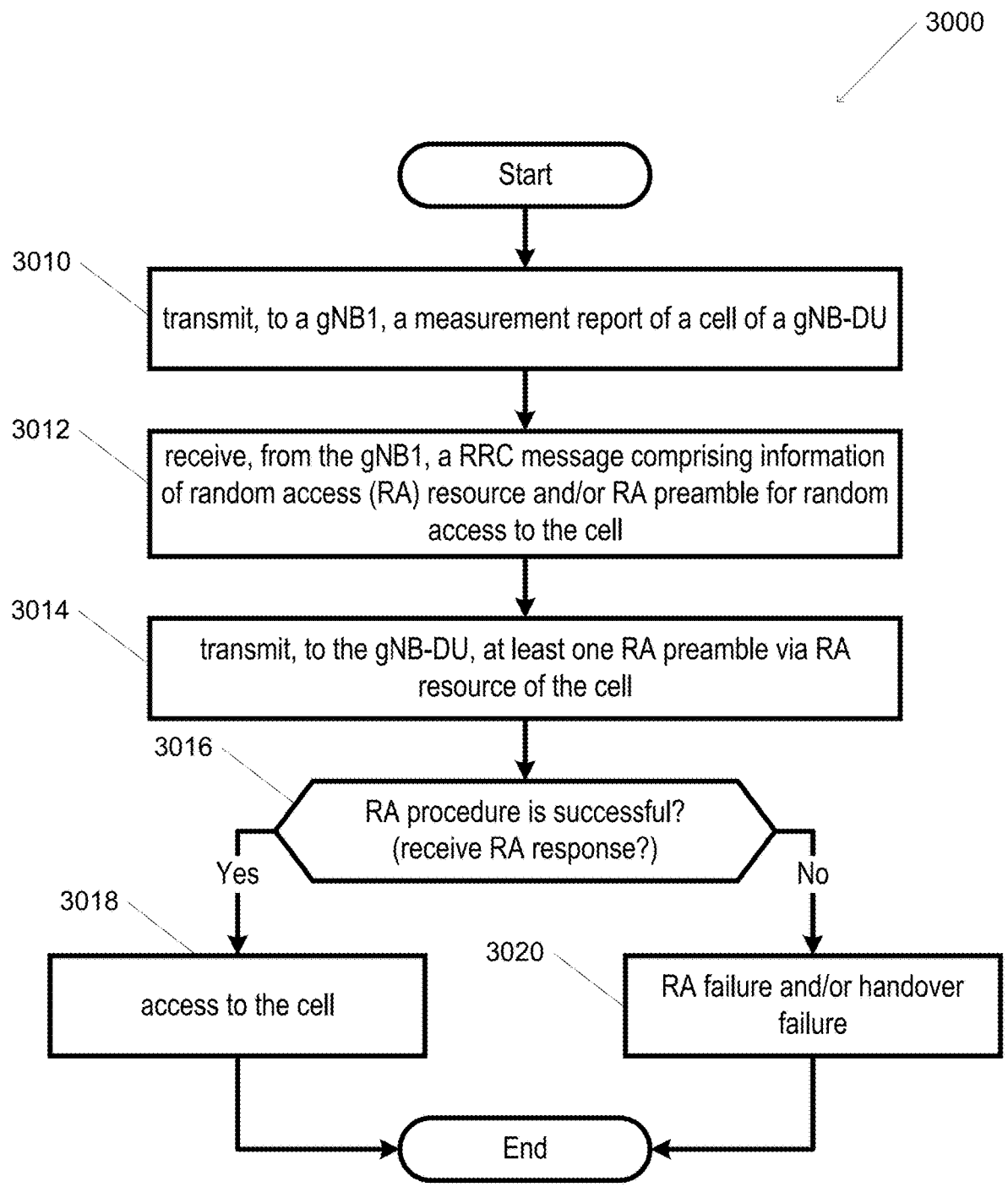
FIG. 30 shows an example of an inter-gNB handoff from a wireless device.

FIG. 30 shows an example of an inter-gNB handoff from a wireless device. The example 3000 may include a wireless device transmitting (3010), to a gNB1, a measurement report of a cell of a gNB-DU. The wireless device may receive (3012), from the gNB1, a RRC message comprising information describing the random access (RA) resource and/or the RA preamble for random access to the cell. The wireless device may transmit (3014), to the gNB-DU, one or more RA preambles via the RA resource of the cell. If the RA procedure is successful (e.g., a RA response is received (3016)), the wireless device may access (3018) the cell. If the RA procedure is not successful (e.g., a RA response is not received (3016)), the wireless device may experience a RA failure and/or access failure (3020).

Figure 31:
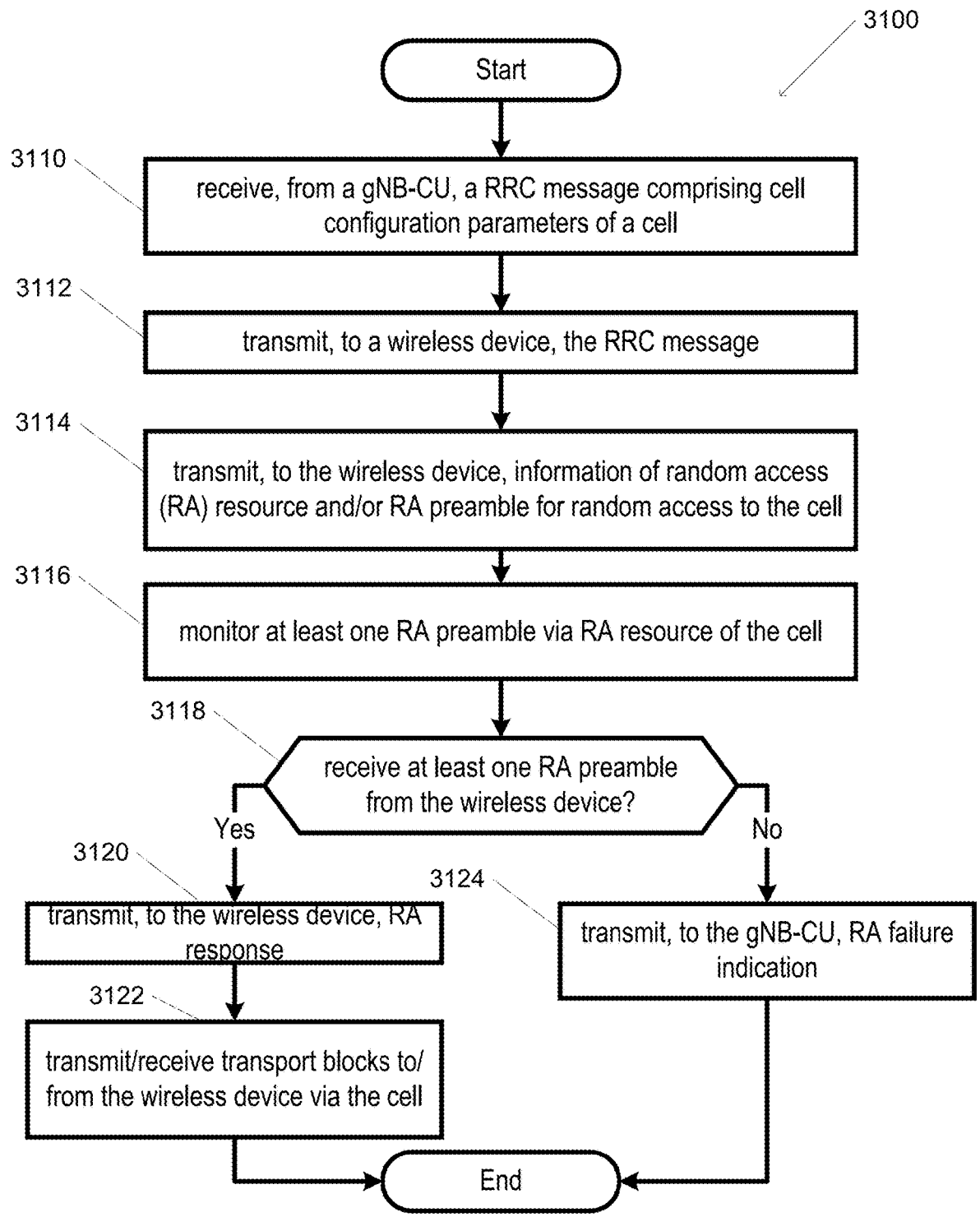
FIG. 31 shows an example of an inter-cell handoff from a gNB-DU.

FIG. 31 shows an example of an inter-cell handoff from a gNB-DU. The example 3100 may include a gNB-DU receiving (3110), from a gNB-CU, a RRC message comprising cell configuration parameters of a cell. The gNB-DU may transmit (3112), to a wireless device, the RRC message and transmits (3114), to the wireless device, information describing the random access (RA) resource and/or the RA preamble for random access to the cell. The gNB-DU may monitor (3116) one or more RA preambles via RA resource of the cell. If the gNB-DU receives (3118) one or more RA preambles from the wireless device, the gNB-DU may transmit (3120), to the wireless device, a RA response and may transmit/receive (3122) transport blocks to/from the wireless device via the cell. If the gNB-DU does not receive (3118) one or more RA preambles from the wireless device, the gNB-DU may transmit (3124), to the gNB-CU, a RA failure indication.

Figure 32:
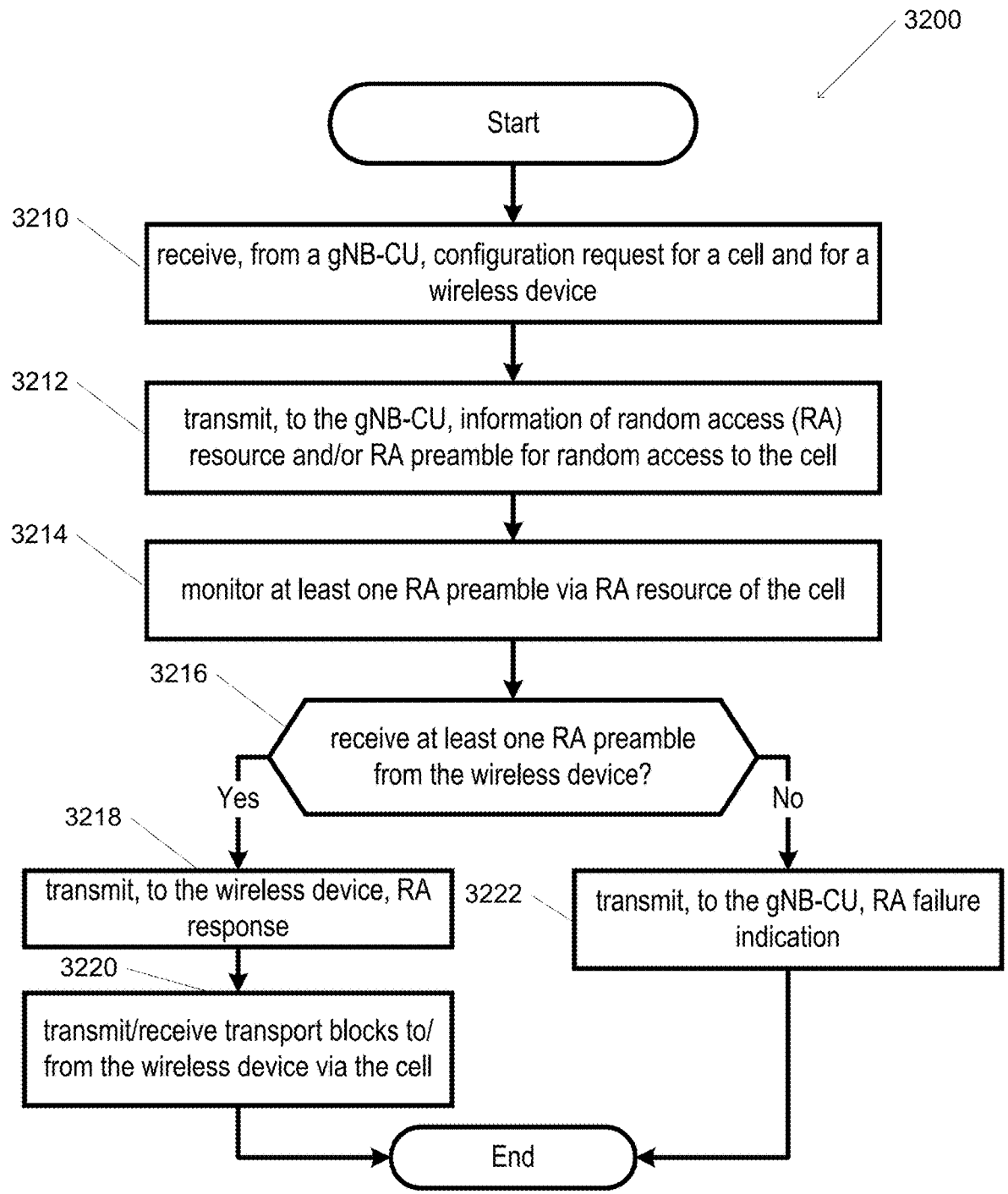
FIG. 32 shows an example of an inter-DU handoff from a gNB-DU.

FIG. 32 shows an example of an inter-DU handoff from a gNB-DU. Example 3200 may include a gNB-DU receiving (3210), from a gNB-CU, configuration request for a cell and for a wireless device. The gNB-DU may transmit (3212), to the gNB-CU, information describing the random access (RA) resource and/or the RA preamble for random access to the cell. The gNB-DU may monitor (3214) one or more RA preambles via RA resource of the cell. If the gNB-DU receives (3216) one or more RA preambles from the wireless device, the gNB-DU may transmit (3218), to the wireless device, a RA response and may transmit/receive (3220) transport blocks to/from the wireless device via the cell. If the gNB-DU does not receive (3216) one or more RA preambles from the wireless device, the gNB-DU may transmit (3222), to the gNB-CU, a RA failure indication.

Figure 33:
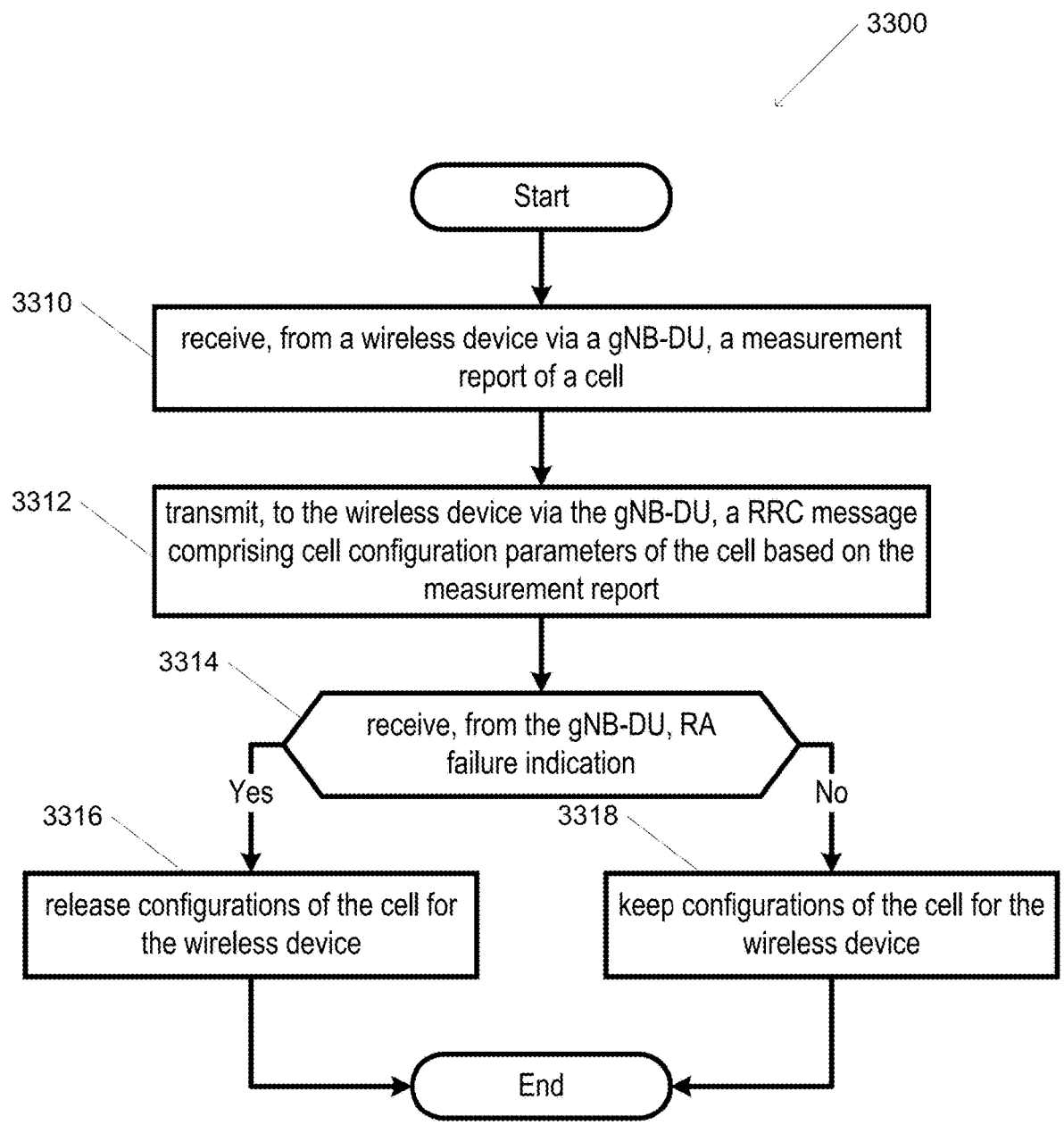
FIG. 33 shows an example of an inter-cell handoff from a gNB-central unit (CU).

FIG. 33 shows an example of an inter-cell handoff from a gNB-CU. The example 3300 includes a gNB-CU receiving (3310), from a wireless device via a gNB-DU, a measurement report of a cell. The gNB-CU may transmit (3312), to the wireless device via the gNB-DU, a RRC message comprising cell configuration parameters of the cell based on the measurement report. If the gNB-CU receives (3314), from the gNB-DU, a RA failure indication, the gNB-CU may release (3316) configurations of the cell for the wireless device. If the gNB-CU does not receive (3314) the failure indication, the gNB-CU may keep (3318) configurations of the cell for the wireless device.

Figure 34:
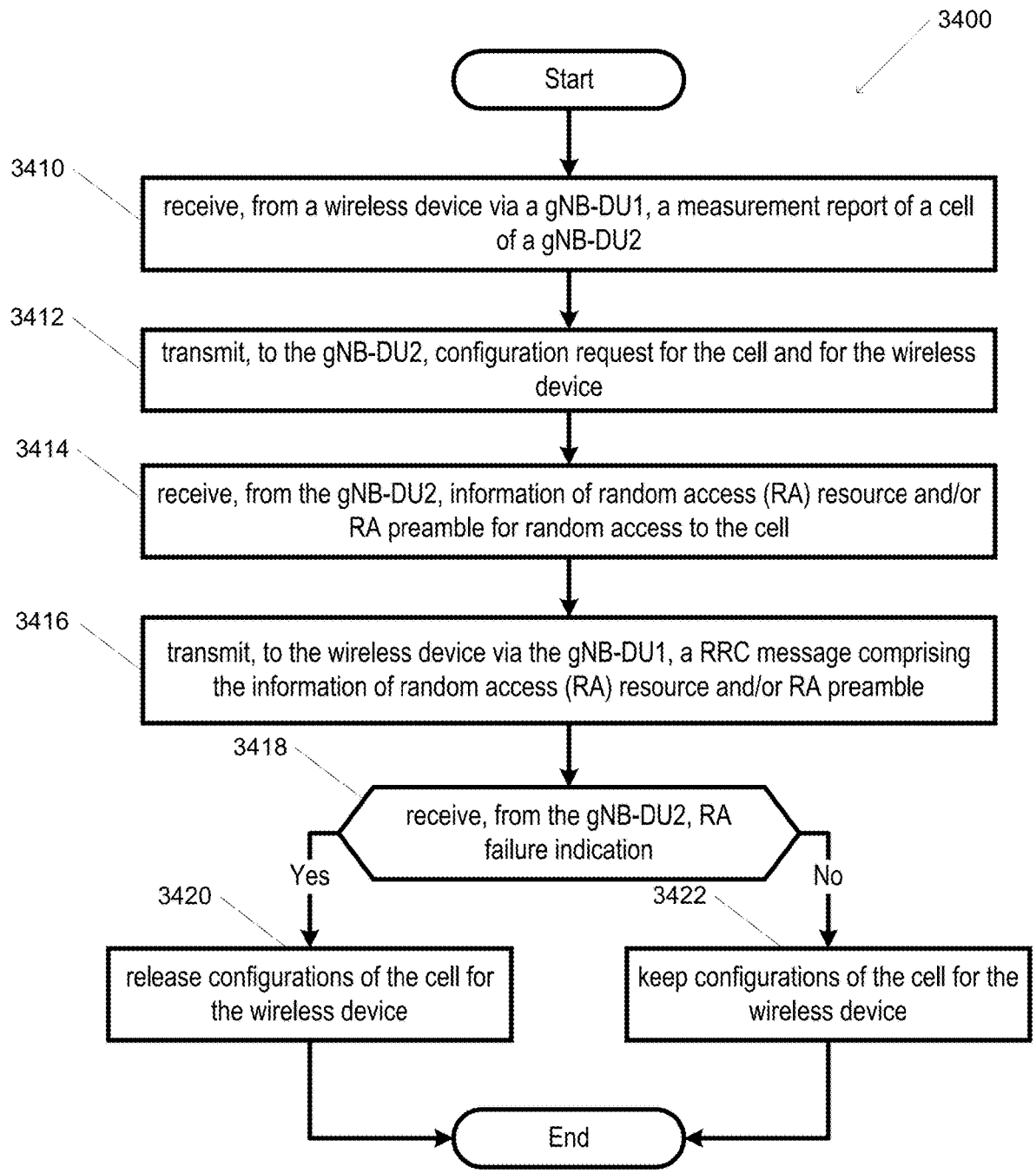
FIG. 34 shows an example of an inter-DU handoff from a gNB-CU.

FIG. 34 shows an example of an inter-DU handoff from a gNB-CU. The example 3400 may include a gNB-CU receiving (3410), from a wireless device via a gNB-DU1, a measurement report of a cell of a gNB-DU2. The gNB-CU may transmit (3412), to the gNB-DU2, configuration request for the cell and for the wireless device. The gNB-CU may receive (3414), from the gNB-DU2, information describing the random access (RA) resource and/or the RA preamble for random access to the cell. The gNB-CU may transmit (3416), to the wireless device via the gNB-DU1, a RRC message comprising the information describing the random access (RA) resource and/or the RA preamble. If the gNB-CU receives (3418), from the gNB-DU2, a RA failure indication, the gNB-CU may release (3420) configurations of the cell for the wireless device. If the gNB-CU does not receive (3418) the failure indication, the gNB-CU may keep (3422) configurations of the cell for the wireless device.

Figure 35:
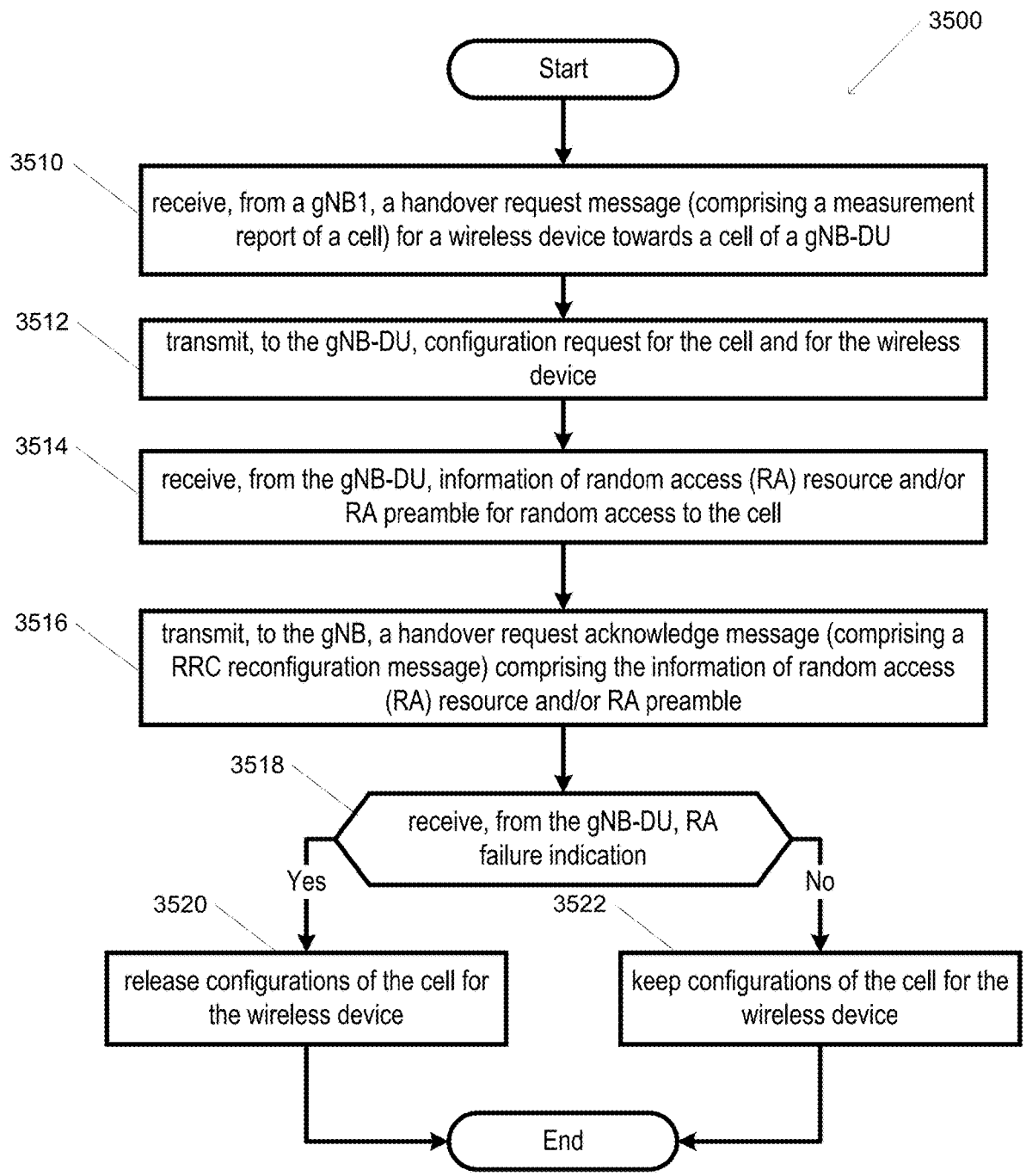
FIG. 35 shows an example of an inter-gNB handoff from a gNB-CU.

FIG. 35 shows an example of an inter-gNB handoff from a gNB-CU. The example 3500 may include a gNB-CU receiving (3510), from a gNB1, a handover request message (comprising a measurement report of a cell) for a wireless device towards a cell of a gNB-DU. The gNB-CU may transmit (3512), to the gNB-DU, configuration request for the cell and for the wireless device. The gNB-CU may receive (3514), from the gNB-DU, information describing the random access (RA) resource and/or RA preamble for random access to the cell. The gNB-CU may transmit (3516), to the gNB, a handover request acknowledge message (comprising a RRC reconfiguration message) comprising the information describing the random access (RA) resource and/or the RA preamble. If the gNB-CU receives (3518), from the gNB-DU, a RA failure indication, the gNB-CU may release (3520) configurations of the cell for the wireless device. If the gNB-CU does not receive (3518) the failure indication, the gNB-CU may keep (3522) configurations of the cell for the wireless device.

Figure 36:
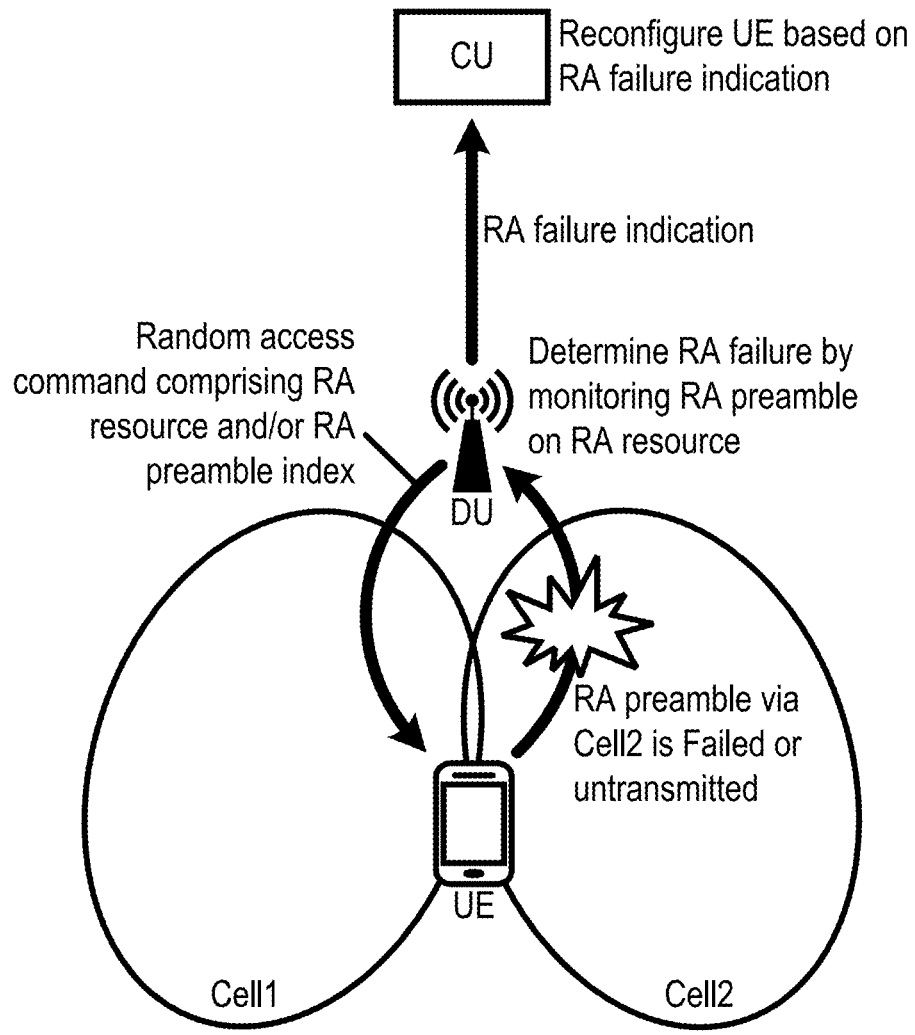
FIG. 36 shows an example of a secondary cell.

FIG. 36 shows an example diagram of a random access failure detection and a report of a gNB-DU for a secondary cell addition procedure of a wireless device. A gNB-DU or a gNB-CU may determine to add a secondary cell (e.g., cell2 in FIG. 36) for a wireless device. The determination of the secondary cell addition may be based on a measurement report received from the wireless device, the measurement report comprising an RSRP and/or an RSRQ of the secondary cell. Based on the determination, the gNB-DU may configure one or more random access resources and/or a random access preamble (e.g., a preamble index) for a random access of the wireless device to the secondary cell. The gNB-DU may transmit the random access configuration information comprising the one or more random access resources and/or the preamble index to the gNB-CU. The gNB-CU may forward the random access configuration information to the wireless device via a RRC message (e.g., a RRC connection reconfiguration message). The gNB-CU may transmit the RRC message to the wireless device via the gNB-DU. Based on receiving the RRC message, the wireless device may transmit a RRC response message (e.g., a RRC connection reconfiguration complete message) to the gNB-CU. The gNB-DU may monitor the one or more random access resources to detect the random access preamble. The wireless device may transmit the random access preamble via the one or more random access resources. The wireless device may transmit the random access preamble. The transmission of the random access preamble may fail, e.g., the gNB-DU may fail in receiving (and/or detecting) the random access preamble on the one or more random access resources. The wireless device may not transmit the random access preamble for various reasons (e.g., system error, channel quality decrease, and/or lack of transmission power). Based on determining a detection failure with respect to the random access preamble on the one or more random access resources, the gNB-DU may transmit to the gNB-CU a random access failure indication for the wireless device. Based on the random access failure indication, the gNB-CU may reconfigure radio resource control parameters of the wireless device. The gNB-CU may release the secondary cell for the wireless device. The gNB-CU may request a second random access preamble and/or one or more second random access resources for a random access of the wireless device to the secondary cell. The gNB-CU may transmit to the wireless device a second RRC connection reconfiguration message comprising the reconfigured radio resource control parameters (e.g., for release of the secondary cell or for reconfiguration of random access parameters for addition of the secondary cell).

Figure 37:
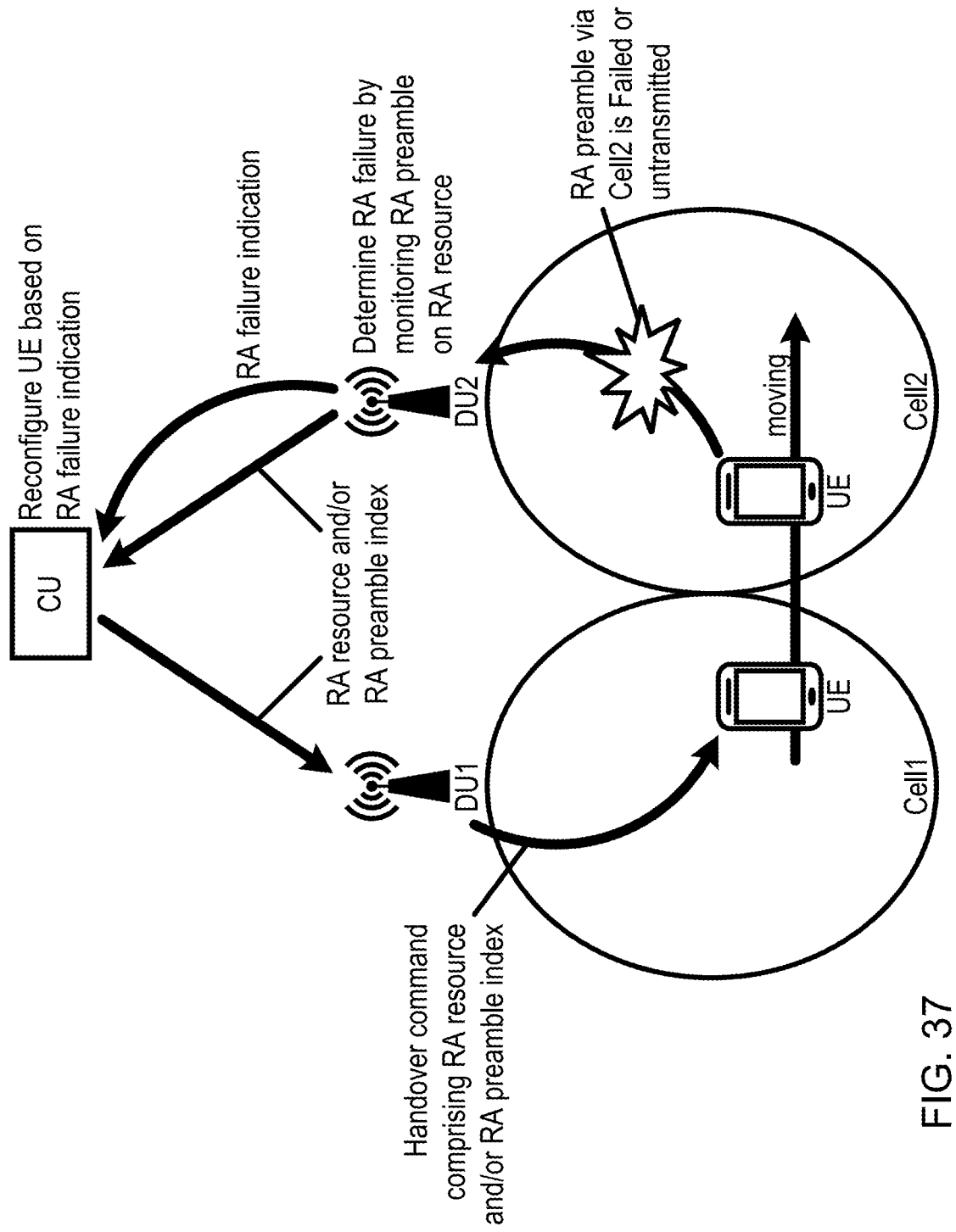
FIG. 37 shows an example of an inter-DU handoff.

FIG. 37 shows an example diagram of a random access failure detection and a report of a gNB-DU for an inter-DU handover (e.g., intra-gNB handover) procedure of a wireless device. A gNB-CU may determine to handover a wireless device from a source cell (e.g., cell1 in FIG. 37) of a first gNB-DU to a target cell (e.g., cell2 in FIG. 37) of a second gNB-DU. The determination of the handover of the wireless device may be based on a measurement report received from the wireless device. The measurement report may comprise an RSRP and/or an RSRQ of the source cell and/or the target cell. Based on determining that a handover should occur, the gNB-CU may request cell configurations for the wireless device for the second gNB-DU. The second gNB-DU may configure one or more random access resources and/or a random access preamble (e.g., a preamble index) for random access of the wireless device to the target cell. The second gNB-DU may transmit the random access configuration information comprising the one or more random access resources and/or the preamble index to the gNB-CU. The gNB-CU may forward the random access configuration information to the wireless device via a RRC message (e.g., a RRC connection reconfiguration message and/or a handover command message). The gNB-CU may transmit the RRC message to the wireless device via the first gNB-DU. Based on receiving the RRC message, the wireless device may transmit a RRC response message (e.g., a RRC connection reconfiguration complete message) to the gNB-CU. The second gNB-DU may monitor the one or more random access resources to detect the random access preamble. The wireless device may transmit the random access preamble via the one or more random access resources. The wireless device may transmit the random access preamble. The transmission of the random access preamble may fail, e.g., the second gNB-DU may fail in receiving (and/or detecting) the random access preamble on the one or more random access resources. The wireless device may not transmit the random access preamble for various reasons (e.g., system error, channel quality decrease, lack of transmission power, and/or initiating a random access to other target cell). Based on experiencing a detection failure of the random access preamble on the one or more random access resources, the second gNB-DU may transmit to the gNB-CU a random access failure indication for the wireless device. Based on the random access failure indication, the gNB-CU may reconfigure the radio resource control parameters for the wireless device. The gNB-CU may identify a handover failure of the wireless device based on the random access failure indication. The gNB-CU may release one or more configurations for the target cell for the wireless device. The gNB-CU may indicate a handover failure of the wireless device to the first gNB-DU. The gNB-CU may reconfigure one or more handover triggering parameters (e.g., handover threshold, power threshold, and/or triggering time parameters) for the source cell and/or the target cell.

Figure 38:
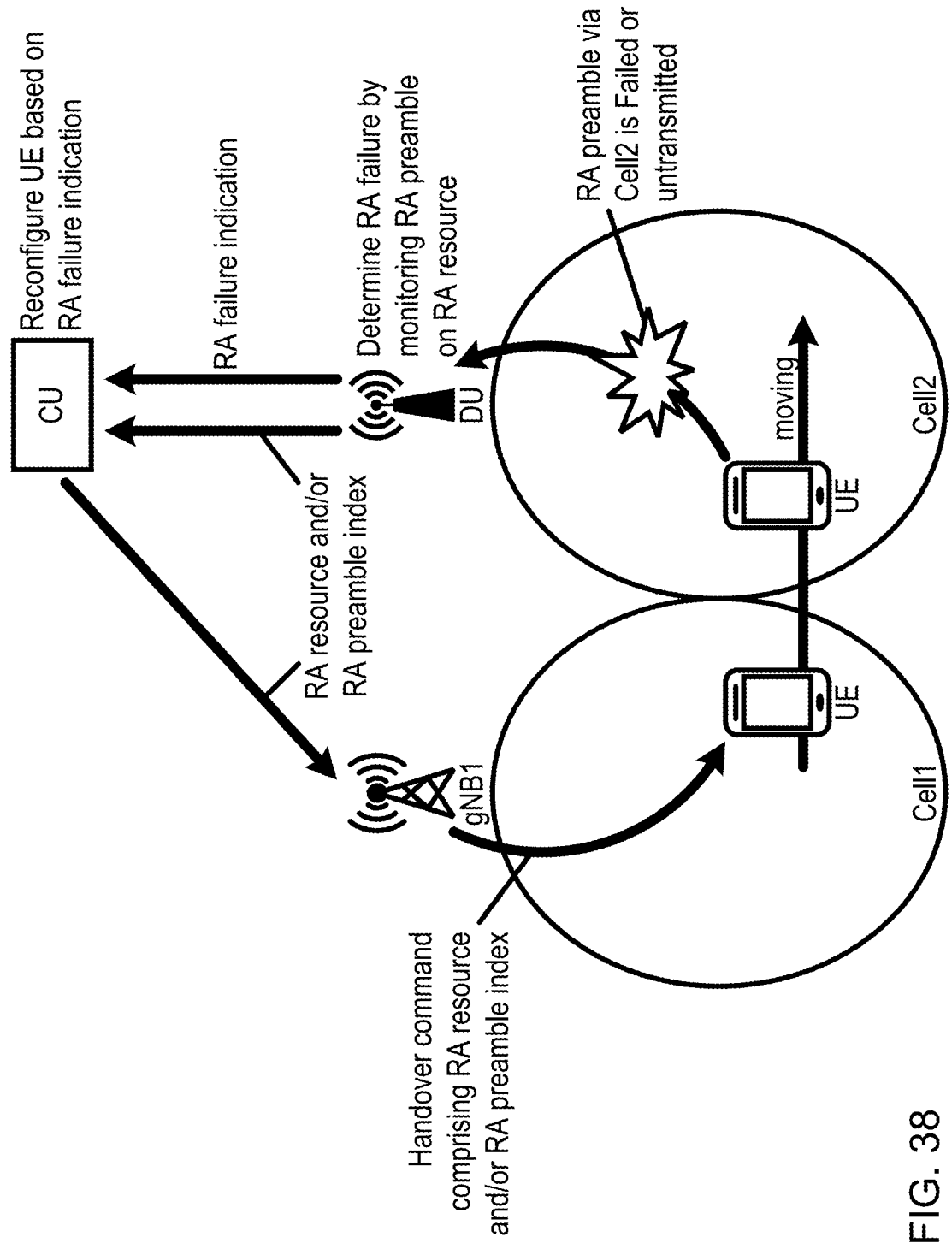
FIG. 38 shows an example of an inter-gNB handoff.

FIG. 38 shows an example diagram of a random access failure detection and a report of a gNB-DU for an inter-gNB handover procedure of a wireless device. A first gNB may determine to handover a wireless device from a source cell (e.g., cell1 in FIG. 38) of the first gNB to a target cell (e.g., cell2 in FIG. 38) of a gNB-DU in a second gNB-CU (e.g., of a second gNB). The second gNB may comprise the gNB-CU and the gNB-DU. The determination of the handover of the wireless device may be based on a measurement report received from the wireless device. The measurement report may comprise an RSRP and/or an RSRQ of the source cell and/or the target cell. Based on determining the handover, the first gNB may transmit to the gNB-CU (e.g., the second gNB) a handover request comprising an identifier of the target cell and/or the measurement report received from the wireless device. The handover request may be transmitted via a Xn (e.g., X2) interface between the first gNB and the gNB-CU or via N2 (e.g., NG, S1) interfaces and a core network node (e.g., AMF). Based on receiving the handover request, the gNB-CU may request cell configurations for the wireless device to the gNB-DU. The gNB-DU may configure one or more random access resources and/or a random access preamble (e.g., a preamble index) for random access of the wireless device to the target cell. The gNB-DU may transmit the random access configuration information, comprising the one or more random access resources and/or the preamble index, to the gNB-CU. The gNB-CU may transmit to the first gNB a handover request acknowledgement comprising the random access configuration information. The handover request acknowledgement may be transmitted via the Xn (e.g., X2) interface between the first gNB and the gNB-CU and/or via the N2 (e.g., NG, S1) interfaces and the core network node (e.g., AMF). The first gNB may forward the random access configuration information to the wireless device via a RRC message (e.g., a RRC connection reconfiguration message, a handover command message). Based on receiving the RRC message, the wireless device may transmit a RRC response message (e.g., a RRC connection reconfiguration complete message) to the first gNB. The gNB-DU may monitor the one or more random access resources to detect the random access preamble. The wireless device may transmit the random access preamble via the one or more random access resources. The wireless device may transmit the random access preamble. The transmission of the random access preamble may fail, e.g., the gNB-DU may fail in receiving (and/or detecting) the random access preamble on the one or more random access resources. The wireless device may not transmit the random access preamble for various reasons (e.g., system error, channel quality decrease, lack of transmission power, and/or initiating a random access to other target cell). Based on identifying a detection failure of the random access preamble on the one or more random access resources, the gNB-DU may transmit to the gNB-CU a random access failure indication for the wireless device. Based on the random access failure indication, the gNB-CU may reconfigure the radio resource control parameters for the wireless device. The gNB-CU may determine a handover failure of the wireless device based on the random access failure indication. The gNB-CU may release one or more configurations for the target cell for the wireless device. The gNB-CU may reconfigure handover related configuration parameters of the target cell based on the random access failure indication. The gNB-CU may indicate a handover failure of the wireless device to the first gNB. Based on the handover failure indication, the first gNB may reconfigure handover triggering parameters (e.g., handover threshold, power threshold, and/or triggering time parameters) for the source cell and/or the target cell.

A base station (e.g., a gNB), a wireless device, or any other device may perform any combination of a step and/or a complementary step of one or more of the steps described herein.

Figure 39:
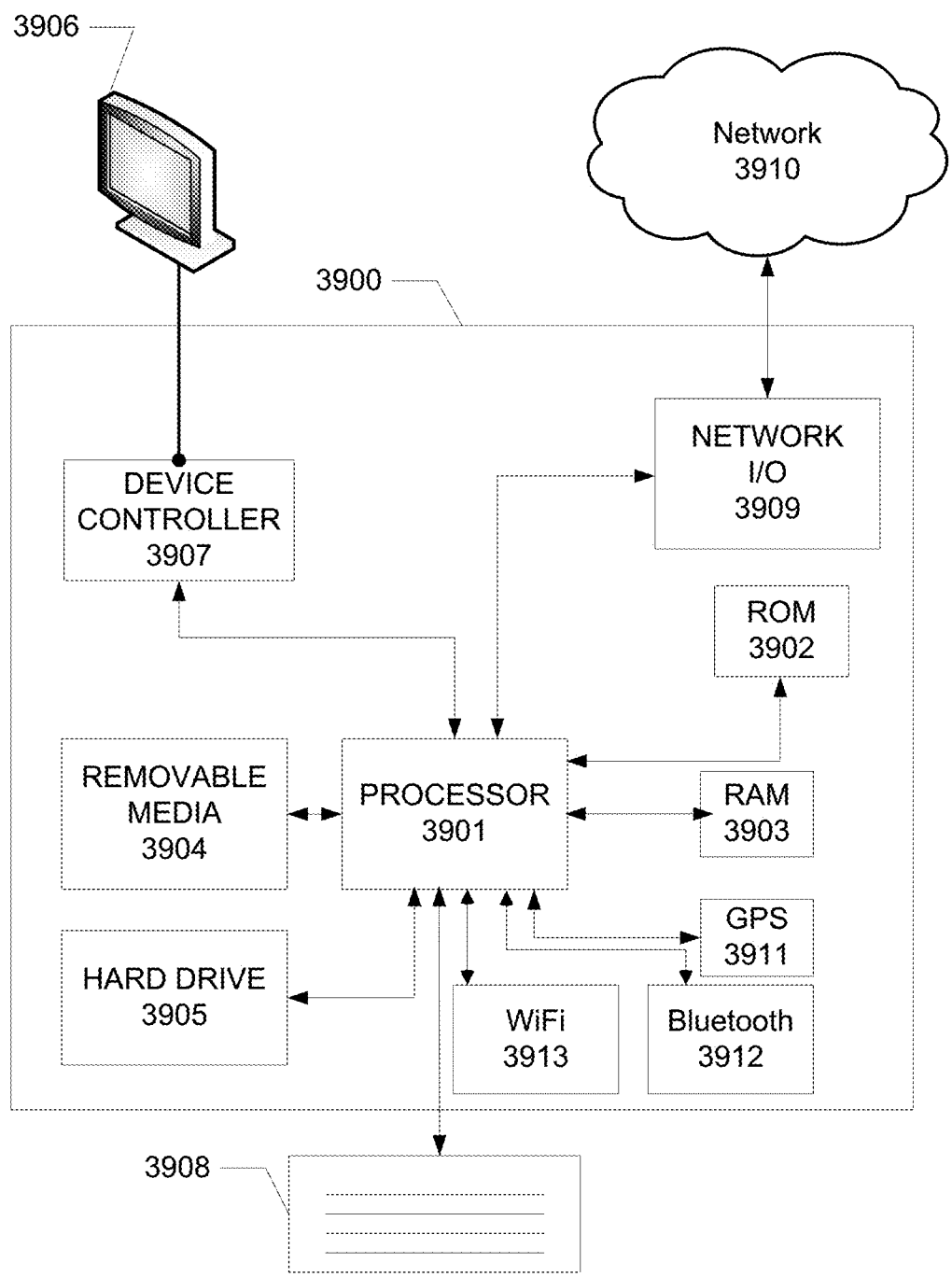
FIG. 39 shows example elements of a computing device that may be used to implement any of the various devices described herein.

FIG. 39 shows general hardware elements that may be used to implement any of the various computing devices discussed herein, including, e.g., the base station 401, the wireless device 406, or any other base station, wireless device, or computing device. The computing device 3900 may include one or more processors 3901, which may execute instructions stored in the random access memory (RAM) 3903, the removable media 3904 (such as a Universal Serial Bus (USB) drive, compact disk (CD) or digital versatile disk (DVD), or floppy disk drive), or any other desired storage medium. Instructions may also be stored in an attached (or internal) hard drive 3905. The computing device 3900 may also include a security processor (not shown), which may execute instructions of a one or more computer programs to monitor the processes executing on the processor 3901 and any process that requests access to any hardware and/or software components of the computing device 3900 (e.g., ROM 3902, RAM 3903, the removable media 3904, the hard drive 3905, the device controller 3907, a network interface 3909, a GPS 3911, a Bluetooth interface 3912, a WiFi interface 3913, etc.). The computing device 3900 may include one or more output devices, such as the display 3906 (e.g., a screen, a display device, a monitor, a television, etc.), and may include one or more output device controllers 3907, such as a video processor. There may also be one or more user input devices 3908, such as a remote control, keyboard, mouse, touch screen, microphone, etc. The computing device 3900 may also include one or more network interfaces, such as a network interface 3909 which may be a wired interface, a wireless interface, or a combination of the two. The network interface 3909 may provide an interface for the computing device 3900 to communicate with a network 3910 (e.g., a RAN, or any other network). The network interface 3909 may include a modem (e.g., a cable modem), and the external network 3900 may include communication links, an external network, an in-home network, a provider's wireless, coaxial, fiber, or hybrid fiber/coaxial distribution system (e.g., a DOCSIS network), or any other desired network. Additionally, the computing device 3900 may include a location-detecting device, such as a global positioning system (GPS) microprocessor 3911, which may be configured to receive and process global positioning signals and determine, with possible assistance from an external server and antenna, a geographic position of the computing device 3900.

The example in FIG. 39 is a hardware configuration, although the components shown may be implemented as software as well. Modifications may be made to add, remove, combine, divide, etc. components of the computing device 3900 as desired. Additionally, the components may be implemented using basic computing devices and components, and the same components (e.g., processor 3901, ROM storage 3902, display 3906, etc.) may be used to implement any of the other computing devices and components described herein. For example, the various components described herein may be implemented using computing devices having components such as a processor executing computer-executable instructions stored on a computer-readable medium, as shown in FIG. 39. Some or all of the entities described herein may be software based, and may co-exist in a common physical platform (e.g., a requesting entity may a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may include computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to provide the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   sending, by a distributed unit to a computing device, an indication of a random access (RA) resource of a cell for a wireless device; and
   sending, by the distributed unit to a central unit, an RA failure indication associated with the wireless device,
   wherein a base station comprises the central unit and the distributed unit.

2. The method of claim 1, further comprising:
   receiving, by the distributed unit from the wireless device via the cell, one or more transport blocks; and
   sending, by the distributed unit, the one or more transport blocks.

3. The method of claim 1, further comprising sending, by the distributed unit to the wireless device, an indication of at least one RA preamble for random access to the cell.

4. The method of claim 1, wherein the computing device comprises one of the central unit or the wireless device.

5. The method of claim 1, further comprising:
   receiving, by the distributed unit from the central unit, a message comprising cell configuration parameters of the cell.

6. The method of claim 1, wherein the sending the RA failure indication comprises sending the RA failure indication based on a determination that the distributed unit did not receive, after the sending the indication, at least one RA preamble from the wireless device via the RA resource of the cell.

7. A method comprising:
   receiving, by a central unit from a distributed unit, an indication of a random access (RA) resource of a cell for a wireless device;
   sending, by the central unit to the wireless device, a radio resource control message comprising the indication of the RA resource of the cell; and
   receiving, by the central unit from the distributed unit, an RA failure indication associated with the wireless device,
   wherein a base station comprises the central unit and the distributed unit.

8. The method of claim 7, wherein the RA resource comprises an indication of at least one of:
   a secondary cell synchronization, or
   a handover of the wireless device.

9. The method of claim 7, wherein the indication of the RA resource comprises an indication of a synchronization signal block of the cell.

10. The method of claim 7, wherein the distributed unit comprises a first distributed unit, and wherein the sending the radio resource control message comprises sending the radio resource control message via one of the first distributed unit or a second distributed unit.

11. The method of claim 7, further comprising receiving, by the central unit from the wireless device and based on the radio resource control message, a radio resource control complete message.

12. The method of claim 7, further comprising sending, by the central unit to the distributed unit, a message comprising cell configuration parameters of the cell.

13. The method of claim 7, wherein the RA failure indication indicates a reception failure, by the distributed unit, of an RA preamble via the RA resource of the cell.

14. A distributed unit comprising:
    one or more processors; and
    memory storing instructions that, when executed by the one or more processors, cause the distributed unit to:
       send, to a computing device, an indication of a random access (RA) resource of a cell for a wireless device; and
       send, to a central unit, an RA failure indication associated with the wireless device, wherein a base station comprises the central unit and the distributed unit.

15. The distributed unit of claim 14, wherein the instructions, when executed by the one or more processors, further cause the distributed unit to:
    receive, from the wireless device via the cell, one or more transport blocks; and
    send the one or more transport blocks.

16. The distributed unit of claim 14, wherein the instructions, when executed by the one or more processors, further cause the distributed unit to:
    send, to the wireless device, an indication of at least one RA preamble for random access to the cell.

17. The distributed unit of claim 14, wherein the computing device comprises one of the central unit or the wireless device.

18. The distributed unit of claim 14, wherein the instructions, when executed by the one or more processors, further cause the distributed unit to:
    receive, from the central unit, a message comprising cell configuration parameters of the cell.

19. The distributed unit of claim 14, wherein the instructions, when executed by the one or more processors, cause the distributed unit to send the RA failure indication by sending the RA failure indication based on a determination that the distributed unit did not receive, after the sending the indication, at least one RA preamble from the wireless device via the RA resource of the cell.

20. A central unit comprising:
    one or more processors; and
    memory storing instructions that, when executed by the one or more processors, cause the central unit to:
       receive, from a distributed unit, an indication of a random access (RA) resource of a cell for a wireless device;
       send, to the wireless device, a radio resource control message comprising the indication of the RA resource of the cell; and
       receive, from the distributed unit, an RA failure indication associated with the wireless device,
    wherein a base station comprises the central unit and the distributed unit.

21. The central unit of claim 20, wherein the RA resource comprises an indication of at least one of:
a secondary cell synchronization, or
a handover of the wireless device.

22. The central unit of claim 20, wherein the indication of the RA resource comprises an indication of a synchronization signal block of the cell.

23. The central unit of claim 20, wherein the distributed unit comprises a first distributed unit, and
wherein the instructions, when executed by the one or more processors, cause the central unit to send the radio resource control message by sending the radio resource control message via one of the first distributed unit or a second distributed unit.

24. The central unit of claim 20, wherein the instructions, when executed by the one or more processors, further cause the central unit to receive, from the wireless device and based on the radio resource control message, a radio resource control complete message.

25. The central unit of claim 20, wherein the instructions, when executed by the one or more processors, further cause the central unit to send, to the distributed unit, a message comprising cell configuration parameters of the cell.

26. The central unit of claim 20, wherein the RA failure indication indicates a reception failure, by the distributed unit, of an RA preamble via the RA resource of the cell.

27. A non-transitory computer-readable medium storing instructions that, when executed, cause:
sending, by a distributed unit to a computing device, an indication of a random access (RA) resource of a cell for a wireless device; and
sending, by the distributed unit to a central unit, an RA failure indication associated with the wireless device,
wherein a base station comprises the central unit and the distributed unit.

28. The non-transitory computer-readable medium of claim 27, wherein the instructions, when executed, further cause:
receiving, by the distributed unit from the wireless device via the cell, one or more transport blocks; and
sending, by the distributed unit, the one or more transport blocks.

29. The non-transitory computer-readable medium of claim 27, wherein the instructions, when executed, further cause:
receiving, by the distributed unit from the central unit, a message comprising cell configuration parameters of the cell.

30. The non-transitory computer-readable medium of claim 27, wherein the instructions, when executed, cause the sending the RA failure indication by:
sending the RA failure indication based on a determination that the distributed unit did not receive, after the sending the indication, at least one RA preamble from the wireless device via the RA resource of the cell.

31. A non-transitory computer-readable medium storing instructions that, when executed, cause:
receiving, by a central unit from a distributed unit, an indication of a random access (RA) resource of a cell for a wireless device;
sending, by the central unit to the wireless device, a radio resource control message comprising the indication of the RA resource of the cell; and
receiving, by the central unit from the distributed unit, an RA failure indication associated with the wireless device,
wherein a base station comprises the central unit and the distributed unit.

32. The non-transitory computer-readable medium of claim 31, wherein the distributed unit comprises a first distributed unit, and wherein the instructions, when executed, cause the sending the radio resource control message by:
sending the radio resource control message via one of the first distributed unit or a second distributed unit.

33. The non-transitory computer-readable medium of claim 31, wherein the instructions, when executed, further cause:
sending, by the central unit to the distributed unit, a message comprising cell configuration parameters of the cell.

34. The non-transitory computer-readable medium of claim 31, wherein the RA failure indication indicates a reception failure, by the distributed unit, of an RA preamble via the RA resource of the cell.

35. A system comprising:
a base station comprising a central unit and a distributed unit,
wherein the distributed unit is configured to:
send, to a computing device, an indication of a random access (RA) resource of a cell for a wireless device; and
send, to the central unit, an RA failure indication associated with the wireless device, and
wherein the central unit is configured to:
send, to the wireless device, a radio resource control message comprising the indication of the RA resource of the cell.

36. The system of claim 35, further comprising the wireless device,
wherein the wireless device is configured to send, to the distributed unit via the cell, one or more transport blocks, and
wherein the distributed unit is further configured to send the one or more transport blocks.

37. The system of claim 35, wherein the central unit is further configured to:
send, to the distributed unit, a message comprising cell configuration parameters of the cell.

38. The system of claim 35, wherein the distributed unit is configured to send the RA failure indication by:
sending the RA failure indication based on a determination that the distributed unit did not receive, after the sending the indication to the computing device, at least one RA preamble from the wireless device via the RA resource of the cell.

* * * * *